United States Patent
Baker et al.

(10) Patent No.: US 12,461,229 B2
(45) Date of Patent: Nov. 4, 2025

(54) OCCUPANT DETECTION DEVICE

(71) Applicant: Lutron Technology Company LLC, Coopersburg, PA (US)

(72) Inventors: Rhodes B. Baker, Allentown, PA (US); Craig Alan Casey, Coopersburg, PA (US); Shilpa Sarode, Allentown, PA (US); James P. Steiner, Royersford, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 380 days.

(21) Appl. No.: 17/971,575

(22) Filed: Oct. 22, 2022

(65) Prior Publication Data

US 2023/0126895 A1    Apr. 27, 2023

Related U.S. Application Data

(60) Provisional application No. 63/262,891, filed on Oct. 22, 2021.

(51) Int. Cl.
*G01S 13/89*    (2006.01)

(52) U.S. Cl.
CPC .................... *G01S 13/89* (2013.01)

(58) Field of Classification Search
CPC .................................................. G01S 13/89
See application file for complete search history.

(56) References Cited

U.S. PATENT DOCUMENTS 5,248,919 A    9/1993    Hanna et al.
7,391,297 B2   6/2008    Cash et al.
(Continued)

FOREIGN PATENT DOCUMENTS

DE    102016222471 A1    5/2018
EP         1835472 A2     9/2007
(Continued)

OTHER PUBLICATIONS

IIS3DHHC , "High-resolution, high-stability 3-axis digital accelerometer", Ceramic cavity LGA-16 (5x5x1.7 mm), Jan. 2018, 31 pages.

(Continued)

*Primary Examiner* — David R Dunn
*Assistant Examiner* — Nazra Nur Waheed
(74) *Attorney, Agent, or Firm* — Flaster Greenberg P.C.

(57) ABSTRACT

An occupant detection device may be configured to detect an occupant in a space where the occupant detection device is installed. The occupant detection device may include an occupant detection circuit that is configured to determine locations of one or more occupants in the space. The occupant detection device may also include a low-power detection circuit that is configured to indicate an occupancy or vacancy condition in the space. The occupant detection device may include a control circuit that is configured to determine that the low-power detection circuit indicates that there are no occupants within the space. The control circuit may determine that there is movement in an occupant map or a region of interest (ROI) as indicated by the locations of the one or occupants as determined by the occupant detection circuit. The control circuit may configure masked regions around the locations of the movement, and store the masked regions in memory. The movement detected by the occupant detection device within the masked regions may be ignored when determining an occupant count for the space.

20 Claims, 27 Drawing Sheets

(56) References Cited

U.S. PATENT DOCUMENTS

| | | |
|---|---|---|
| 8,950,461 B2 | 2/2015 | Ogden, Jr. et al. |
| 9,488,000 B2 | 11/2016 | Kirby et al. |
| 9,538,603 B2 | 1/2017 | Abraham et al. |
| 9,568,356 B2 | 2/2017 | Sloan et al. |
| 9,686,696 B2 | 6/2017 | Thyni et al. |
| 9,867,259 B2 | 1/2018 | Weidman |
| 2008/0092075 A1 | 4/2008 | Jacob et al. |
| 2009/0206983 A1 | 8/2009 | Knode et al. |
| 2011/0109424 A1 | 5/2011 | Huizenga et al. |
| 2013/0030589 A1 | 1/2013 | Pessina et al. |
| 2014/0265568 A1 | 9/2014 | Crafts et al. |
| 2016/0056629 A1 | 2/2016 | Baker et al. |
| 2017/0017214 A1 | 1/2017 | O'Keeffe |
| 2017/0163909 A1* | 6/2017 | Nakash ............ G06T 7/20 |
| 2017/0171941 A1 | 6/2017 | Steiner |
| 2017/0206766 A1 | 7/2017 | Child et al. |
| 2018/0003495 A1 | 1/2018 | Gunawan |
| 2018/0017947 A1 | 1/2018 | Kupa et al. |
| 2018/0077648 A1 | 3/2018 | Nguyen et al. |
| 2018/0143321 A1 | 5/2018 | Skowronek et al. |
| 2018/0152313 A1 | 5/2018 | Jennequin et al. |
| 2018/0167547 A1 | 6/2018 | Casey et al. |
| 2018/0168019 A1 | 6/2018 | Baker et al. |
| 2018/0168020 A1* | 6/2018 | Casey ............ H04N 1/40012 |
| 2018/0231653 A1 | 8/2018 | Pradeep |
| 2018/0250520 A1 | 9/2018 | Hyde et al. |
| 2019/0080157 A1* | 3/2019 | Lev ............ G07C 9/28 |
| 2020/0064784 A1* | 2/2020 | Steiner ............ G01S 13/34 |
| 2020/0082551 A1* | 3/2020 | Steiner ............ G06T 7/277 |
| 2021/0150380 A1 | 5/2021 | Verteletskyi et al. |

FOREIGN PATENT DOCUMENTS

| | | |
|---|---|---|
| JP | 2014035515 A | 2/2014 |
| WO | 2008154736 A1 | 12/2008 |

OTHER PUBLICATIONS

White Paper 1MA276, "Millimeter-Wave Beamforming: Antenna Array Design Choices & Characterization", http://www.rohde-schwarz.com/appnote/1MA276, Oct. 28, 2016, 28 pages.

\* cited by examiner

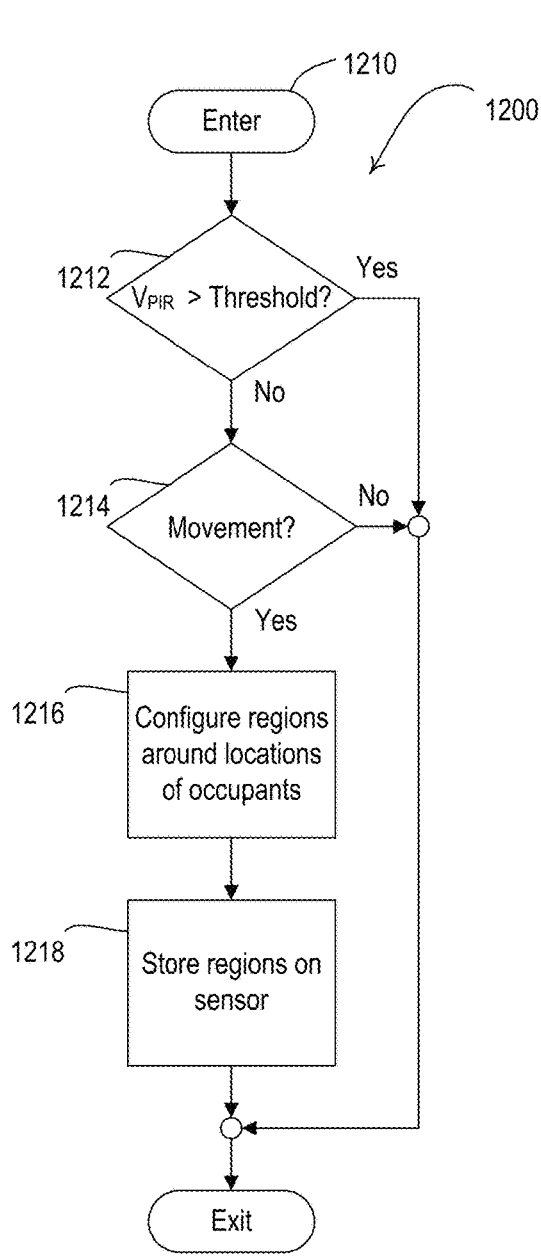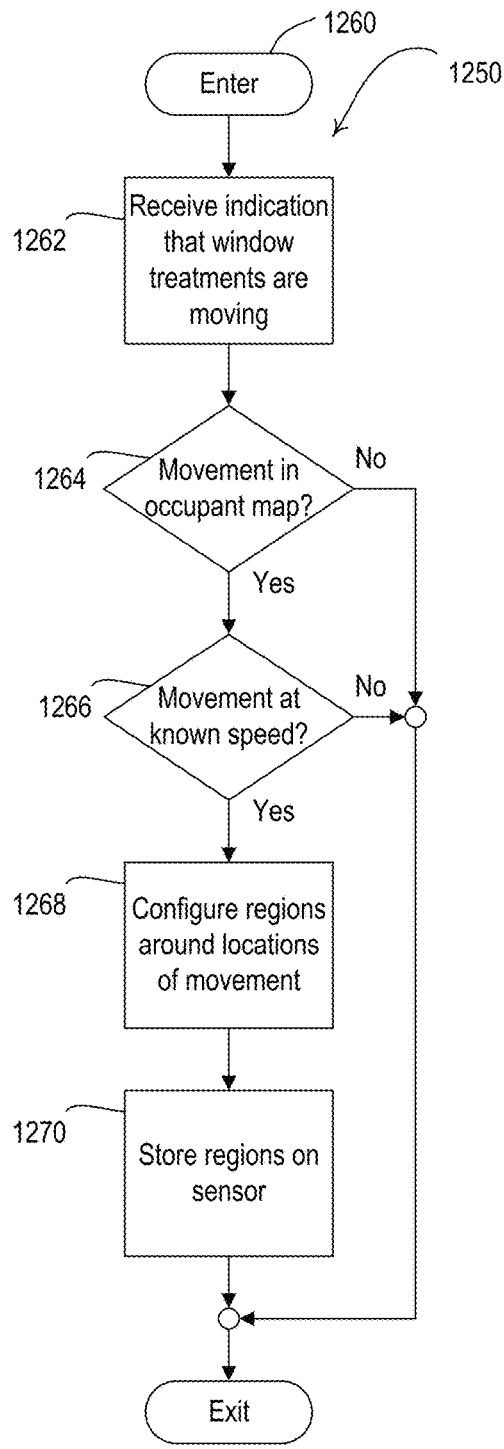
Fig. 12A
Fig. 12B

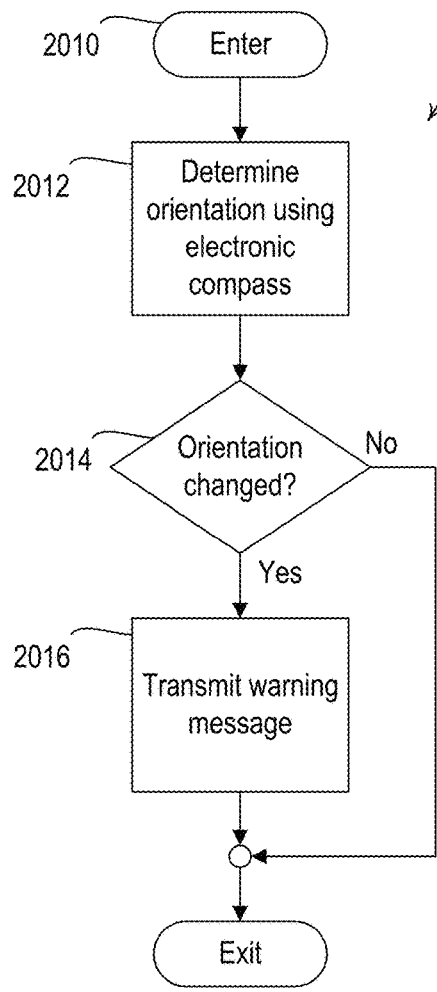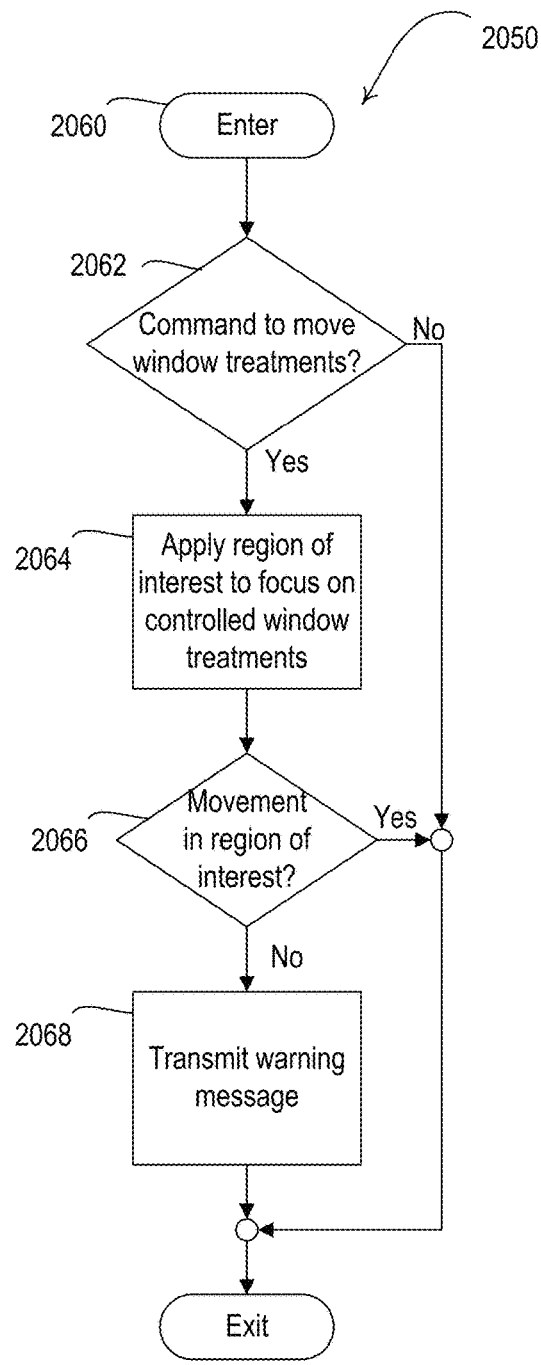
Fig. 20A
Fig. 20B

OCCUPANT DETECTION DEVICE

CROSS-REFERENCE TO RELATED APPLICATIONS

This application claims the benefit of U.S. Provisional Patent Application No. 63/262,891, filed Oct. 22, 2021, the contents of which are incorporated herein by reference in their entirety.

BACKGROUND

To manage a user environment, such as a residence or an office building, it may be desirable to have the ability to estimate the number of people occupying the user environment at a given time. Knowing the number of the people in an environment may improve occupant-driven control measures, such as energy control, air quality control, room assignment and/or scheduling, and/or the like. Further, the user environment may include one or more regions/areas that are of particular interest for monitoring. These regions/areas of interest may include, for example, entryways, desk areas, certain aisle or shelf space in a retail store, certain sections of a concert hall, etc. Having the ability to monitor the movements of people in and out of these regions/areas and determine a count of the number of the people in the regions/areas may assist with decisions such as workspace sharing, merchandising, security management, traffic control, etc. Prior art systems, methods, and instrumentalities lack the ability to perform these and other related tasks accurately and economically, and often cause privacy concerns.

SUMMARY

As described herein, an occupant detection device (e.g., an occupant detection sensor) configured to detect occupants in a space (e.g., a room) may comprise an occupant detection circuit (e.g., a radar detection circuit) and a control circuit. The occupant detection circuit may be configured to determine the location of an occupant in the space with reference to a first coordinate system associated with the detection circuit. The control circuit may store a relationship between the first coordinate system and a second coordinate system associated with a region of interest in the space. Based on the relationship, the control circuit may convert the location of the occupant in the first coordinate system into a corresponding location in the second coordinate system and determine if the occupant is inside or outside the region of interest.

The relationship between the first and second coordinate systems may comprise an offset vector between the respective origins of the two coordinate systems. The relationship may also comprise a rotation angle between an axis of the first coordinate system and an axis of the second coordinate system. The control circuit may determine the relationship between the first and second coordinate systems during a configuration or commissioning process. The control circuit may also acquire knowledge about the region of interest during the configuration or commissioning process. Such knowledge may include, for example, the shape, dimensions and/or corner locations of the region of interest. The control circuit may obtain the relationship between the first and second coordinate systems and/or the knowledge about the region of interest from a programming device (e.g., based on one or more inputs received from a programming device). The control circuit may also determine the relationship between the first and second coordinate systems and/or acquire the knowledge about the region of interest based on one or more location markers placed in the space or in the region of interest. Multiple regions of interest may be configured for the space, which may have different shapes (e.g., polygon, circle, irregular or complex shapes, etc.). One or more masked areas may also be configured within each region and used to exclude certain occupants from an occupant count.

The control circuit may also be configured to determine whether an occupant is inside a region of interest without transforming the location of the occupant between the two coordinate systems. For example, the control circuit may make the determination based on whether respective vectors extending from each corner of the region of interest are all directed into the region of interest, and determine that an occupant is within the region of interest when the respective vectors are all directed into the region of interest. The control circuit may be configured to determine that the occupant is not within the region of interest when at least one of the vectors is not directed into the region of interest.

The control circuit may maintain a count of the number of occupants (e.g., an occupant count) in the region of interest based on whether the locations of the occupants are within the region of interest or not. The control circuit may adjust the occupant count in response to determining that an occupant has entered or exited the region of interest. For example, the occupant detection circuit may be configured to assign respective tracking numbers to one or more occupants upon detecting the one or more occupants in the space and the control circuit may be configured to store the tracking numbers and the locations of the one or more occupants in memory. The control circuit may use the tracking number and/or the locations of the occupants to determine whether the occupants have entered the region of interest, exited the region of interest, or become stationary in the region of interest. The control circuit may then adjust the occupant count for the region of interest accordingly. The occupant count may be reported by the control circuit to an external device such as a system controller. The report may be transmitted via a communication circuit of the occupant detection device, for example, via a wireless communication link.

An occupant detection device may be configured to detect an occupant in a space where the occupant detection device is installed. The occupant detection device may include an occupant detection circuit that is configured to determine locations of one or more occupants in the space. The occupant detection device may also include a low-power detection circuit that is configured to indicate an occupancy or vacancy condition in the space. The occupant detection device may include a control circuit that is configured to determine that the low-power detection circuit indicates that there are no occupants within the space. The control circuit may determine that there is movement in an occupant map or a region of interest (ROI) as indicated by the locations of the one or occupants as determined by the occupant detection circuit. The control circuit may configure masked regions around the locations of the movement, and store the masked regions in memory. The movement detected by the occupant detection device within the masked regions may be ignored when determining an occupant count for the space.

The low-power detection circuit may include a passive infrared (PIR) detector circuit that outputs a PIR detect signal in response to detected infrared energy in the room. The PIR detector circuit may be configured to drive the PIR detect signal high when the PIR detector circuit detects one or more occupants in the room, and drive the PIR detect signal low when the PIR detector circuit does not detect any occupants in the room.

In some examples, the occupant map may include a two-dimensional (2D) radar image indicating the locations of the occupants within a coverage area of the occupant detection circuit. The control circuit may be configured to generate the occupant count for the space based on feedback from the occupant detection circuit. The control circuit may be configured to maintain the occupant count in a region of interest of the based on whether the locations of the occupants are within the region of interest or not. The masked regions may be located within the region of interest but detected occupants within the masked region are excluded from the occupant count. The control circuit may be configured to report the occupant count to a system controller.

The control circuit many be to detect movement of a window treatment in the occupant map or the region of interest of the occupant detection circuit. The control circuit may be configured to receive a message indicating that the window treatment is moving, determine that the movement of the window treatment in the occupant map or the region of interest is at a predetermined speed, configure a masked region around a location of the movement based on the movement being in the occupant map or region of interest of the occupant detection sensor and the movement being at the predetermined speed, and store the masked region in memory, wherein movement detected within the masked region is ignored when determining an occupant count for the space. The first mode may be a disable daylighting mode and the second mode is a daylighting mode. The control circuit may be configured to determine that the window treatment has moved from a fully-lowered position to a fully-raised or partially-raised position. When the daylighting mode is disabled, lights might not be controlled in response to feedback from a daylight sensor. When the daylighting mode is enabled, lights may be controlled in response to feedback from the daylight sensor.

The control circuit may be configured to receive a message indicating that the window treatment is moving. The control circuit may be configured to determine a location of the window treatment in response to the movement of the window treatment in the occupant map or the region of interest of the occupant detection circuit. The control circuit may be configured to determine a configuration identifier of the window treatment in response to the location of the window treatment. The control circuit may be configured to associate a unique identifier of the window treatment with the configuration identifier of the window treatment.

The control circuit may be configured to monitor a region of interest of a manual window treatment in response to the occupant detection circuit. The control circuit may be configured to determine that the manual window treatment within the region of interest has moved in response to the occupant detection circuit. The control circuit may be configured to determine a position of the manual window treatment in response to the occupant detection circuit. The control circuit may be configured to determine an intensity level to control lighting loads based on whether the manual window treatment is in a fully-closed position or in a fully-raised or partially-raised position. The control circuit may be configured to transmit the determined intensity level to the one or more lighting loads.

The occupant detection device may include an inclinometer that is configured to generate and output a signal that is indicative of an incline angle of the occupant detection device. The control circuit may be configured to determine an incline angle of the occupant detection device based on the signal received from the inclinometer. The control circuit may be configured to determine that the incline angle is outside of a predetermined range, and generate an indication of an incline error. The control circuit may be configured to determine a compensation factor based on the incline angle, and apply the compensation factor based on the incline angle.

The control circuit may be configured to determine a height of the space, determine a viewing angle for the occupant detection circuit based on the height of the occupant detection sensor, and configure the occupant detection circuit to have the selected viewing angle.

The occupant detection circuit may be configured to control a transmitting antenna array using various beamforming techniques to adjust viewing angle of the occupant detection circuit.

The control circuit may be configured to determine a location of a single occupant when the actuation of the remote control device occurred based on the occupant detection circuit, determine a configuration identifier of the remote control device in response to the location of the single occupant, and associate a unique identifier of the remote control device with the configuration identifier of the remote control device.

The control circuit may be configured to determine that the low-power detection circuit indicates a new occupant within the space. The control circuit may be configured to determine an initial location of the new occupant within the region of interest of the occupant detection circuit. The control circuit may be configured to store the initial location of the new occupant within the region of interest as a potential egress location (e.g., a potential doorway location). The control circuit may be configured to determine that there are multiple occurrences of the same potential doorway location, and store the potential doorway location as an actual doorway location for the space. The control circuit may be configured to mask off the actual doorway location or mask off a location that is just outside of the actual doorway location.

BRIEF DESCRIPTION OF THE DRAWINGS

FIGS. 5A-8 illustrate example configuration procedures that may be executed to configure an occupant detection sensor.

FIG. 12A-18 illustrate example configuration procedures that may be executed to configure an occupant detection sensor.

FIGS. 20A-20C are simplified flowcharts of example control procedures that may be executed by a control circuit of an occupant detection sensor.

DETAILED DESCRIPTION

Figure 1:
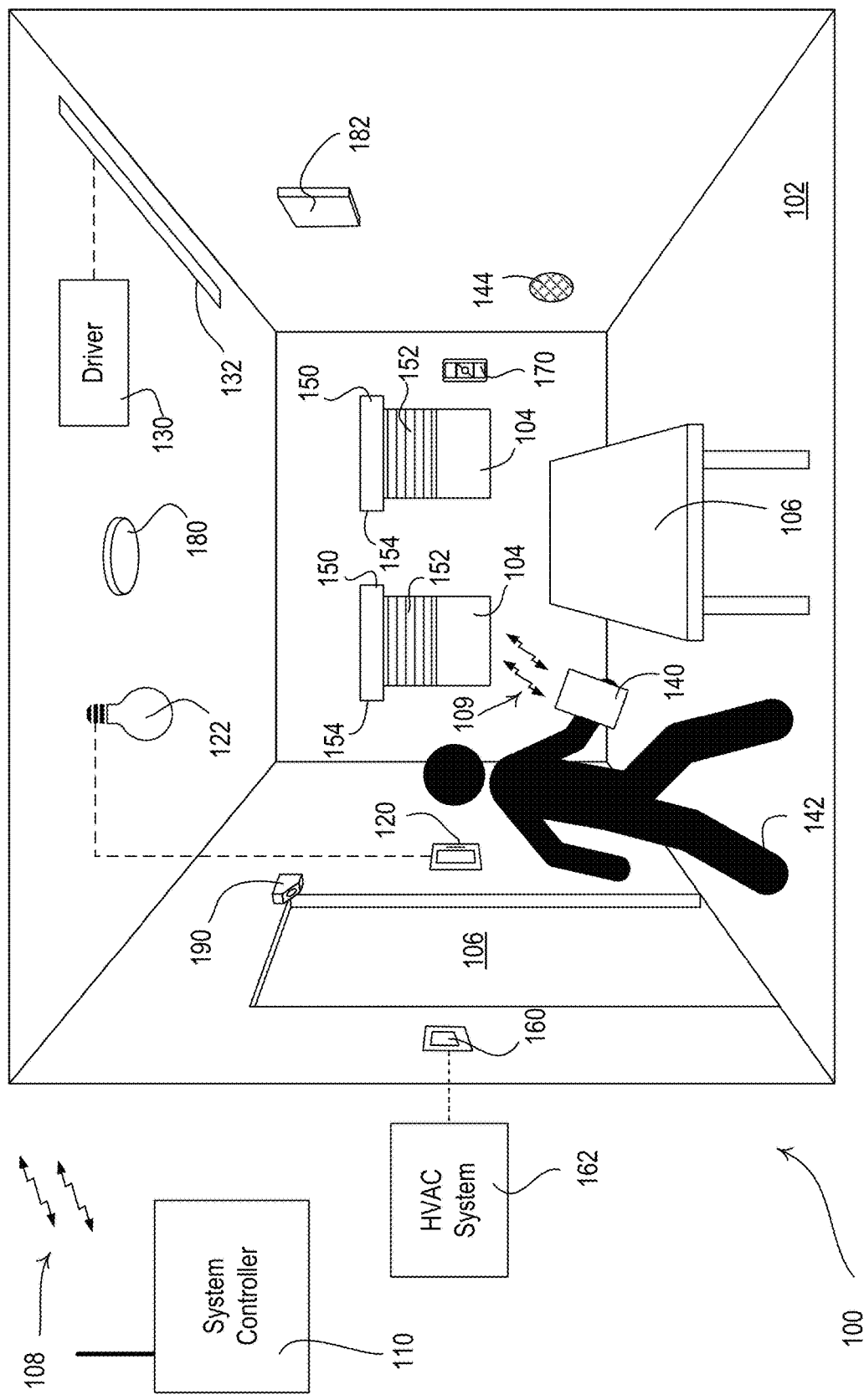
FIG. 1 is a simple diagram of an example load control system including one or more occupant detection devices.

FIG. 1 is a simple diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of input devices (e.g., control devices configured to transmit messages in response to user inputs (e.g., button actuations), occupancy/vacancy conditions, changes in measured light intensity, etc.) and a number of load control devices (e.g., control devices configured to receive messages and control respective electrical loads in response to the received messages). A single control device of the load control system 100 may operate as both an input device and a load control device.

The input devices may be configured to transmit messages (e.g., digital messages) directly to the load control devices. In addition, the load control system 100 may comprise a system controller 110 (e.g., a central processor or load controller) configured to communicate messages to and from the control devices (e.g., the input devices and/or the load control devices). For example, the system controller 110 may be configured to receive messages from the input devices and transmit messages to the load control devices in response to the messages received from the input devices.

The load control system 100 may comprise one or more load control devices, e.g., a dimmer switch 120 for controlling a lighting load 122. For example, the dimmer switch 120 may be adapted to be wall-mounted in a standard electrical wallbox. The dimmer switch 120 may comprise a tabletop or plug-in load control device. The dimmer switch 120 may comprise a toggle actuator (e.g., a button) and/or an intensity adjustment actuator (e.g., a rocker switch). Examples of a toggle actuator include a pushbutton, a rocker switch, and a touch sensitive surface (e.g., a capacitive or resistive touch surface). Examples of an intensity adjustment actuator include a rocker switch, a slider, and a touch sensitive bar (e.g., a capacitive or resistive touch bar). Actuations (e.g., successive actuations) of the toggle actuator may toggle (e.g., turn off and on) the lighting load 122. Actuations of an upper portion or a lower portion of the intensity adjustment actuator may respectively increase or decrease the amount of power delivered to the lighting load 122 and thus increase or decrease the intensity level of the receptive lighting load from a minimum intensity (e.g., approximately 1%) to a maximum intensity (e.g., approximately 100%). The dimmer switch 120 may comprise a plurality of visual indicators, e.g., light-emitting diodes (LEDs), which may be arranged in a linear array and may be illuminated to provide feedback of the intensity level of the lighting load 122. Examples of wall-mounted dimmer switches are described in greater detail in U.S. Pat. No. 5,248,919, issued Sep. 28, 1993, entitled LIGHTING CONTROL DEVICE, and U.S. Pat. No. 9,676,696, issued Jun. 13, 2017, entitled WIRELESS LOAD CONTROL DEVICE, the entire disclosures of which are hereby incorporated by reference.

The dimmer switch 120 may be configured to wirelessly receive messages via the RF signals 108 (e.g., from the system controller 110) and to control (e.g., by transmitting messages wirelessly via the RF signals 108) the lighting load 122 in response to the received messages. Examples of dimmer switches operable to transmit and receive digital messages is described in greater detail in commonly-assigned U.S. Patent Application Publication No. 2009/0206983, published Aug. 20, 2009, entitled COMMUNICATION PROTOCOL FOR A RADIO-FREQUENCY LOAD CONTROL SYSTEM, the entire disclosure of which is hereby incorporated by reference.

The load control system 100 may comprise one or more remotely-located load control devices, such as a light-emitting diode (LED) driver 130 for driving an LED light source 132 (e.g., an LED light engine). The LED driver 130 may be located remotely, for example, in or adjacent to the lighting fixture of the LED light source 132. The LED driver 130 may be configured to receive messages via the RF signals 108 (e.g., from the system controller 110) and to control the LED light source 132 in response to the received messages. The LED driver 130 may be configured to adjust the color temperature of the LED light source 132 in response to the received messages. Examples of LED drivers configured to control the color temperature of LED light sources are described in greater detail in commonly-assigned U.S. Pat. No. 9,538,603, issued Jan. 3, 2017, entitled SYSTEMS AND METHODS FOR CONTROLLING COLOR TEMPERATURE, the entire disclosure of which is hereby incorporated by reference. The load control system 100 may further comprise other types of remotely-located load control devices, such as, for example, electronic dimming ballasts for driving fluorescent lamps.

The load control system 100 may comprise one or more daylight control devices, e.g., motorized window treatments 150, such as motorized cellular shades, for controlling the amount of daylight entering the room 102. Each motorized window treatment 150 may comprise a covering material 152 hanging from a headrail 154 in front of a respective window 104. Each motorized window treatment 150 may further comprise a motor drive unit (not shown), e.g., located inside of the headrail 154, for raising and lowering the covering material 152 for controlling the amount of daylight entering the room 102. The motor drive units of the motorized window treatments 150 may be configured to receive messages via the RF signals 108 (e.g., from the system controller 110) and adjust the position of the respective covering material 152 in response to the received messages. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control system 100 may comprise one or more temperature control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102. The thermostat 160 may be configured to receive messages via the RF signals 108 (e.g., from the system controller 110) and adjust heating, ventilation, and cooling in response to the received messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., a remote control device 170 and one or more occupant detection devices, such as a ceiling-mounted occupant detection sensor 180 and a wall-mounted occupant detection sensor 182. The input devices may be fixed or movable input devices. The system controller 110 may be configured to transmit one or more messages to the load control devices (e.g., the dimmer switch 120, the LED driver 130, the motorized window treatments 150, and/or the thermostat 160) in response to the messages received from the remote control device 170, the ceiling-mounted occupant detection sensor 180, and/or the wall-mounted occupant detection sensor 182. The remote control device 170, the ceiling-mounted occupant detection sensor 180, and/or the wall-mounted occupant detection sensor 182 may be configured to transmit messages directly to the dimmer switch 120, the LED driver 130, the motorized window treatments 150, and/or the thermostat 160. While FIG. 1 shows two occupant detection devices, the load control system 100 may only comprise a single occupant detection device (e.g., one or the other of the ceiling-mounted occupant detection sensor 180 and the wall-mounted occupant detection sensor 182).

The remote control device 170 may be configured to transmit digital messages via the RF signals 108 to the system controller 110 (e.g., directly to the system controller) in response to an actuation of one or more buttons of the remote control device. For example, the remote control device 170 may be battery-powered. The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be coupled to a network, such as a wireless or wired local area network (LAN), e.g., for access to the Internet. The system controller 110 may be wirelessly connected to the network. The system controller 110 may be coupled to the network via a network communication bus (e.g., an Ethernet communication link). The system controller 110 may be configured to communicate via the network with one or more network devices, e.g., a mobile device 140, such as, a personal computing device and/or a wearable wireless device. The mobile device 140 may be located on an occupant 142, for example, may be attached to the occupant's body or clothing or may be held by the occupant. The mobile device 140 may be characterized by a unique identifier (e.g., a serial number and/or address stored in memory) that uniquely identifies the mobile device 140 and thus the occupant 142. Examples of personal computing devices may include a smart phone, a laptop, and/or a tablet device (for example, a hand-held computing device). Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The mobile device 140 may be configured to transmit messages to the system controller 110, for example, in one or more Internet Protocol packets. For example, the mobile device 140 may be configured to transmit messages to the system controller 110 over the LAN and/or via the Internet. The mobile device 140 may be configured to transmit messages over the Internet to an external service, and then the messages may be received by the system controller 110 (e.g., the information/commands of the messages may be transmitted from the cloud to the system controller 110). Alternatively or additionally, the mobile device 140 may be configured to transmit RF signals according to the proprietary protocol. The load control system 100 may comprise other types of network devices coupled to the network, such as a desktop personal computer, a wireless-communication-capable television, or any other suitable Internet-Protocol-enabled device. Examples of load control systems operable to communicate with mobile and/or network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The system controller 110 may be configured to determine the location of the mobile device 140 and/or the occupant 142. The system controller 110 may be configured to control (e.g., automatically control) the load control devices (e.g., the dimmer switch 120, the LED driver 130, the motorized window treatments 150, and/or the temperature control device 160) in response to determining the location of the mobile device 140 and/or the occupant 142. One or more of the control devices of the load control system 100 may transmit beacon messages, for example, transmitted via RF signals using a short-range wireless protocol (e.g., BLUETOOTH, BLUETOOTH LOW ENERGY (BLE), or other short range wireless protocol). The load control system 100 may also comprise at least one beacon transmitting device 144 for transmitting the beacon messages. The mobile device 140 may be configured to receive a beacon messages when located near a control device that is presently transmitting the beacon message. A beacon message may comprise a unique identifier identifying the location of the load control device that transmitted the beacon message. Since the beacon message may be transmitted using a short-range and/or low-power technology, the unique identifier may indicate the approximate location of the mobile device 140. The mobile device 140 may be configured to transmit the unique identifier to the system controller 110, which may be configured to determine the location of the mobile device 140 using the unique identifier (e.g., using data stored in memory or retrieved via the Internet). An example of a load control system for controlling one or more electrical loads in response to the position of a mobile device and/or occupant inside of a building is described in greater detail in commonly-assigned U.S. Patent Application Publication No. 2016/0056629, published Feb. 25, 2016, entitled LOAD CONTROL SYSTEM RESPONSIVE TO LOCATION OF AN OCCUPANT AND MOBILE DEVICES, the entire disclosure of which is hereby incorporated by reference.

The operation of the load control system 100 may be programmed and configured using, for example, the mobile device 140 or other network device (e.g., when the mobile device is a personal computing device) during a commissioning procedure (e.g., a configuration procedure). The mobile device 140 may execute a graphical user interface (GUI) configuration software for allowing a user or installer to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the dimmer switch 120, the LED driver 130, the motorized window treatments 150, and/or the thermostat 160). The load control database may comprise information regarding associations between the load control devices and the input devices (e.g., the remote control device 170, the ceiling-mounted occupant detection sensor 180, the wall-mounted occupant detection sensor 182, etc.). The load control database may comprise information regarding how the load control devices respond to inputs received from the input devices. Examples of configuration procedures for load control systems are described in greater detail in commonly-assigned U.S. Pat. No. 10,027,127, issued Jul. 17, 2018, entitled COMMISSIONING LOAD CONTROL SYSTEMS, the entire disclosure of which is hereby incorporated by reference.

The occupant detection sensors 180, 182 may each be configured to detect locations and movements of occupants in and/or near (e.g., in a doorway of) the room 102. The occupant detection sensors 180, 182 may each be configured to determine the number of occupants in the room 102 (e.g., an occupant count). For example, each of the occupant detection sensors 180, 182 may comprise an occupant detection circuit (e.g., an image sensing circuit, such as a radar detection circuit) for determining the number and/or location of the occupants in the room 102 (e.g., as will be described in greater detail below). The occupant detection circuit may be configured to determine the locations of an occupant as coordinates in a two-dimensional or three-dimensional coordinate system, e.g., a Cartesian or polar coordinate system (e.g., a 2D Cartesian coordinate system, 3D Cartesian coordinate system (e.g., with X, Y, and Z coordinates), a 2D polar coordinate system, or a 3D polar coordinate system (e.g., a spherical coordinate system.)). For example, the occupant detection circuit may be configured to determine the locations of the occupant as X-Y-Z coordinates where the Z-axis extends from the occupant detection sensor towards the opposing wall (e.g., from a wall-mounted occupant detection sensor) and/or towards the floor (e.g., from a ceiling-mounted occupant detection sensor). In some examples, the Z-coordinate may indicate the distance from the occupant detection sensor to the occupant.

Figure 2A:
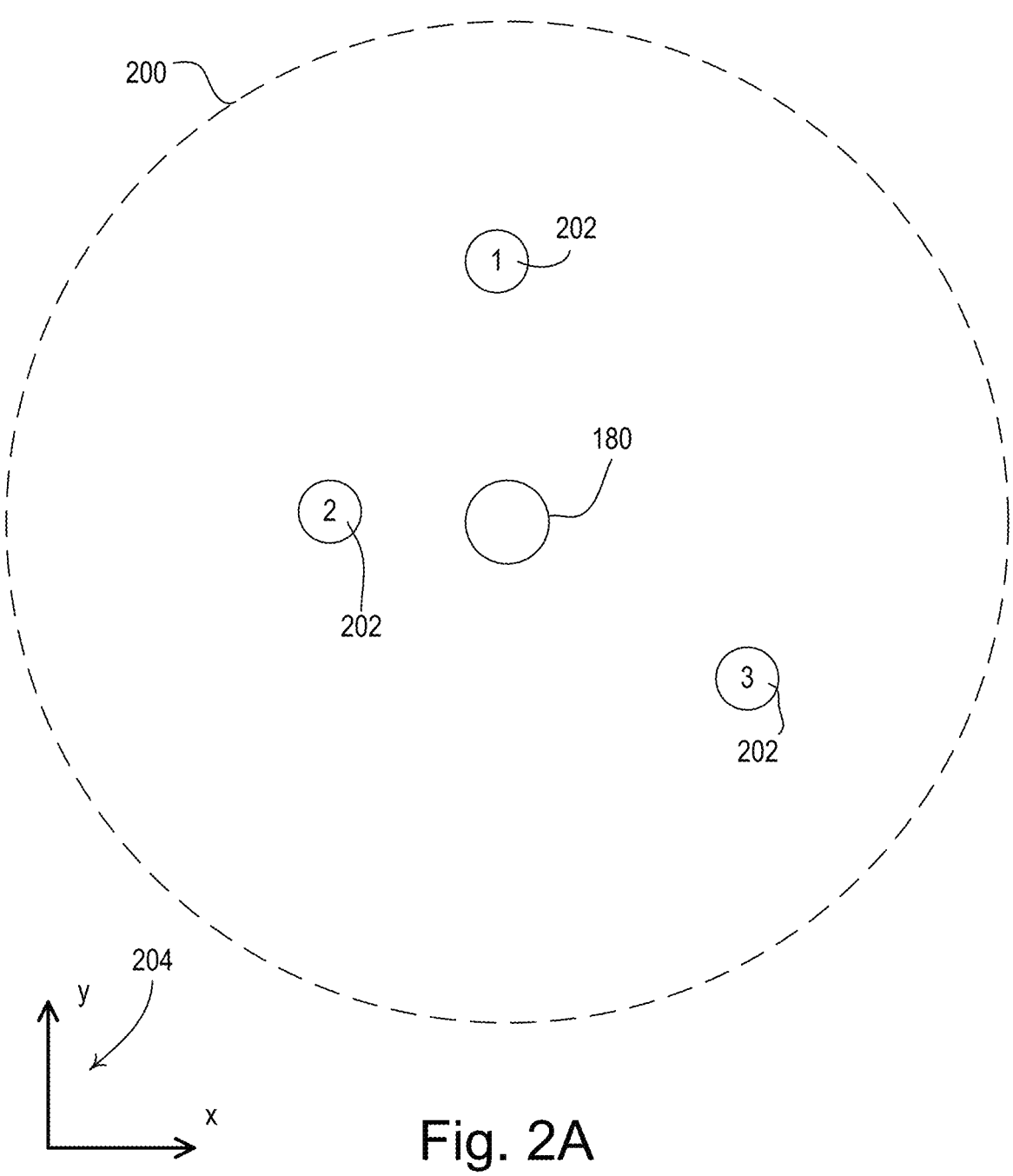
FIGS. 2A-2H illustrate example coverage areas of occupant detection devices.

The ceiling-mounted occupant detection sensor 180 may be mounted to the ceiling of the room 102 (e.g., in the center of the room) and may be configured to determine a top-down view of the locations of the occupants of the room 102 in response to the occupant detection circuit. FIG. 2A is an example view of the ceiling-mounted occupant sensor 180 illustrating a coverage area 200 (e.g., a range) and a plurality of occupants 202 within the coverage area. As shown in FIG. 2A, the coverage area 200 of the ceiling-mounted occupant detection sensor 180 may have a circular shape. The ceiling-mounted occupant detection sensor 180 may be configured to generate an occupant map, e.g., a two-dimensional (2D) radar image indicating the locations of the occupants 202 within the coverage area. The ceiling-mounted occupant detection sensor 180 may be configured to determine the locations of the occupants 202 as coordinates (e.g., X-Y coordinates) in a two-dimensional coordinate system 204 associated with (e.g., defined by) the occupant detection circuit of the ceiling-mounted occupant detection sensor 180. For example, the ceiling-mounted occupant detection sensor 180 may ignore (e.g., discard) the Z-coordinate information determined by the occupant detection circuit. In addition, the ceiling-mounted occupant detection sensor 180 may set the Z-coordinate to a value (e.g., a constant value) and determine the X-Y coordinates of the occupants 202 at that particular value of the Z-coordinate. In some examples, the ceiling-mounted occupant detection sensor 180 may determine the locations of the occupants 202 as X-Y-Z coordinates in a three-dimensional coordinate system.

Figure 2B:
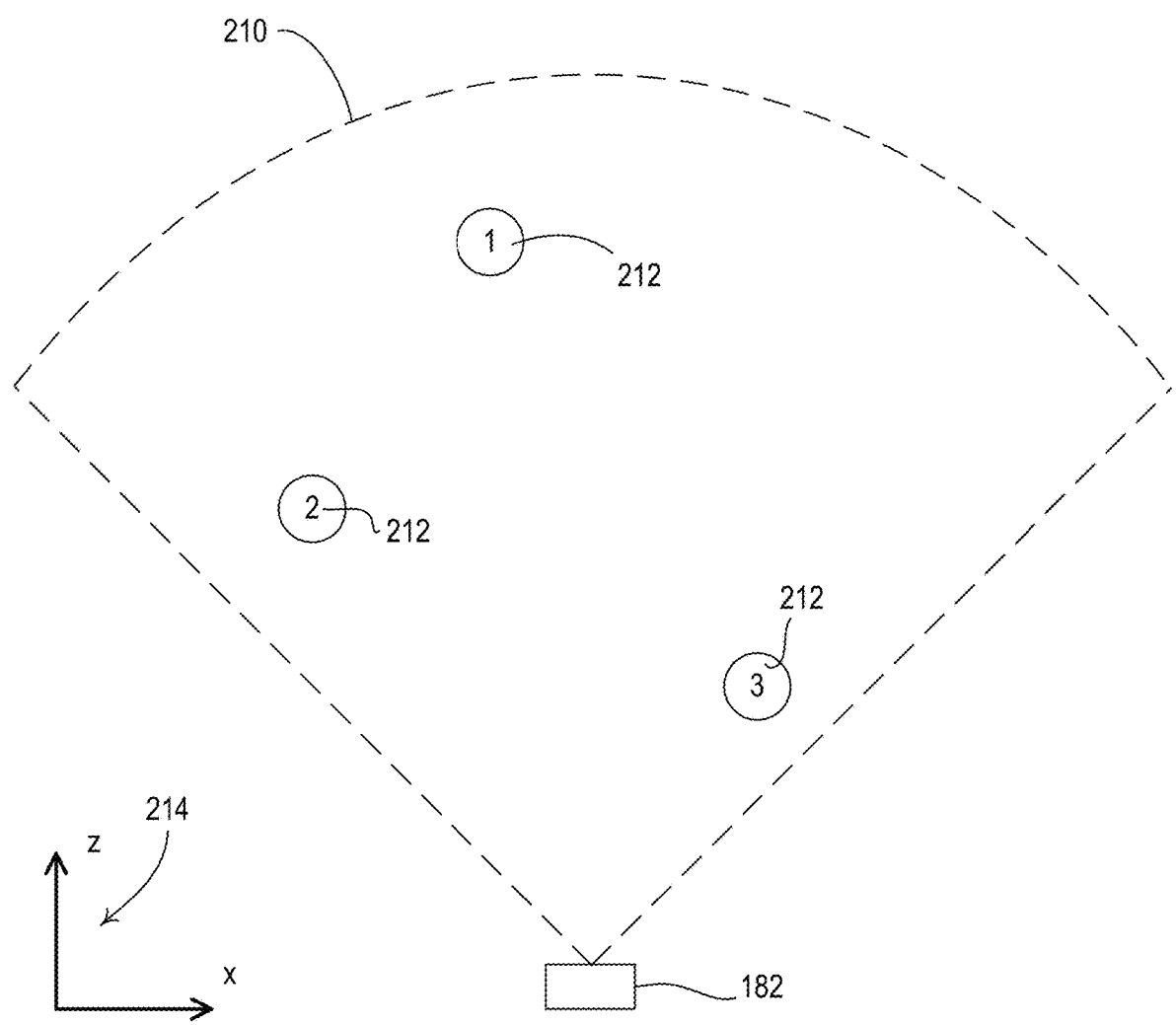

The wall-mounted occupant detection sensor 182 may be mounted to a wall of the room 102 and may be configured to use distance data from the occupant detection circuit to determine the locations of the occupants of the room 102. FIG. 2B is an example view of the wall-mounted occupant sensor 182 illustrating a coverage area 210 (e.g., a range) and a plurality of occupants 212 within the coverage area. As shown in FIG. 2B, the coverage area 210 of the wall-mounted occupant detection sensor 182 may have a wedge shape. Since the coverage area 210 may be wedge-shaped, the wall-mounted occupant detection sensor 182 may be mounted in a corner of the room 102. The wall-mounted occupant detection sensor 182 may be configured to generate an occupant map, e.g., a two-dimensional (2D) radar image indicating the locations of the occupants 212 within the coverage area. The wall-mounted occupant detection sensor 182 may be configured to determine the locations of occupants 212 as coordinates (e.g., X-Z coordinates) in a two-dimensional coordinate system 214 associated with (e.g., defined by) the occupant detection circuit of the ceiling-mounted occupant detection sensor 180. For example, the wall-mounted occupant detection sensor 182 may ignore (e.g., discard) the Y-coordinate information determined by the occupant detection circuit. In addition, the wall-mounted occupant detection sensor 182 may set the Y-coordinate to a value (e.g., a constant value) and determine the X-Z coordinates of the occupants 202 at that particular value of the Y-coordinate. For example, the wall-mounted occupant detection sensor 182 may set the Y-coordinate to a value that corresponds to a constant value (e.g., approximately 2.5-3 feet) so as to ignore movement of pets. Further, the wall-mounted occupant detection sensor 182 may determine the locations of the occupants 212 as X-Y-Z coordinates in a three-dimensional coordinate system.

Figure 2C:
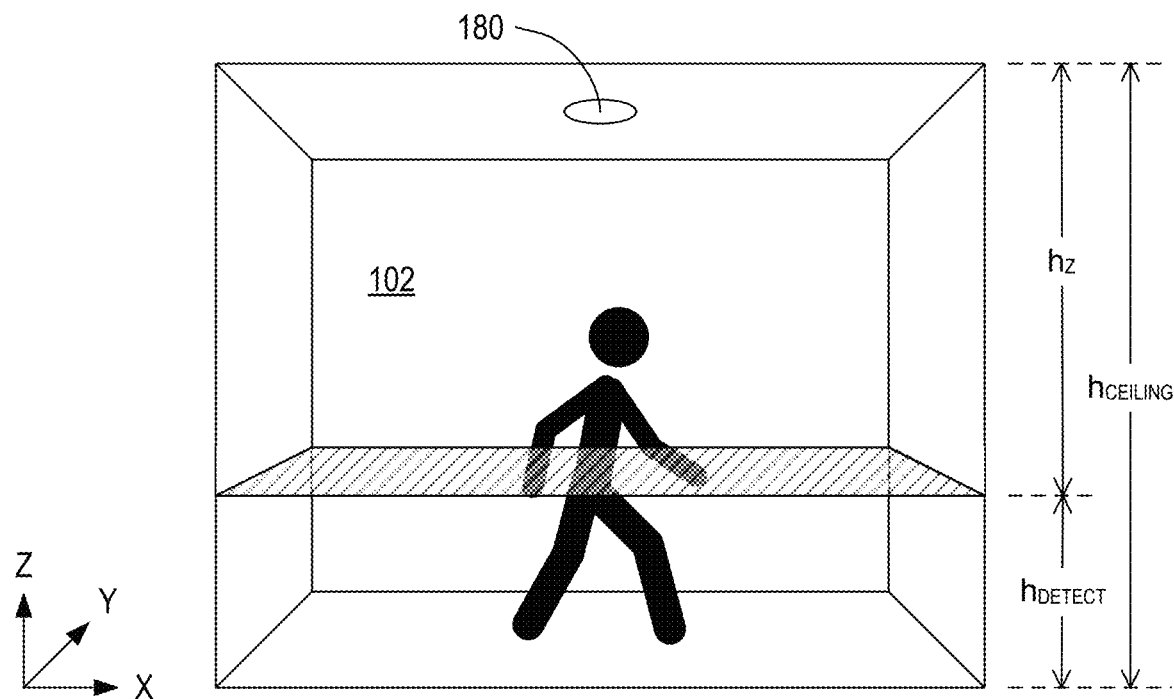

FIG. 2C is diagram of a room including an example of the ceiling-mounted occupant detection sensor 180 where the Z-coordinate is set to a value (e.g., a constant value), and the ceiling-mounted occupant detection sensor 180 is configured to determine the X-Y coordinates of the occupants 202 at that particular value of the Z-coordinate. The occupant detection sensor 180 may set the Z-coordinate to a value based on a determined distance $h_Z$ away from the occupant detection sensor 180 (e.g., in this case the ceiling). For example, a user may determine a detection height $h_{DETECT}$ above the floor of a space at which the occupant detection sensor 180 is configured to detect movement (e.g., approximately 2.5-3 feet). The occupant detection sensor 180 may then determine the Z-coordinate value for the X-Y coordinates using the distance $h_Z$ that is based on a distance between the occupant detection sensor 180 and the floor (e.g., a ceiling height $h_{CEILING}$) and the detection height $h_{DETECT}$ (e.g., $h_Z = h_{CEILING} - h_{DETECT}$). The occupant detection sensor 180 may be configured to detect movement in the X-Y plane at the Z-coordinate value (e.g., a range of Z-coordinate values) equal to the distance $h_Z$, and not respond to (e.g., ignore) movements in the X-Y plane that occur at other Z-coordinate values. For example, the occupant detection sensor 180 may be configured to set the Z-coordinate value, or the distance $h_Z$, to a particular height (e.g., approximately 2.5-3 feet) so as to ignore movement of pets, but respond to the movement of people.

Figure 2D:
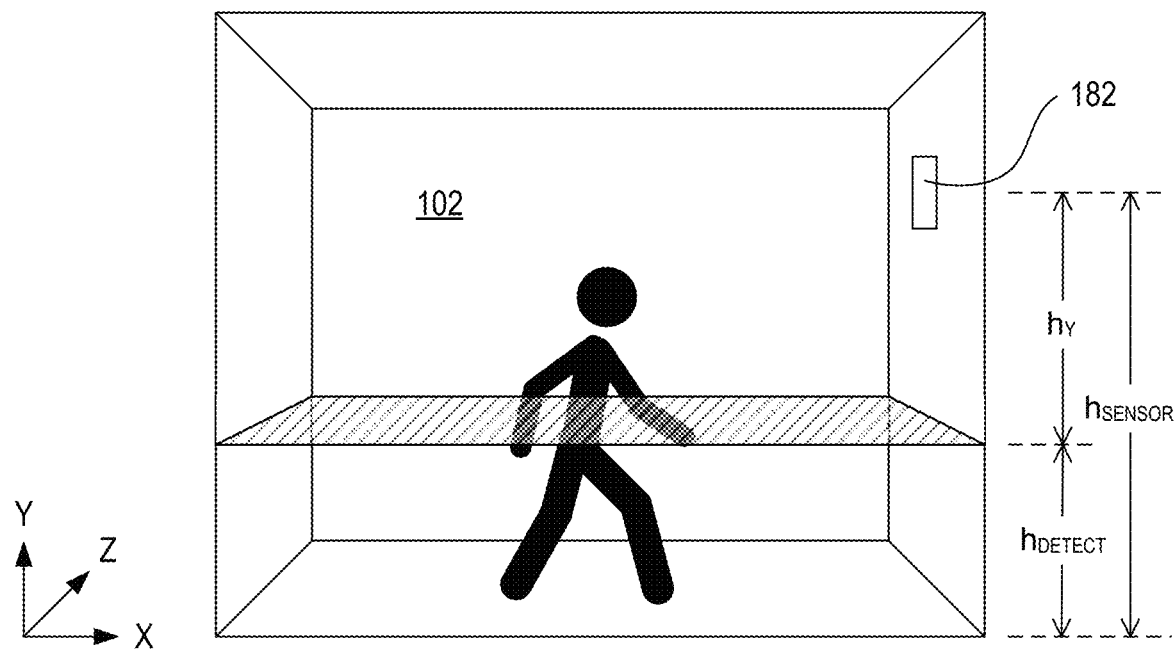

FIG. 2D is an example of a wall-mounted occupant detection sensor 182 that is mounted flush to the wall (e.g., perpendicular to the floor) where the Y-coordinate is set to a value (e.g., a constant value), and the occupant detection sensor 182 is configured to determine the X-Z coordinates of the occupants 202 at that particular value of the Y-coordinate. The occupant detection sensor 182 may set the Y-coordinate to a value based on a determined distance $h_Y$ away from the occupant detection sensor 182 (e.g., which is secured to the wall). For example, a user may determine a detection height $h_{DETECT}$ above the floor of a space at which the occupant detection sensor 182 is configured to detect movement (e.g., approximately 2.5-3 feet). The occupant detection sensor 182 may then determine the Y-coordinate value for the X-Z coordinates using the distance $h_Y$ that is based on a distance between the occupant detection sensor 182 and the floor (e.g., a sensor height $h_{SENSOR}$) and the detection height $h_{DETECT}$ (e.g., $h_Y = h_{SENSOR} - h_{DETECT}$). The occupant detection sensor 182 may be configured to detect movement in the X-Z plane at the Y-coordinate value equal to the distance $h_Y$, and not respond to (e.g., ignore) movements within the X-Z plane that occur at other Y-coordinate values. For example, the occupant detection sensor 182 may be configured to set the Y-coordinate value, or the distance $h_Y$, to a particular height (e.g., approximately 2.5-3 feet) so as to ignore movement of pets, but respond to the movement of people.

Figure 2E:
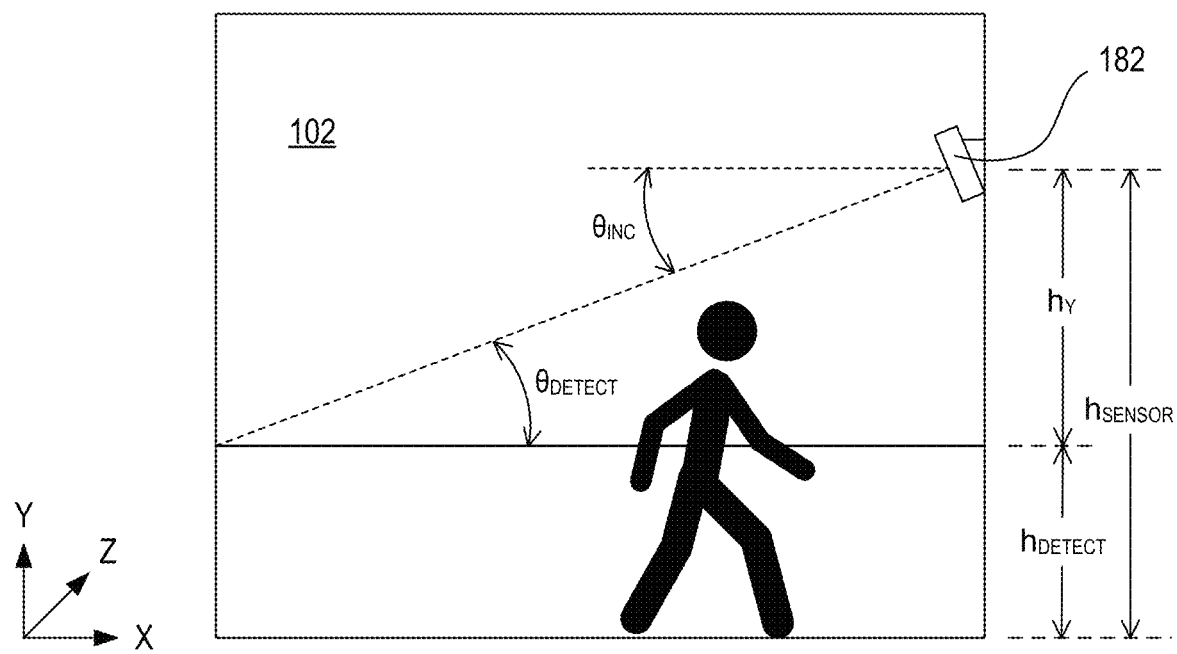

FIG. 2E is an example of a wall-mounted occupant detection sensor 182 that is mounted at an incline angle $\theta_{INC}$. The wall-mounted occupancy detection sensor 182 may be configured to set the Y-coordinate is set to a value (e.g., a constant value), and determine the X-Z coordinates of the occupants 202 at that particular value of the Y-coordinate. The wall-mounted occupant detection sensor 182 may include an inclinometer, and the wall-mounted occupant detection sensor 182 may be configured to determine the incline angle $\theta_{INC}$ using the inclinometer. The inclinometer may be configured to measure the slope (or tilt), elevation, and/or depression of the wall-mounted occupant detection sensor 182 (e.g., relative to an artificial horizon). For example, the inclinometer may measure the slope (or tilt), elevation, and/or depression of the wall-mounted occupant detection sensor 182. The wall-mounted occupant detection sensor 182 may be responsive to slope (or tilt), elevation, and/or depression indicated by the inclinometer. For example, the inclinometer may provide a signal indicative of the slope (or tilt), elevation, and/or depression to the wall-mounted occupant detection sensor 182. The wall-mounted occupant detection sensor 182 may ensure that it is positioned correctly (e.g., positioned at the correct slope) using the inclinometer. For example, the wall-mounted occupant detection sensor 182 may receive the signal from the inclinometer to determine an incline angle $\theta_{INC}$ of the occupant detection sensor.

The wall-mounted occupant detection sensor 182 may be configured to determine it is positioned incorrectly when the incline angle $\theta_{INC}$ is outside of a predetermined range. Upon determining that it is positioned incorrectly, the wall-mounted occupant detection sensor 182 may be configured to send a message (e.g., an alert) to a system controller that indicates that it is positioned incorrectly. The message may prompt a contractor or building manager to correct the tilt of the wall-mounted occupant detection sensor 182.

The wall-mounted occupant detection sensor 182 may generate a detection angle $\theta_{DETECT}$ based on the incline angle $\theta_{INC}$ (e.g., the detection angle $\theta_{DETECT}$ may be equal to the incline angle $\theta_{INC}$). The wall-mounted occupant detection sensor 182 may compensate for the tilt of the wall-mounted occupant detection sensor 182 using the detection angle $\theta_{DETECT}$. For example, the wall-mounted occupant detection sensor 182 may determine to set Y-coordinate value for the two-dimensional coordinate system 214 based on the detection angle $\theta_{DETECT}$. The wall-mounted occupant detection sensor 182 may be configured to determine an occupant count for the room as well as the locations (e.g., X-Z coordinates) of the occupants in the room (e.g., in the global coordinate system 222) using an occupant map that is generated using the detection angle $\theta_{DETECT}$. Similarly, the ceiling-mounted occupant detection sensor 180 may determine the set Z-coordinate value for the two-dimensional coordinate system 214 based on the detection angle $\theta_{DETECT}$, and may be configured to determine an occupant count for the room as well as the locations (e.g., X-Y coordinates) of the occupants in the room (e.g., in the global coordinate system 222) using an occupant map that is generated using the detection angle $\theta_{DETECT}$.

The occupant detection sensors 180, 182 may each transmit one or more messages (e.g., digital messages) to the system controller 110 via the RF signals 108 (e.g., using the proprietary protocol described herein) in response to determining an occupant count (e.g., a sensor occupant count) of the room 102 and/or an occupant count of a region of interest (e.g., an area of interest) of the room 102 (e.g., including a change thereof). The system controller 110 may be configured to maintain the occupant count for the room 102 (e.g., a room occupant count) and/or the occupant count for a region of interest of the room 102. Based on the occupant count, the system controller 110 may be further configured to determine an occupancy condition and/or a vacancy condition of the room 102. For example, when the occupant count is greater than zero, the system controller 110 may determine that the room 102 or a region of interest of the room 102 is occupied, and when the occupant count is zero, the system controller 110 may determine that the room 102 or the region of interest of the room 102 is vacant. It should be noted that the terms "area of interest" and "region of interest" are used interchangeably in the description provided herein.

The operation of the occupant detection sensors 180, 182 may be configured, for example, during the commissioning procedure of the load control system 100. Each of the occupant detection sensors 180, 182 may comprise one or more configuration buttons for setting operational characteristics (e.g., sensitivity, coverage area, etc.) of the occupant detection sensor. In addition, each occupant detection sensor 180, 182 may adjust the operational characteristics in response to receiving one or more messages via the RF signals 108. For example, the mobile device 140 may execute design software installed on the mobile device to allow for adjusting the operational characteristics of the occupant detection sensors 180, 182, and may transmit (e.g., directly transmit) messages including the operational characteristics to the occupant detection sensors, for example, using a short-range wireless protocol. The mobile device 140 may also transmit messages including the operational characteristics to the occupant detection sensors 180, 182 via the system controller 110. Further, each occupant detection sensor 180, 182 may be configured to learn and/or automatically adjust the operational characteristics of the occupant detection sensor (e.g., as will be described in greater detail below). Each occupant detection sensor 180, 182 may also be configured to acquire knowledge (e.g., bounds, dimensions, shape, etc.) of the room 102 and/or a region of interest of the room 102 (e.g., as will be described in greater detail below).

As previously mentioned, the occupant detection sensors 180, 182 may each transmit one or more messages including a determined occupant count (e.g., a sensor occupant count) to the system controller 110, which may maintain the occupant count for the room 102 (e.g., a room occupant count). The system controller 110 may be configured to receive messages transmitted by the ceiling-mounted occupant detection sensor 180 and/or the wall-mounted occupant detection sensor 182 (e.g., as well as other occupant detection sensors), and aggregate the occupant counts (or change thereof) indicated in those messages. The system controller 110 may be capable of resolving discrepancies between information reported by the ceiling-mounted occupant detection sensor 180 and the wall-mounted occupant detection sensor 182 (e.g., and information gathered from other occupant detection sensors and devices in the load control system 100). The system controller 110 may be configured to gather and/or store room occupant count data over time and thus maintain a historical view of the occupancy status of a room.

Each of the occupant detection sensors 180, 182 may be configured to perform some or all of the functions of the system controller 110. For example, the ceiling-mounted occupant detection sensor 180 may be capable of receiving information (e.g., digital messages) from the wall-mounted detection sensor 182 (e.g., or other occupant detection sensors) regarding an occupant count (or a change thereof) and/or an occupancy status of room 102. The ceiling-mounted occupant counting detection sensor 180 may be configured to process the received occupant count in conjunction with the occupant count determined by the ceiling-mounted occupant counting detection sensor 180 itself, and determine and maintain the room occupant count for the room 102. Similar to the system controller 110, each occupant detection sensor 180, 182 may be capable of resolving mismatches among various pieces of information received or derived by the occupant detection sensor.

Figure 2F:
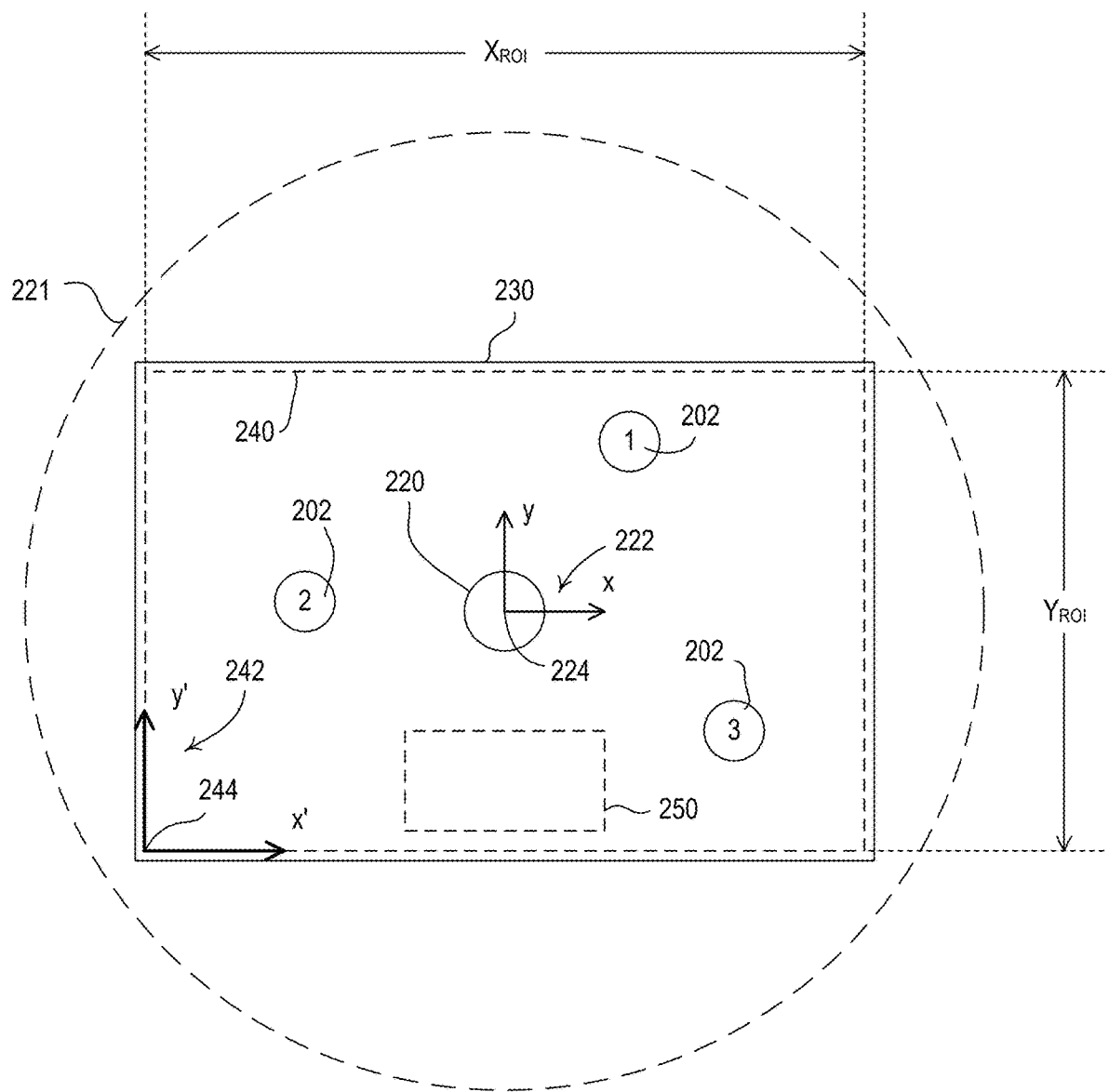

The occupant detection circuit of each of the occupant detection sensors 180, 182 may be configured to determine locations of occupants within the respective coverage areas 200, 210. FIG. 2F illustrates an example coverage area 221 of a ceiling-mounted occupant detection sensor 220 (e.g., the ceiling-mounted occupant detection sensor 180). The ceiling-mounted occupant detection sensor 220 may be configured to determine the locations of occupants as X-Y coordinates in a coordinate system, e.g., a global coordinate system 222 associated with (e.g., defined by) the occupant detection circuit of the ceiling-mounted occupant detection sensor 220. For example, the occupant detection circuit of the ceiling-mounted occupant detection sensor 220 may include a radar detection circuit characterized by a boresight (e.g., that may be set by antennas of the radar detection circuit). The direction of the boresight of the radar detection circuit may establish the x-axis of the global coordinate system 222 of the ceiling-mounted occupant detection sensor 220. The global coordinate system 222 may have an origin 224 (e.g., the (0, 0) coordinate) that may be located at the center of the coverage area 221 of the occupant detection sensor 220 (e.g., at a center point of the occupant detection sensor). The occupant detection sensor 220 may be configured to determine the number of occupants in a room 230 (e.g., the room 102) and/or movements of the occupants in response to the X-Y coordinates of the occupants as determined by the occupant detection circuit.

The occupant detection sensor 220 may be configured to detect (e.g., only detect) occupants in a region of interest (ROI) 240 within the coverage area 221 (e.g., within the room 230). The region of interest 240 may be associated with (e.g., characterized by) a coordinate system, e.g., a local coordinate system 242, having an origin 244 (e.g., the (0,0) coordinate) that may be located at one of the corners of the region of interest. For example, the boundaries of the region of interest 240 may be aligned with the walls of the room 230 (e.g., the x-axis and the y-axis of the local coordinate system 242 may be parallel and/or perpendicular to the walls of the room). The region of interest 240 may encompass, for example, the approximately the extents of the room 230. In addition, the occupant detection sensor 220 may be configured to ignore data regarding occupants in a masked region 250 within the region of interest 240. Among other purposes, the use of the region of interest(s) 240 and/or masked region(s) 250 may allow the occupant detection sensor 220 to focus on the occupants of just the room 230 and ignore moving bodies in other areas, for example, in a hallway outside of a doorway (e.g., the doorway 106). The term "masked region" may be used interchangeably herein with the term "masked area."

The occupant detection sensor 220 may be configured to determine the locations (e.g., X-Y coordinates) of the occupants within the local coordinate system 242 associated with (e.g., defined by) the region of interest 240. The global coordinate system 222 of the occupant detection sensor 220 may or may not be aligned with the local coordinate system 242 of the region of interest 240, for example, in terms of orientations and/or origins of the coordination systems. The occupant detection sensor 220 may be configured to determine and/or store a relationship between the global coordinate system 222 and local coordinate system 242. For example, when the local coordinate system 242 is not aligned with the global coordinate system 222 in terms of orientations of the coordinate systems, the occupant detection sensor 220 may be configured to determine a rotation angle $\varphi_R$ between the x-axis (or y-axis) of the global coordinate system 222 of the occupant detection sensor 220 and the x-axis (or y-axis) of the local coordinate system 242 of the region of interest 240. When the origin of the local coordinate system 242 is not aligned with the origin of the global coordinate system 222, the occupant detection sensor 220 may be configured to determine an offset vector ($x_{OFF}$, $y_{OFF}$) between the origin 224 of the global coordinate system 222 and the origin 244 of the local coordinate system 242. For example, a relationship between the global coordinate system 222 and the local coordinate system 242 may include the rotation angle $\varphi_R$ and/or the offset vector ($x_{OFF}$, $y_{OFF}$). The occupant detection sensor 220 may be configured to use the relationship between the global coordinate system 222 and the local coordinate system 242 to transform a location (x, y) from the global coordinate system 222 (e.g., as determined by the antennas of the radar detection circuit of the occupant detection sensor) into a location (x', y') in the local coordinate system 242. The ceiling-mounted occupant detection sensor 180 may be configured to use the location in the local coordinate system 242 and dimensions $X_{ROI}$, $Y_{ROI}$ of the region of interest 240 to determine if occupants are within the region of interest.

The region of interest 240 may be configured, for example, during a commissioning procedure of the load control system 100, and the occupant detection sensor 220 may acquire knowledge (e.g., learn) of the region of interest 240 during the commissioning procedure (e.g., by entering a learning mode). For example, a shape and/or dimensions of the region of interest may be selected using the configuration buttons on the occupant detection sensor 220 and/or design software executed on a programing device (e.g., the mobile device 140). For example, the shape of the region of interest may be selected from a list of standard shapes (e.g., circle, square, rectangle, etc.). The dimensions of the selected shape may be entered via the programming device (e.g., a radius for a circular region of interest, an edge length for a square region of interest, and/or a length and width for a rectangular region of interest). The shape and/or dimension information may then be transmitted (e.g., via wireless communication) to the occupant detection sensor 220. The occupant detection sensor 220 may be configured to determine the rotation angle $\varphi_R$ between the x-axis of the global coordinate system 222 of the occupant detection sensor and the x-axis of the region of interest 240, the offset vector ($x_{OFF}$, $y_{OFF}$), and/or the bounds/dimensions of the region of interest 242. For example, the coordinate system indicators may be used to establish and/or determine the rotation angle $\varphi_R$ between the x-axis of the global coordinate system of the occupant detection sensor 220 and the x-axis of the region of interest 240 (e.g., as will be described in greater detail below).

The occupant detection sensor 220 may be configured to learn the shape, boundaries, and/or dimensions of the region of interest. For example, the occupant detection sensors 220 may be placed into a learning mode (e.g., in response to an actuation of one of the configuration buttons and/or a message received from the mobile device 140) and an installer may walk around the perimeter of the room to identify the bounds of the region of interest while the occupant detection sensor is in the learning mode. The occupant detection sensor 220 may monitor the movements of the installer while in the learning mode and use the locations of the installer to set the shape, boundaries, and/or dimensions of the region of interest.

The occupant detection sensor 220 may be configured to monitor a small region of interest within a large region of interest with a different sensitivity (e.g., a higher sensitivity) than the remainder of the large region of interest (e.g., to focus more on the small region of interest within the large region of interest). For example, the occupant detection sensor 220 may be configured to detect movements of occupants within a room (e.g., within a large region of interest) using a first sensitivity level, and detect movements around a desk or keyboard (e.g., within a small region of interest within the room) using a second sensitivity level that may be greater than the first sensitivity level. The large and small regions of interest and/or the sensitivity levels used in each region may be configured, for example, during the commissioning procedure. In addition, the occupant detection sensor 220 may be configured to monitor a small region of interest within a large region of interest with a smaller sensitivity than the remainder of the large region of interest (e.g., to focus less on the small region of interest within the large region of interest). Further, multiple small regions of interest may be configured within a single large region of interest. For example, each of the multiple small regions of interest may have a different sensitivity than the other small regions of interest and the large region of interest.

The occupant detection sensor 220 may be configured to detect when an occupant enters or exits a region of interest (e.g., the region of interest 240 that encompasses approximately the extents of the room 230) and use this information to maintain and/or adjust the occupant count for the region of interest. The occupant detection sensor 220 may be configured to learn and/or store knowledge about an entry location (e.g., a doorway) within the region of interest 240. The occupant detection sensor 220 may be configured to track the movements of the occupants to and from the entry location in order to determine when an occupant enters or exits the room 230. The occupant counting sensor 220 may be configured to increase the occupant count when a person enters the room 230 and decrease the occupant count when a person leaves the room. The entry location may be set during the commissioning procedure of the occupant detection sensor 220. For example, the occupant counting sensor 220 may be placed in a learning mode (e.g., in response to an actuation of one of the configuration buttons and/or a message received from the programming device), and the installer may stand at the entry location in order to indicate the entry location to the occupant counting sensor. In addition, the occupant counting sensor 220 may each be configured to automatically learn the entry location, for example, in response to detecting occupants repetitively moving to and from a certain location along the perimeter of the coverage area 221 and/or region of interest 240 during normal operation. The occupant counting sensor 220 may be configured to set more than one entry location for a single room.

The occupant detection sensor 220 may be configured to detect one or more "noise" sources (e.g., a fan) in the coverage area and/or region of interest, and ignore these noise sources when determining the occupant count for the room 230 or a region of interest in the room 230. For example, the occupant detection sensor 220 may be configured to detect a noise source by identifying a harmonic target by its Doppler signature during normal operation. The occupant detection sensor 220 may set or be configured with a masked region over the identified noise source so that the noise source may be ignored when determining the occupant count for the room 230 during normal operation.

The occupant detection sensor 220 may each be configured to track specific occupants (e.g., record and update locations of the occupants) while those occupants are in the room 230. For example, the occupant detection sensor 220 may be configured to detect when a new occupant enters the room 230 (e.g., by detecting that the new occupant has a new tracking number and/or detecting that the new occupant is moving into the room from the entry location). When the new occupant is first detected, the occupant detection sensor 220 may assign the occupant a tracking number and/or an occupant identifier. The occupant detection sensor 220 may be configured to track the occupant as the occupant moves around the room 230 (e.g., using the occupant identifier), and track the occupant to a stationary location (e.g., if the occupant sits down at a desk or table). If the occupant "disappears" from the occupant data received from the occupant detection circuit while at the stationary location (e.g., due to minimal or no movement), the occupant detection sensor 220 may be configured to maintain the occupant count for the room 230 and location of the occupant. When the occupant disappears from the occupant data and then reappears, the occupant detection circuit may assign the occupant a new tracking number. However, the occupant detection sensor 220 may be configured to maintain the occupant identifiers for occupants that had been or are presently stationary. The occupant detection sensor 220 may be configured to detect that the occupant has exited the room 230 and cease tracking the occupant (e.g., by deleting the tracking number, the occupant identifier, and/or the location information of the occupant from a memory of the occupant detection sensor 220).

The occupant detection sensor 220 may also be configured to determine if the occupant has entered a static area, for example, an area surrounding a desk chair, where the occupant may sit for long periods of time (e.g., may be a stationary occupant). The occupant detection sensor 220 may be configured to maintain the occupant identifier and occupant location for occupants that have moved into a static area. A static area may be defined (e.g., during the commissioning procedure) by identifying a location within the region of interest and/or the corners or perimeter of the static area. Multiple static areas may be configured within the region of interest. The occupant detection sensor 220 may be configured to operate in a different mode of operation when the occupant has entered the static area. For example, the occupant detection sensor 220 may be configured to detect occupants in the room (e.g., a large region of interest) using a first sensitivity level when an occupant is not in the static area. When the occupant enters the static area, the occupant detection sensor 220 may then be configured to detect occupants in the room using the first sensitivity level and detect occupants in the static area (e.g., a small region of interest around a keyboard) using a second sensitivity level that is greater than the first sensitivity level.

Figure 2H:
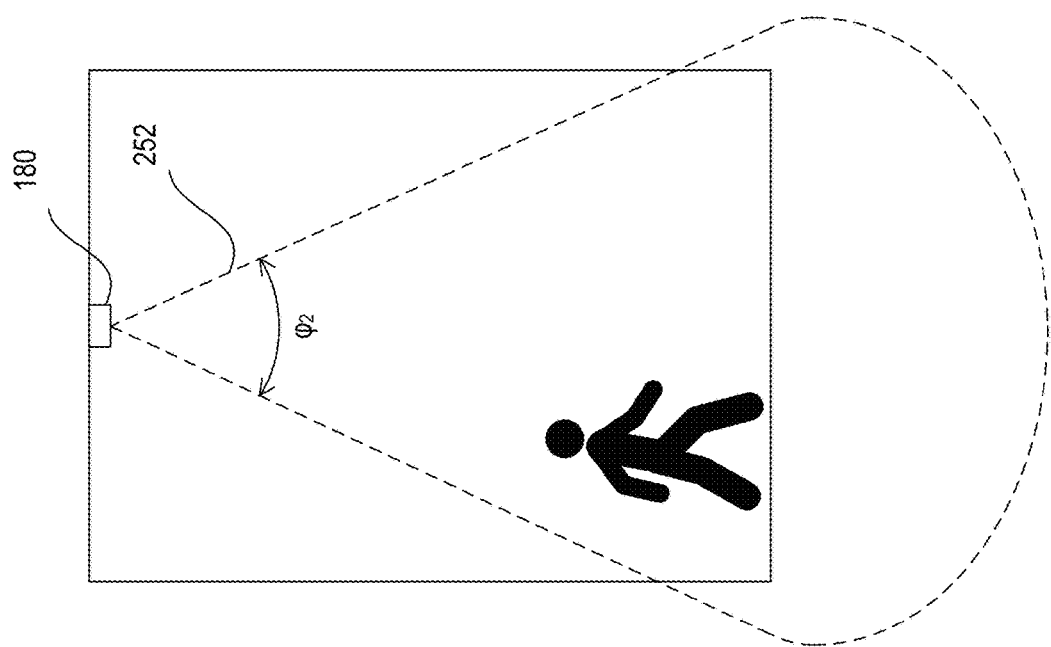
Figure 2G:
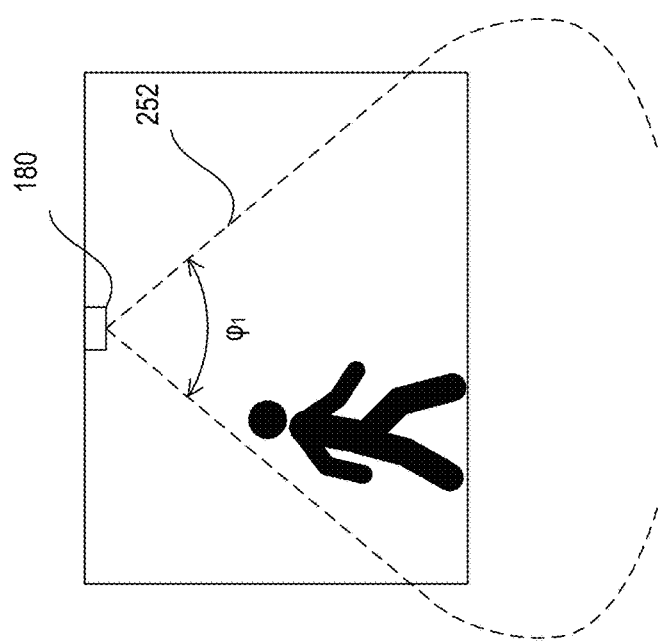

The occupant detection sensor 180 (e.g., which may be an example of the occupant detection sensor 220) may be configured to generate a beam 252 that defines the coverage area 200. The occupant detection circuit of the occupant detection sensor 180 may be configured to adjust an angle, e.g., a viewing angle $\theta_{VIEW}$, of the beam 252 of the occupant detection sensor 180, for example, based on the ceiling height of the room. FIGS. 2G and 2H illustrate examples of an occupant detection sensor 180 adopting different beamforming techniques to alter the viewing angle $\theta_{VIEW}$ (e.g., and thus the coverage area 221 at floor level) based on ceiling height. The occupant detection circuit may be configured with a larger (e.g., broader) viewing angle $\theta_{VIEW}$ when the distance between the ceiling and the floor is smaller, for example, as illustrated by a first viewing angle $\theta_{VIEW1}$ in FIG. 2G, and may be configured with a smaller (e.g., narrower) viewing angle $\theta_{VIEW}$ when the distance between the ceiling and the floor is greater, for example, as illustrated by the second viewing angle $\theta_{VIEW2}$ in FIG. 2H.

The occupant detection sensor 180 may adjust the viewing angle $\theta_{VIEW}$ by performing beamforming. In some examples, the occupant detection sensor 180 may use a beamforming lens (e.g., a Luneburg or Fresnel lens) to perform beamforming. For example, the occupant detection sensor 180 may be configured with one of a plurality of different lenses that adjust the viewing angle $\theta_{VIEW}$, where, for example, the lens may be adjusted by an installer (e.g., a beamforming lens that could be configured to be installed over an initial lens, installed over an opening in the enclosure (e.g., to the outside of the enclosure), and/or a cover that could be removed and an initial lens could be removed and replaced with the proper beamforming lens). For instance, the installer may measure the ceiling height, and the occupant detection sensor 180 may be fitted with one of a plurality of different beamforming lenses based on the ceiling height. In such examples, the occupant detection sensor 180 may receive and store an indication of the configured lens and/or the ceiling height. For example, the installer may enter the configured lens and/or the ceiling height into the occupant detection sensor 180 (e.g., by actuating one or more actuators on the occupant detection sensor) and/or enter the configured lens into a system controller, which may communicate the configured lens to the occupant detection sensor 180.

Alternatively or additionally, the occupant detection sensor 180 may be configured to detect (e.g., automatically detect) the ceiling height and switch between beamforming modes to adjust the viewing angle $\theta_{VIEW}$ based on the ceiling height. For example, the occupant detection sensor 180 may be configured with a static object detection algorithm that is used to measure (e.g., automatically measure) the ceiling height, and based on the ceiling height, the occupant detection sensor 180 may adjust the viewing angle $\theta_{VIEW}$ accordingly. For instance, the occupant detection sensor 180 may be configured with a plurality of beamforming techniques, and the occupant detection sensor 180 may select one beamforming technique based on the measured ceiling height to adjust the viewing angle $\theta_{VIEW}$. In some examples, occupant detection sensor 180 may perform beamforming by controlling an antenna array of the occupant detection sensor 180.

In some examples, the occupant detection sensor 180 may be configured to detect (e.g., automatically detect) the ceiling height, and transmits a message (e.g., directly or indirectly) to a mobile phone that causes the generation of a notification (e.g., via a display device of the mobile phone) that instructs the installer which lens to use. Further, in some examples, the occupant detection sensor 180 may use one of the beamforming techniques in response to an actuation of buttons on the sensor or a message received from the mobile phone.

The occupant detection sensor 180 may perform beamforming to optimize the fit between the coverage area 221 and the region of interest 240. For instance, when the occupant detection sensor 180 is located in a room having lower ceiling height, such as is illustrated in FIG. 2G, the occupant detection sensor 180 may be configured with a first viewing angle $\theta_{VIEW1}$, and when the occupant detection sensor 180 is located in a room having higher ceiling height, such as is illustrated in FIG. 2H, the occupant detection sensor 180 may be configured with a second viewing angle $\theta_{VIEW2}$. As such, the occupant detection sensor 180 may perform beamforming to generate the value of the viewing angle $\theta_{VIEW}$ that provides a close fit between the coverage area 221 and the region of interest 240, thereby enabling the occupant detection sensor 180 to sense the region of interest more precisely, and avoid sensing dead space high on the walls (e.g., when the viewing angle $\theta_{VIEW}$ is set too wide), while also ensuring a complete coverage of all areas that are part of the region of interest. A close fit between the coverage area 221 and the region of interest 240 may be defined as the coverage area 221 being within a certain percentage of the desired region of interest 240. Further, in some examples, the occupant detection sensor 180 may be configured to perform beamforming to ensure that the coverage area 221 is sized appropriately (e.g., reaches floor level and is large enough), and then the occupant detection sensor 180 may adjust the region of interest 240 to ensure it is a close fit with the coverage area.

Although described with reference to the ceiling-mounted occupant detection sensor 180, the wall-mounted occupant detection sensor 182 may be configured to adjust an angle, e.g., a viewing angle $\theta_{VIEW}$, of the beam 252 of the occupant detection sensor 182. For example, the wall-mounted occupant detection sensor 182 may be configured to adjust the viewing angle $\theta_{VIEW}$ of the beam 252 (e.g., between a first viewing angle $\theta_{VIEW1}$ and a second viewing angle $\theta_{VIEW2}$) based on the width of the room (e.g., in situations where the occupant detection sensor 182 is configured for a narrow hallway) and/or based on how far away the occupant detection sensor 182 is from the expected movement of occupants within the room.

Figure 3A:
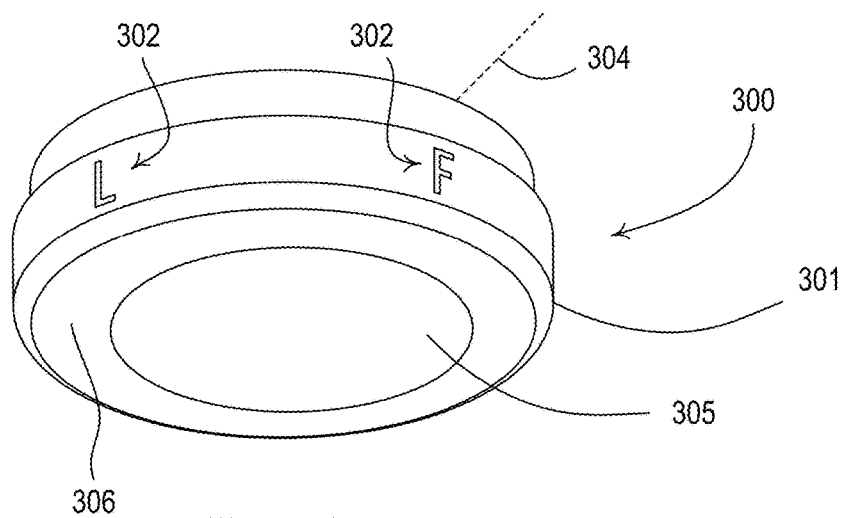
FIGS. 3A-3C are perspective views of example occupant detection devices.
Figure 3B:
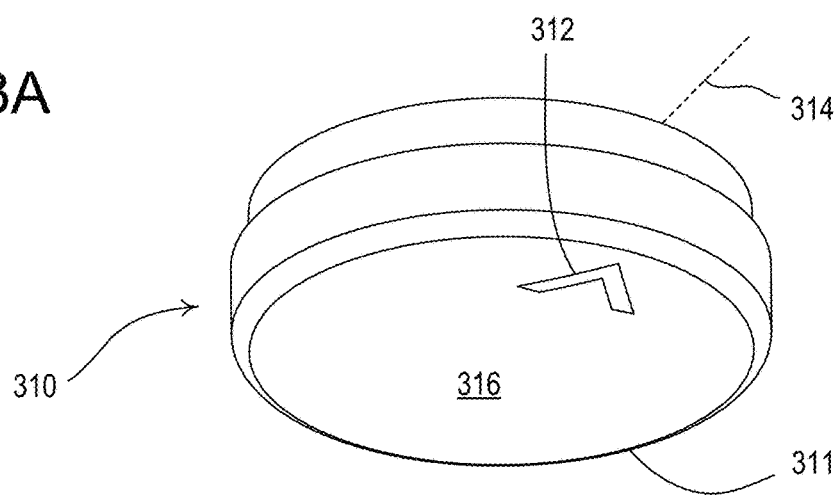
Figure 3C:
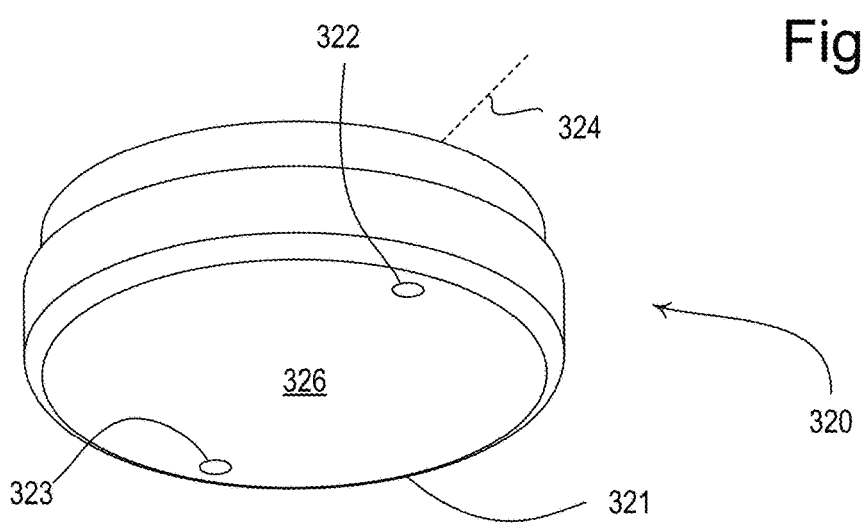

The ceiling-mounted occupant detection sensor 220 may comprise one or more coordinate system indicators (e.g., boresight indicators) to indicate the direction of the respective coordinate system (e.g., the directions of the x-axis and the y-axis of the global coordinate system 222). FIGS. 3A-3C are perspective views of example ceiling-mounted occupant detection sensors 300, 310, 320 (e.g., that may be deployed as the ceiling-mounted occupant detection sensor 180 and/or the ceiling-mounted occupant detection sensor 220). The occupant detection sensor 300 may comprise an enclosure 301 for housing an occupant detection circuit of the occupant detection sensor 300. For example, a perimeter of the occupant detection sensor 300 shown in FIG. 3A may be marked on the enclosure 301 with coordinate system indicators in the form of directional indicia 302, which may include the letters "F", "B", "R", and "L" indicating the front side, back side, right side, and left side of the occupant detection sensor, respectively. The directional indicia 302 may be formed as part of (e.g., molded or stamped into) the enclosure 301 of the occupant detection sensor 300 and/or may be printed on the enclosure 301 of the occupant detection sensor. The occupant detection sensor 300 may be characterized by a global coordinate system having an x-axis that may originate from the center of the occupant detection sensor and extend through the front of the occupant detection sensor (e.g., marked with the letter "F" as shown), for example, as shown by a line 304 in FIG. 3A. The direction indicia 302 may include the letters "N", "S", "E", and "W" indicating north, south, east, and west directions, respectively, of the occupant detection sensor (e.g., of the global coordinate system 222). The directional indicia 302 may also include the letters "X" and "Y" to indicate the direction of the x-axis and the y-axis of the global coordinate system 222. The occupant detection sensor 300 may also comprise a lens 305 (e.g., a beamforming lens, such as a Luneburg lens or a Fresnel lens) on a downward-facing surface 306 of the enclosure 301 of the occupant detection sensor 310.

Referring to FIG. 3B, the ceiling-mounted occupant detection sensor 310 may be marked with a coordinate system indicator in the form of a single indicium, such as an arrow 312, on an enclosure 311 of the occupant detection sensor 310 (e.g., an enclosure for housing an occupant detection circuit of the occupant detection sensor 310). The occupant detection sensor 310 may be characterized by a global coordinate system having an x-axis that may extend from the side of the occupant detection sensor marked by the directional indicium (e.g., from the side of the occupant detection sensor on which the arrow 312 is located and/or in the direction indicated by the arrow 312), for example, as shown by a line 314 in FIG. 3B. The arrow 312 may be located on a downward-facing surface 316 of the enclosure 311 of the occupant detection sensor 310 (e.g., so as to be easily viewed from below). The arrow 312 may be formed as part of (e.g., molded or stamped into) the occupant detection sensor 310 and/or may be printed on the enclosure 311 of the occupant detection sensor. The coordinate system indicator may comprise an indium, such as a triangle or dot, and/or other component, such as an illuminated element (e.g., a light-emitting diode). If the coordinate system indicator is a single indicium that indicates a direction (e.g., such as the arrow 312 or a triangle), the coordinate system indicator may also be centrally located on the downward-facing surface 316 of the enclosure 311 of the occupant detection sensor 310.

As shown in FIG. 3C, the ceiling-mounted occupant detection sensor 320 may comprise multiple (e.g., a pair of) coordinate system indicators, such as first and second light sources 322, 323, e.g., light-emitting diodes (LEDs), that may shine through openings 325 in an enclosure 321 of the occupant detection sensor 320 (e.g., an enclosure for housing an occupant detection circuit of the occupant detection sensor 310). For example, the first light source 322 may comprise a green LED and the second light source 323 may comprise a red LED. The occupant detection sensor 320 may be characterized by a coordinate system having an x-axis that may extend from the side of the occupant detection sensor on which the first light source 322 (e.g., the green LED) is located, for example, as shown by a line 324 in FIG. 3C. The first light source 322 may indicate the positive direction of the x-axis of the global coordinate system 222 and the second light source 323 may indicate the negative direction of the x-axis of the global coordinate system 222. The first and second light sources 322, 323 may be located on a downward-facing surface 326 of the enclosure 321 of the occupant detection sensor 320 (e.g., so as to be easily viewed from below the occupant detection sensor 320). The first and second light sources 322, 323 may also be located on the sides of the enclosure 321 of the occupant detection sensor 320.

The coordinate system indicators of the occupant detection sensor 220 (e.g., as shown on the occupant detection sensors 300-320 of FIGS. 3A-3C) may be used during installation/configuration of the occupant detection sensors (e.g., during the commissioning procedure of the load control system 100). For example, the coordinate system indicators may be used to position the x-axis of the global coordinate system 222 of the occupant detection sensor 220 to be aligned with (e.g., parallel or perpendicular to) the walls of the room 230.

Figure 4:
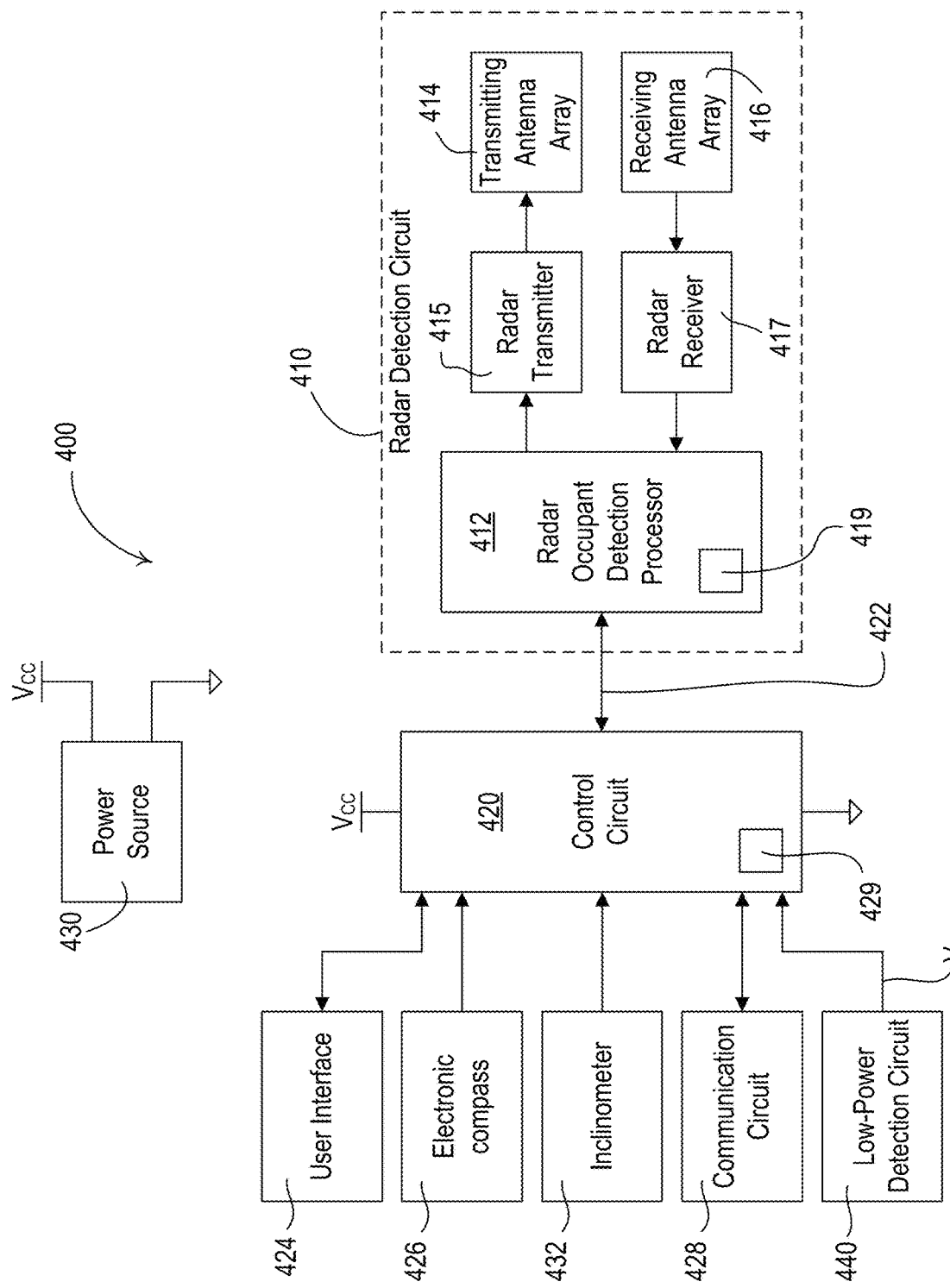
FIG. 4 is a block diagram of an example occupant detection sensor as described herein.

FIG. 4 is an example block diagram of an example sensor, such as an occupant detection sensor 400 (e.g., the ceiling-mounted occupant detection sensor 180 and/or the wall-mounted occupant detection sensor 182 of FIGS. 1, 2, and/or 3). The occupant detection sensor 400 may comprise a sensing circuit such as an occupant detection circuit, e.g., an image sensing circuit, such as a radar detection circuit 410 having a radar detection processor 412. The radar detection processor 412 may comprise, for example, one or more of a microprocessor, a microcontroller, a digital signal processor (DSP), a programmable logic device (PLD), an application specific integrated circuit (ASIC), a field-programmable gate array (FPGA), or any suitable processing device. The occupant detection circuit may comprise a visible image sensing circuit (e.g., including a camera), a thermal imaging circuit (e.g., including a thermopile array), a time-of-flight image sensing circuit, and/or any other sensing or imaging circuit capable of generating a two-dimensional or three-dimensional image or map of the locations of occupants in a room (e.g., the room 102, 230). An example of a visible light sensing circuit is described in greater detail in commonly-assigned U.S. Patent Application Publication No. 2017/0171941, published Jun. 15, 2017, entitled LOAD CONTROL SYSTEM HAVING A VISIBLE LIGHT SENSOR, the entire disclosure of which is hereby incorporated by reference.

The radar detection circuit 410 may also comprise a transmitting antenna array 414 (e.g., a phased array) coupled to the radar occupant detection processor 412 via a radar transmitter circuit 415, and a receiving antenna array 416 (e.g., a phased array) coupled to the radar detection processor 412 via a radar receiver circuit 417. For example, the radar detection circuit 410 may operate using a frequency-modulated continuous wave (FMCW) radar technology. The radar detection circuit 410 may also operate using other types of radar technology, such as, for example, pulsed radar, continuous wave radar, side aperture radar, phased-array radar, mono-static radar, multi-static radar, or other radar technology. The radar detection processor 412 may be configured to build a radar image (e.g., an occupant map) of the coverage area from the signals received from the receiving antenna array 416 (e.g., the phased array) via the radar receiver circuit 417.

The radar detection processor 412 may be configured to transmit a radar signal (e.g., a chirp) via the transmitting antenna array 414, and receive a reflected signal via the receiving antenna array 416. The radar signal may be a frequency-modulated continuous waveform (FMCW) that increases in frequency over a chirp interval $T_{CHIRP}$. The radar detection processor 412 may be configured to process the reflected signal (e.g., as compared to the transmitted radar signal) to determine a Doppler shift of the reflected signal and data regarding a moving body in the room, such as the distance to the moving body, a direction of movement of the moving body, and/or an acceleration of the moving body. The radar detection processor 412 may be configured to transmit a number of chirps $N_{CHIRP}$ during a radar detection event to determine the Doppler shift of the reflected signals due to the moving body in the room. Each radar detection event may last for a radar detection interval (e.g., approximately 5 milliseconds). For example, each radar detection event may include approximately 128 chirps, which may be equally spaced apart (e.g., having a constant frequency). The radar detection events may be spaced apart from each other by, for example, tens of milliseconds.

If two occupant detection sensors 400 are located near each other, the radar detection events of each occupant detection sensor may overlap, which may cause interference with the chirps of each radar detection event. The radar detection processor 412 may be configured to randomize a start time of each radar detection event to avoid consistent overlap of the radar detection events of nearby occupant detection sensors. For example, the radar detection processor 412 may be configured randomize the start time of each radar detection event in increments of 5 milliseconds.

The radar detection processor 412 may be configured to control the transmitting antenna array 414 and/or the receiving antenna array 416 to adjust an angle (e.g., a sweeping angle) and/or a set coordinate value (e.g., a Z-coordinate value or a Y-coordinate value) from the occupant detection sensor 400 at which the movement may be detected. The radar detection processor 412 may be configured to sweep through (e.g., periodically step through) various angles and/or a set coordinate value and determine data regarding the moving body at each angle and/or a set coordinate value. At each angle and/or a set coordinate value, the radar detection processor 412 may transmit a radar signal and receive a reflected signal to process. The radar detection processor 412 may be configured to build a map or image (e.g., a two-dimensional or three-dimensional map or image) of the moving objects in the room from the determined data regarding the moving bodies at each angle. The radar detection processor 412 may be configured to determine an occupant count for the room as well as the locations (e.g., X-Y coordinates in the case of a ceiling-mounted sensor, or the X-Z coordinate in the case of a wall-mounted sensor) of the occupants in the room (e.g., in the global coordinate system 222). The radar detection processor 412 may assign a unique tracking number to each detected occupant in the space.

In the case of a ceiling-mounted occupant detection sensor, if, for example, the occupant detection sensor 400 is mounted perfectly flush to the ceiling and the planes defined by the ceiling and floor are parallel with one another, the detection angle $\theta_{DETECT}$ is essentially zero, and the radar detection processor 412 may be configured to sweep through (e.g., periodically step through) various Z-coordinate values and determine data regarding the moving body at each Z-coordinate value. However, if the occupant detection sensor 400 is either mounted at a tilt and/or the ceiling and floor are not parallel with one another (e.g., the ceiling is pitched at an angle), the occupant detection sensor 400 may be configured to determine the incline angle $\theta_{INC}$, determine the detection angle $\theta_{DETECT}$ based on the incline angle $\theta_{INC}$, and then use the detection angle $\theta_{DETECT}$ when stepping through various Z-coordinate values to determine data regarding the moving body at each Z-coordinate value.

Similarly, in the case of a wall-mounted occupant detection sensor, if, for example, the occupant detection sensor 400 is mounted perfectly flush to the wall and the planes defined by the wall and floor are perpendicular with one another, the detection angle $\theta_{DETECT}$ is essentially zero, and the radar detection processor 412 may be configured to sweep through (e.g., periodically step through) various Y-coordinate values and determine data regarding the moving body at each Y-coordinate value. However, if the occupant detection sensor 400 is either mounted at a tilt and/or the wall and floor are not perpendicular with one another (e.g., the wall is pitched at an angle), the occupant detection sensor 400 may be configured to determine the incline angle $\theta_{INC}$, determine the detection angle $\theta_{DETECT}$ based on the incline angle $\theta_{INC}$, and then use the detection angle $\theta_{DETECT}$ when stepping through various Y-coordinate values to determine data regarding the moving body at each Y-coordinate value.

The occupant detection sensor 400 may also comprise a control circuit 420 that may be connected to the radar detection processor 412 of the radar detection circuit 410 via a communication bus 422. The control circuit 420 may comprise, for example, a microprocessor, a programmable logic device (PLD), a microcontroller, an application specific integrated circuit (ASIC), a field-programmable gate array (FPGA), or any suitable processing device. The control circuit 420 may be configured to receive the occupant count for the room as well as the tracking numbers and the locations (e.g., X-Y coordinates) of the occupants in the room from the radar detection processor 412 via the communication bus 422. Any of the functions and/or procedures executed by the control circuit 420 as described herein could also be implemented (e.g., fully implemented) by the radar detection processor 412.

The occupant detection sensor 400 may comprise one or more memory circuits for storing the occupant count, occupant identifiers, occupant locations, and/or occupancy status (e.g., whether an occupant is stationary). The memory circuit(s) may be implemented as an external integrated circuit (IC) coupled to the control circuit 420 or as an internal circuit of the control circuit 420 and/or the radar detection processor 412. For example, the control circuit 420 may comprise an internal memory 429 and/or the radar detection processor 412 may comprise an internal memory 419. The control circuit 420 may be configured to save different occupant counts that are associated with different time periods in the memory circuit(s) so that a historical view of the occupancy condition of the room (e.g., a usage history) may be derived.

The occupant detection sensor 400 may comprise a user interface 424 including one or more actuators that may be used to configure the occupant detection sensor (e.g., during the commissioning procedure of the load control system 100 of FIG. 1). For example, the user interface 424 may comprise one or more configuration buttons configured to be actuated to cycle through options that define the region of interest of the occupant detection sensor 400. In addition, the user interface 424 may comprise a potentiometer having a knob and/or a digital rotary switch configured to be rotated to adjust a value that defines the region of interest of the occupant detection sensor 400 (e.g., such as the rotation angle $\theta_R$). Further, the user interface 424 may comprise other input devices, such as a digital DIP switch. The occupant detection sensor 400 may also comprise a compass (e.g., an electronic compass 426) for determining the direction of true north, which may be used to configure the occupant detection sensor, for example, during the commissioning procedure of the load control system 100. In addition, a potentiometer and/or digital rotary switch of the user interface 624 may be used to determine the direction of true north.

The occupant detection sensor 400 may comprise a communication circuit 428 configured to transmit and/or receive messages (e.g., digital messages) via a communication link using a communication protocol. For example, the communication link may comprise a wireless communication link and the communication circuit 428 may comprise an RF transceiver coupled to an antenna. The communication link may comprise a wired digital communication link and the communication circuit 428 may comprise a wired communication circuit. The communication protocol may comprise a proprietary protocol, such as, for example, the ClearConnect protocol. The control circuit 420 may be configured to transmit and/or receive digital messages via the communication link during normal operation of the occupant detection sensor 400. For example, the control circuit 420 may be configured to transmit an indication of a determined occupant count (or a change thereof) of the room to a system controller (e.g., the system controller 110 of FIG. 1). The control circuit 420 may also be able to receive an indication of an occupant count (or a change thereof) of the room determined by another occupant detection sensor. In the latter case, the occupant detection sensor 400 may perform some or all of the functions of a system controller, as described herein.

The occupant detection sensor 400 may comprise a power source 430 for producing a DC supply voltage $V_{CC}$ for powering the radar detection circuit 410, the control circuit 420, the communication circuit 428, and other low-voltage circuitry of the occupant detection sensor 400. The power source 430 may comprise a power supply configured to receive an external supply voltage from an external power source (e.g., an AC mains line voltage power source and/or an external DC power supply). Alternatively or additionally, the power source 430 may comprise a battery for powering the circuitry of the occupant detection sensor 400.

The occupant detection sensor 400 may comprise an inclinometer 432. The inclinometer 432 may be configured to measure the slope (or tilt), elevation, and/or depression of the occupant detection sensor 400 (e.g., relative to an artificial horizon). For example, the inclinometer 432 may measure the slope (or tilt), elevation, and/or depression of the occupant detection sensor 400 and output a signal indicative of the slope (or tilt), elevation, and/or depression of the occupant detection sensor 400 to the control circuit 420. The control circuit 420 may ensure that the occupant detection sensor 400 is position correctly (e.g., positioned at the correct slope) using the inclinometer 432. For example, the control circuit 420 may receive the signal from the inclinometer 432 to determine an incline angle $\theta_{INC}$ of the occupant detection sensor 400. The incline angle $\theta_{INC}$ may be the angle from which a ceiling-mounted occupant detection sensor deviates perpendicular to the direction of gravity (e.g., the difference between a level angle and an angle at which the occupant detection sensor 400 actually is oriented) and/or the angle from which a wall-mounted occupant detection sensor deviates parallel to the direction of gravity (e.g., the difference between a level angle and an angle at which the occupant detection sensor 400 actually is oriented). Further, as described in more detail herein, the control circuit 420 may be configured to transmit an indication of an incline error if the incline angle $\theta_{INC}$ of the occupant detection sensor 400 falls outside of a particular range.

In some examples, the control circuit 420 may be configured to compensate for an error if the incline angle $\theta_{INC}$ of the occupant detection sensor 400 falls outside of a predetermined range. For example, the control circuit 420 of a ceiling-mounted occupant detection sensor may be configured to determine the detection angle $\theta_{DETECT}$ based on the deviation of the incline angle $\theta_{INC}$ of the occupant detection sensor 400 from a level angle (e.g., 0 degrees). For instance, the control circuit 420 may determine the detection angle $\theta_{DETECT}$ based on the incline angle $\theta_{INC}$ (e.g., the detection angle $\theta_{DETECT}$ may be set to equal the incline angle $\theta_{INC}$). The ceiling-mounted occupant detection sensor may determine the set Z-coordinate value for the two-dimensional coordinate system based on the detection angle $\theta_{DETECT}$. The ceiling-mounted occupant detection sensor may be configured to determine an occupant count for the room as well as the locations (e.g., X-Y coordinates) of the occupants in the room (e.g., in the global coordinate system 222) using an occupant map that is generated using the detection angle $\theta_{DETECT}$.

Similarly, the control circuit 420 of a wall-mounted occupant detection sensor may be configured to adjust the setting of the Y-coordinate value based on the deviation of the incline angle $\theta_{INC}$ of the occupant detection sensor 400 from the particular range. For instance, the control circuit 420 may determine the detection angle $\theta_{DETECT}$ based on the incline angle $\theta_{INC}$ (e.g., the detection angle $\theta_{DETECT}$ may be set to equal the incline angle $\theta_{INC}$). The wall-mounted occupant detection sensor may determine the set Y-coordinate value for the two-dimensional coordinate system based on the detection angle $\theta_{DETECT}$. The wall-mounted occupant detection sensor may be configured to determine an occupant count for the room as well as the locations (e.g., X-Z coordinates) of the occupants in the room (e.g., in the global coordinate system 222) using an occupant map that is generated using the detection angle $\theta_{DETECT}$.

The occupant detection sensor 400 may further comprise a low-power detection circuit 440 (e.g., a low-power occupancy detection circuit), such as a passive infrared (PIR) detector circuit, that may include, for example, a pyroelectric detector. The low-power detection circuit 440 may generate a PIR detect signal $V_{PIR}$ (e.g., a low-power occupancy signal) that may indicate an occupancy and/or vacancy condition in the space in response to detected infrared energy in the room. For example, the low-power detection circuit 440 may drive the magnitude of the PIR detect signal $V_{PIR}$ high (e.g., towards the supply voltage $V_{CC}$) in response to detecting one or more occupants in the room, and drive the magnitude of the PIR detect signal $V_{PIR}$ low (e.g., towards circuit common) in response to detecting no occupants in the room. The low-power detection circuit 440 may consume less power than the radar detection circuit 410. However, the control circuit 420 may be configured to more accurately determine the occupant count in the room using the radar detection circuit 410 (e.g., rather than the low-power detection circuit 440). For example, when the power source 430 is a battery, the control circuit 420 may be configured to disable the radar detection circuit 410 when the low-power detection circuit 440 indicates that the room is vacant. The control circuit 420 may detect an occupancy condition in the space in response to the PIR detect signal $V_{PIR}$ and may subsequently enable the radar detection circuit 410 to determine the occupant count of the room. The control circuit 420 may enable the radar detection circuit 410 after detecting an occupancy condition in the space in response to the PIR detect signal $V_{PIR}$. The control circuit 420 may also keep the radar detection circuit 410 enabled after detecting an occupancy condition in the space (e.g., in response to the PIR detect signal $V_{PIR}$). The control circuit 420 may keep the radar detection circuit 410 enabled until the PIR detect signal $V_{PIR}$ indicates that the space is vacant.

The control circuit 420 may configure the operation of the radar detection circuit 410, for example, by transmitting signals to the radar detection processor 412 via the communication bus 422. The control circuit 420 may configure the operation of the radar detection circuit 410 in response to actuation of the configuration buttons of the user interface 424 and/or receiving messages via the communication circuit 428. For example, the control circuit 420 may be configured to adjust a sensitivity of the occupant detection sensor 400 by adjusting a radar signal-to-noise ratio (SNR) threshold of the radar detection processor 412. In addition, the radar detection processor 412 and/or the control circuit 420 may be configured to adjust the sensitivity of the occupant detection sensor 400 by adjusting a required size of an identified moving body (e.g., to filter out small moving bodies).

The control circuit 420 may be configured to detect occupants within a region of interest of a coverage area of the occupant detection sensor 400. For example, the control circuit may increase the occupant count in response to occupants having a location (e.g., X-Y coordinate) that falls within the region of interest. The region of interest may be defined by one or more X-Y coordinates, for example, by the corners of a square or rectangle, or by the center of a circle of a prescribed radius. The control circuit 420 may also be configured to detect occupancy in a small region of interest within a large region of interest. For example, the control circuit 420 may be configured to detect movement within a room (e.g., within a large region of interest) using a first detection threshold, and detect movement around a keyboard (e.g., within a small region of interest within the room) using a second detection threshold that may be lower than the first detection threshold or by adjusting the velocity threshold of the Doppler processing (e.g., filter out slow or fast moving objects).

Figures 5A, 5B:
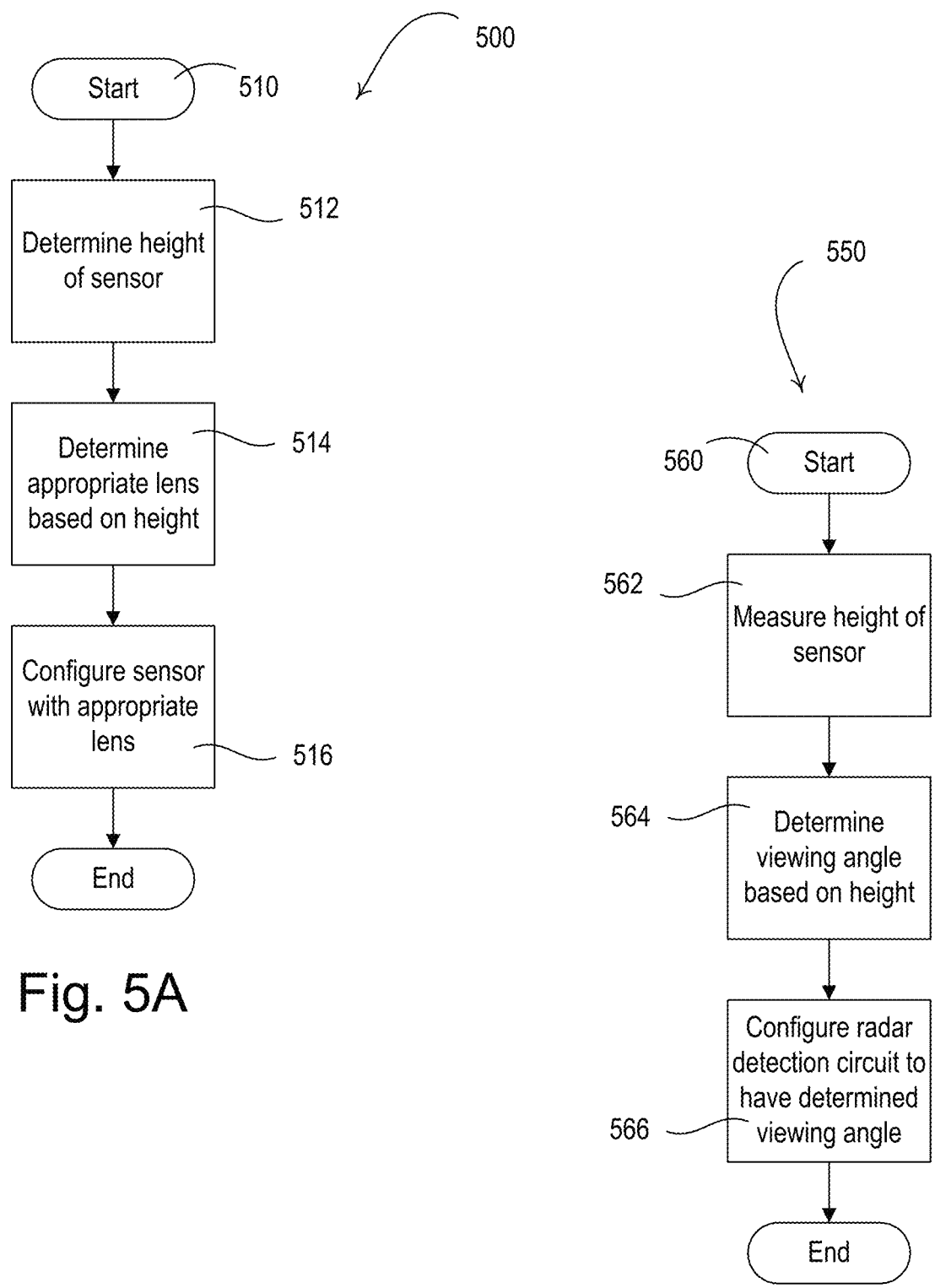

FIG. 5A is a flowchart of an example configuration procedure 500 that may be executed to configure an occupant detection sensor (e.g., the ceiling-mounted occupant detection sensor 180, the wall-mounted occupant detection sensor 182, and/or the occupant detection sensor 400). For example, the configuration procedure 500 may be executed to configure the occupant detection sensor with one of a plurality of different lenses based on the ceiling height of the room to alter the viewing angle $\theta_{VIEW}$ of the occupant detection sensor (e.g., as shown in FIGS. 2G and 2H). For example, the configuration procedure 500 may be performed by an installer, such as when installing the occupant detection sensor. The configuration procedure 500 may be used to determine a beamforming lens to be installed on the occupant detection sensor, for example depending on the height of the ceiling (e.g., the ceiling to which the occupant detection sensor is mounted).

The configuration procedure 500 may begin at 510. At 512, the height of the occupant detection sensor may be determined (e.g., the height of the ceiling to which the occupant detection sensor is mounted). In some examples, the height of the occupant detection sensor may be determined by an installer, e.g., by manually measuring the distance from the occupant detection sensor to a floor over which the occupant detection sensor is installed or will be installed. Alternatively, the height of the occupant detection sensor may be determined (e.g., automatically determined) by the occupant detection sensor itself and/or using a mobile device. At 514, an appropriate lens (e.g., a beamforming lens, such as a Fresnel or Luneburg lens) may be determined based on the measured height. In some examples, the appropriate lens is determined based on a desired focal length of the beam generated by the occupant detection sensor. For example, a lens characterized by a narrower viewing angle (e.g., and a greater focal length) may be selected when the measured height of the ceiling is higher, and a lens characterized by a broader viewing angle (e.g., and a lesser focal length) may be selected when the measured height of the ceiling is lower (e.g., causing the radar beam to diverge more quickly). In some examples, an installation sheet or mobile application that is used to install the occupant detection sensor may include a mapping between the ceiling height and the recommended lens and/or viewing angle. Further, in some examples, the mobile device may be configured to make a recommendation of a lens to sue with the occupant detection sensor. For instance, the mobile device may determines the lens to use by comparing the measured height to a threshold, where a first lens is recommended when the measured height is above the threshold and a second lens is recommended when the measured height is below the threshold.

At 516, the occupant detection sensor may be configured with the selected lens. For example, the installer may attach the selected lens on the occupant detection sensor (e.g., the lens may be snapped onto the occupant detection sensor). Further, in some examples, the occupant detection sensor may calibrate one or more operating conditions based on the installed lens. For example, the occupant detection sensor receive and store an indication of the particular installed lens, and may configure one or more operating conditions (e.g., beamforming techniques, detection angles, etc.) based on the installed lens.

FIG. 5B is a flowchart of an example configuration procedure 550 that may be executed to configure an occupant detection sensor (e.g., the ceiling-mounted occupant detection sensor 180, the wall-mounted occupant detection sensor 182, and/or the occupant detection sensor 400) for beamforming. For example, a control circuit of the occupant detection sensor may execute the configuration procedure 550 to configure the viewing angle $\theta_{VIEW}$ of the occupant detection sensor based on the ceiling height of the room. The control circuit of the occupant detection sensor may be configured to perform the configuration procedure 550 when the occupant detection sensor first installed, in response to a configuration procedure initiated by an installer, and/or periodically. The configuration procedure 550 may be used to configure a radar detection circuit (e.g., the radar detection circuit 410) of the occupant detection sensor, for example, depending on the height of the ceiling (e.g., the ceiling to which the occupant detection sensor is mounted).

The configuration procedure 550 may begin at 560. At 562, the control circuit of the occupant detection sensor may determine the height of the occupant detection sensor (e.g., the height of the ceiling to which the occupant detection sensor is mounted). In some example, the control circuit may determine the height automatically. For example, the control circuit may determine the height using a static object detection algorithm of the radar detection circuit. Further, in some examples, the occupant detection sensor may include a button or a switch that may enable the selection of the ceiling height (e.g., options such as "High Ceiling" and "Low Ceiling"). In other examples, the control circuit may receive the height, for example, manually (e.g., by actuating a button or switch on the occupant detection sensor), or from a mobile device (e.g., the mobile device 140) or a system controller (e.g., the system controller 110). For example, the system controller or a mobile device may determine the height of the occupant detection sensor, and transmit the height to the control circuit of the occupant detection sensor. Alternatively or additionally, the height of the room may be measured by a user and then entered into the system controller or mobile device via a graphical user interface (GUI), for example, a GUI of an app running on a mobile device or system controller.

At 564, the control circuit may determine a viewing angle $\theta_{VIEW}$ based on the height of the occupant detection sensor (e.g., as determined automatically or manually based on a received height calculated by an installer). For example, the control circuit may determine a first viewing angle $\theta_{VIEW1}$ when the ceiling is a first height that is greater than a height threshold, and a second viewing angle $\theta_{VIEW2}$ when the ceiling is a second height that is less than the height threshold, where the first viewing angle $\theta_{VIEW1}$ is narrower than the second viewing angle $\theta_{VIEW2}$. For instance, in some examples, the height of the occupant detection sensor may be entered into the system controller or mobile device, and the occupant detection sensor may receive the height from the system controller or mobile device and compare the height to the height threshold. In examples where the occupant detection sensor comprises a button or switch for the selection of the ceiling height, an installation sheet provided with the occupant detection sensor may provide instructions about which option to select based on a manually measured height of the occupant detection sensor. Further, in some examples, the occupant detection sensor may be configured with multiple values of the viewing angle that are between the first and second viewing angles, and the occupant detection sensor may be configured to select one of a plurality of viewing angles (e.g., three or more viewing angles) based on the height of the occupant detection sensor.

At 566, the control circuit may configure the radar detection circuit in accordance with the selected viewing angle $\theta_{VIEW}$. For example, the control circuit may use the beamforming capability of the radar detection circuit to adjust the viewing angle $\theta_{VIEW}$ of the occupant detection sensor. For instance, the radar detection circuit may be configured to control a transmitting antenna array (e.g., the transmitting antenna array 414) using various beamforming techniques to adjust viewing angle $\theta_{VIEW}$ of the radar detection circuit, and the control circuit may configure the radar detection circuit with a beamforming technique that corresponds to the viewing angle $\theta_{VIEW}$ that is selected based on the height of the occupant detections sensor. After configuring the radar detection circuit to have the selected viewing angle $\theta_{VIEW}$ at 566, the configuration procedure 550 may exit.

The occupant detection sensor may be configured to compensate for situations where the sensor is not mounted flush with the ceiling (e.g., parallel with the floor) or flush with the wall (e.g., perpendicular with the floor). For instance, as noted herein, the occupant detection sensor may generate an occupant map, which may be a 2D radar image indicating the locations of the occupants within the coverage area. In some examples, a ceiling-mounted occupant detection sensor may ignore (e.g., discard) the Z-coordinate information determined by the occupant detection circuit and/or set the Z-coordinate to a value (e.g., a constant value) and determine the X-Y coordinates of the occupants at that particular value of the Z-coordinate. Similarly, a wall-mounted occupant detection sensor may ignore (e.g., discard) the Y-coordinate information determined by the occupant detection circuit and/or set the Y-coordinate to a value (e.g., a constant value) and determine the X-Z coordinates of the occupants at that particular value of the Y-coordinate. When the occupant detection sensor is mounted appropriately (e.g., mounted flush with the ceiling (e.g., parallel with the floor), or flush with the wall (e.g., perpendicular with the floor))), the occupant detection sensor may set the detection angle $\theta_{DETECT}$ to zero. However, when the occupant detection sensor is mounted at a tilt (e.g., not mounted flush with the ceiling (e.g., parallel with the floor) or with the wall (e.g., perpendicular with the floor)), the occupant map may not be representative of the occupants across the space (e.g., the occupant map may be captured at an angle). To compensate for this tilt, the occupant detection sensor may determine a non-zero value for the detection angle $\theta_{DETECT}$, and use the detection angle $\theta_{DETECT}$ when generating the occupant map for the space.

Figure 6A:
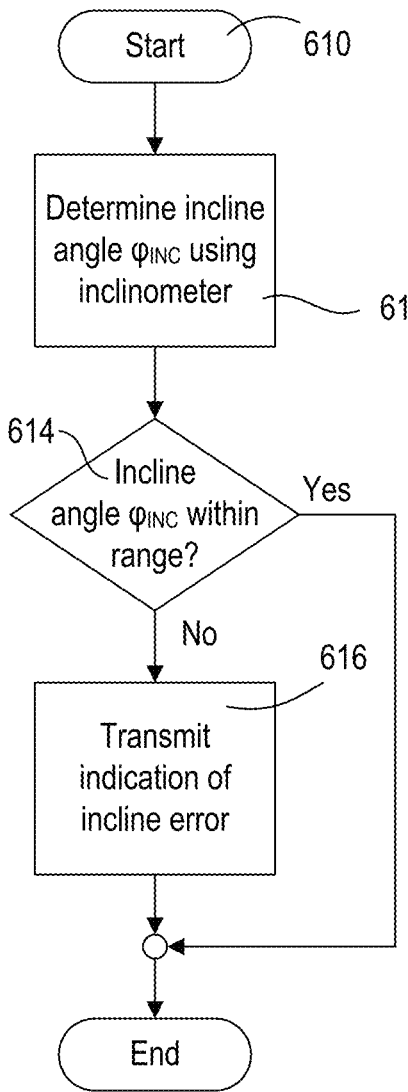

FIG. 6A is a flowchart of an example configuration procedure 600 that may be executed by an occupant detection sensor (e.g., the ceiling-mounted occupant detection sensor 180, the wall-mounted occupant detection sensor 182, and/or the occupant detection sensor 400). For example, a control circuit of the occupant detection sensor may execute the configuration procedure 600 to detect an incline angle $\theta_{INC}$ (e.g., as shown in FIG. 2E) of the occupant detection sensor using an inclinometer (e.g., the inclinometer 432), and provide an error message when the incline angle is outside of a predetermined range (e.g., between 0-3 degrees). The control circuit may be configured to perform the configuration procedure 600 when the occupant detection sensor is first installed, during a commissioning procedure initiated by an installer, and/or periodically.

The configuration procedure 600 may begin at 610. At 612, the control circuit may determine the incline angle $\theta_{INC}$ for example, using the inclinometer. For example, the inclinometer may generate and output a signal that is indicative of the incline angle $\theta_{INC}$, and the control circuit may receive and convert the signal into the incline angle $\theta_{INC}$. The incline angle $\theta_{INC}$ may be the angle from which a ceiling-mounted occupant detection sensor (e.g., the angle of the center of the beam generated by the sensor) deviates parallel to the direction of gravity. The incline angle $\theta_{INC}$ may be the difference between the angle of a wall-mounted occupant detection sensor and perpendicular to the floor. At 614, the control circuit may determine whether the incline angle $\theta_{INC}$ is within a range (e.g., between 0-3 degrees). The range may be an acceptable degree of levelness of the occupant detection sensor (e.g., for proper or ideal functioning of the occupant detection sensor).

If the occupant detection circuit determines the incline angle $\theta_{INC}$ is within the range at 614, the control circuit may exit the control procedure 600. If the control circuit determines the incline angle $\theta_{INC}$ is not within the range, the control circuit may generate and transmit an indication of an incline error at 616. The indication may indicate the particular incline angle $\theta_{INC}$ of the occupant detection sensor, the difference between the incline angle $\theta_{INC}$ and the maximum angle of the range, and/or simply indicate that the incline angle $\theta_{INC}$ of the occupant detections sensor is not within the range. The control circuit may transmit the indication of the incline error to a system controller (e.g., the system controller 110) and/or a mobile device (e.g., the mobile device 140). Alternatively or additionally, the control circuit may illuminate one or more light sources (e.g., LEDs) of the occupant detection sensor to indicate the incline error. In response, the installer may manually adjust the incline of the occupant detection sensor in response to receiving the indication of the incline error.

Figure 6B:
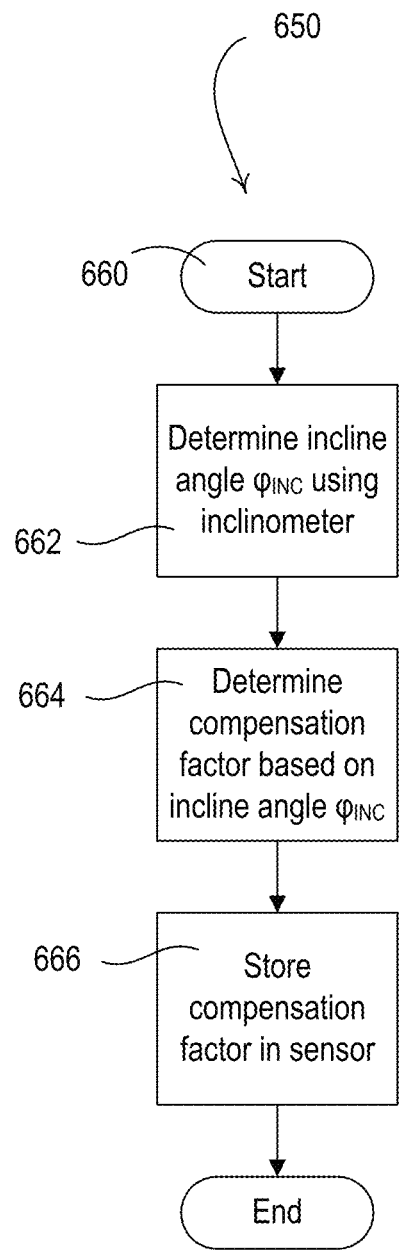

FIG. 6B is a flowchart of an example configuration procedure 650 that may be executed by an occupant detection sensor (e.g., the ceiling-mounted occupant detection sensor 180, the wall-mounted occupant detection sensor 182, and/or the occupant detection sensor 400) to detect an incline angle $\theta_{INC}$ (e.g., as shown in FIG. 3E) of the occupant detection sensor. For example, a control circuit of the occupant detection sensor may execute the configuration procedure 650 to detect the incline angle $\theta_{INC}$ of the occupant detection sensor using an inclinometer (e.g., the inclinometer 432), and determine a compensation factor based on the determined incline angle $\theta_{INC}$. In some examples, the compensation factor is the detection angle $\theta_{DETECT}$ described herein (e.g., as shown in FIG. 3E). The control circuit may be configured to perform the configuration procedure 650 when the occupant detection sensor is first installed, in response to a configuration procedure initiated by an installer, and/or periodically.

The configuration procedure 650 may begin at 660. At 662, the control circuit may determine the incline angle $\theta_{INC}$ using the inclinometer. The incline angle $\theta_{INC}$ may be the angle a ceiling-mounted occupant detection sensor deviates from parallel to the direction of gravity (e.g., the difference between being flush with a ceiling that is parallel with the floor and the angle to which the occupant detection sensor actually mounted). The incline angle $\theta_{INC}$ may be the difference between the angle of a wall-mounted occupant detection sensor and perpendicular to the floor (e.g., the difference between being flush to a wall that is perpendicular to the floor and the angle to which the occupant detection sensor actually mounted).

At 664, the control circuit may determine a compensation factor (e.g., the detection angle $\theta_{DETECT}$ as shown in FIG. 2E) based on the incline angle $\theta_{INC}$. At 666, the control circuit may store the determined compensation factor in memory (e.g., the internal memory 429). The control circuit may use the compensation factor to account for the incline angle $\theta_{INC}$ during normal operation. For example, the control circuit may adjust the viewing angle $\theta_{VIEW}$, adjust the detection angle $\theta_{DET}$, adjust how a radar image (e.g., an occupant map) of the coverage area is generated, and/or adjust how reflected signals are processed based on the compensation factor. For instance, the occupant detection circuit may perform beamforming using the antenna array to adjust the viewing angle $\theta_{VIEW}$ based on the compensation factor. Alternatively or additionally, the control circuit may adjust how a radar image of the coverage area is generated from the signals received from the receiving antenna array based on the compensation factor.

For example, when the occupant detection sensor is mounted correctly (e.g., parallel with the floor in the case of a ceiling-mounted sensor, or perpendicular with the floor in the case of a wall-mounted sensor), the compensation factor (e.g., the detection angle $\theta_{DETECT}$) may be zero. When the occupant detection sensor is mounted at a tilt (e.g., not perpendicular with the floor in the case of a ceiling-mounted sensor, or not parallel with the floor in the case of a wall-mounted sensor), the compensation factor (e.g., the detection angle $\theta_{DETECT}$) may be non-zero. Further, in some examples, the control circuit may process the reflected signals to determine a Doppler shift of the reflected signals and data regarding a moving body in the room (e.g., the distance to the moving body, a direction of movement of the moving body, and/or an acceleration of the moving body) based on the compensation factor. Accordingly, the control circuit may compensate for the incline angle $\theta_{INC}$ of the occupant detection sensor during normal operation.

Figure 7:
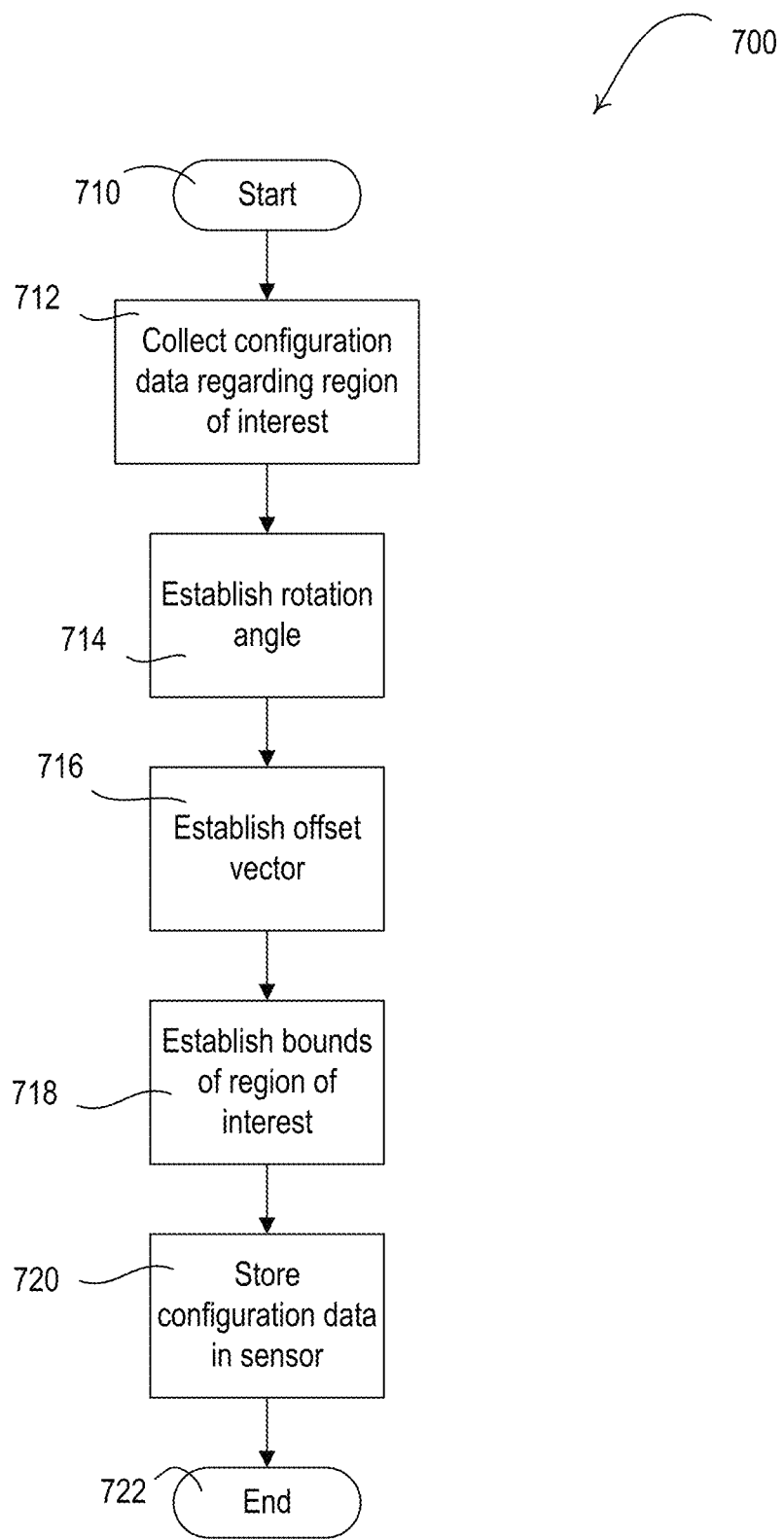

FIG. 7 is a flowchart of an example configuration procedure 700 that may be executed to configure an occupant detection sensor (e.g., the ceiling-mounted occupant detection sensor 180, the wall-mounted occupant detection sensor 182, and/or the occupant detection sensor 400). A control circuit of the occupant detection sensor and/or a programming device may execute the configuration procedure 700 to define at least one region of interest (e.g., at least one rectangular region of interest) in a space (e.g., a room) in which the occupant detection sensor is installed. For example, the region of interest may be set to be the entire extent of the room (e.g., within the periphery of the room) or a section of the room. The region of interest may be characterized by a local coordinate system that may or may not be aligned with a global coordinate system of the occupant detection sensor (e.g., the x-axis of the local coordinate system may not be parallel to the x-axis of the global coordinate system). If the room includes multiple regions of interest, the configuration procedure 700 may be repeated multiple times to configure each region of interest.

The configuration procedure 700 may begin at 710. At 712, the control circuit may collect the configuration data regarding the region of interest, e.g., through the use of a programming device or by the occupant detection sensor itself. For example, the control circuit may collect a shape of the region of interest (e.g., circle, square, rectangle, or other polygon), dimensions of the region of interest (e.g., radius or diameter if the shape is a circle, length of sides if the shape is as square, or length and width if the shape is a rectangle), and/or information regarding one or more defining features (e.g., corners) of the region of interest at 712. The configuration data may be collected before or after the occupant detection sensor is installed (e.g., as will be described in greater detail below).

At 714, the control circuit may establish a rotation angle $\varphi_R$ between the x-axis of the global coordinate system of the occupant detection sensor and the x-axis of the local coordinate system of the region of interest. For example, to establish the rotation angle $\varphi_R$, the occupant detection sensor may be installed with the x-axis of the global coordinate system aligned with (e.g., parallel and/or perpendicular to) one or more walls of the room (e.g., parallel to the x-axis of the region of interest), such that the rotation angle $\varphi_R$ is approximately 0°. The x-axis of the global coordinate system of the occupant detection sensor may be determined from one or more coordinate system indicators on the occupant detection sensor (e.g., as shown in FIGS. 3A-3C). The rotation angle $\varphi_R$ may be established at 714 when the shape of the region of interest is a polygon such as a rectangle (e.g., the operation at 714 may be skipped if the shape of the region of interest is a circle).

The occupant detection sensor may also be installed with the coordinate system indicator not aligned with the one of the walls of the room (e.g., the global coordinate system of the occupant detection sensor may not be aligned with the local coordinate system of the region of interest). In such a case, a programming device, such as the mobile device 140 (e.g., a smart phone) or other suitable programming tool, may be used to establish the rotation angle $\varphi_R$ between the x-axis of the global coordinate system and the x-axis of the local coordinate system at 714 of the configuration procedure 700. For example, the programming device may comprise an internal compass (e.g., an electronic compass). The programming device may be configured to use the electronic compass to determine an angle of the x-axis of the global coordinate system of the occupant detection sensor (e.g., from a recorded image of the coordinate system indicators on the occupant detection sensor) with relation to true north. The programming device may then use the electronic compass to determine the angle of the x-axis of the local coordinate system of the region of interest with relation to true north (e.g., while being held square against one of the walls of the room). The programming device may then calculate the rotation angle $\varphi_R$ between the x-axis of the global coordinate system of the occupant detection sensor and the x-axis of the local coordinate system of the region of interest based on a difference in the respective deviations of the two x-axes from true north.

Alternatively or additionally, at 714, the control circuit may itself be configured to determine the rotation angle $\varphi_R$ (e.g., as part of a self-configuration procedure). For example, commissioning devices or location markers, e.g., radar commissioning devices, such as Doppler phantoms (e.g., a person or object), may be placed in two or more corners of the room or a region of interest. The Doppler phantoms may continuously move (e.g., rotate) in fixed locations during the self-configuration procedure, such that the occupant detection sensor is able to automatically determine the locations of the two or more corners of the room. For example, the Doppler phantoms may be located in one location for a circular region of interest, two corners for a square room, three corners for a rectangular room, and additional corners for a complex-shaped room. Multiple Doppler phantoms may all be located in corners of the room at the same time or a single Doppler phantom may move or may be moved between the corners of the room one at a time. The control circuit of the occupant detection sensor may be configured to calculate the rotation angle $\varphi_R$ using the locations (e.g., X-Y coordinates) of the corners of the room as determined from the Doppler phantoms. In addition, the control circuit may be configured to determine the locations of the corners of the room in response to an installer tracing (e.g., walking) the perimeter of the room and/or standing while moving slightly in the corners of the room during the self-configuration procedure.

At 716, an offset vector between an origin of the global coordinate system of the occupant detection sensor and an origin of the local coordinate system of the region of interest may be established. For example, the region of interest may include the extent of the room and may be defined by the locations of vertices (e.g., the corners) of the room. The origin of the local coordinate system of the region of interest may be set at a vertex (e.g., a corner) of the room. An installer may measure the distances from the center of the ceiling-mounted occupant detection sensor to each of the walls (e.g., four walls) of the room in which the occupant detection sensor is installed by, for example, counting ceiling tiles, using a tape measure, using a laser range finder or using an ultrasonic range finder. The installer may enter the measurements into a configuration application running on the programming device and/or into the control circuit of the occupant detection sensor. For example, if the global coordinate system of the occupant detection sensor is aligned with the local coordinate system of the room and/or region of interest, the installer may enter the measurement into the configuration application running on the programming device in a particular order so that the programming device can properly determine the dimensions of the room and/or region of interest as well as the offset vector between the origin of the global coordinate system and the origin of the local coordinate system of the region of interest.

In addition, the programming device may be configured to measure the distances between the occupant detection sensor and the walls of the room at 716, for example, using a distance measuring application or technology of the programming device, such as an optical displacement sensing technique. Further, other measurement tools may be used to measure the distances between the occupant detection sensor and the walls, such as a laser rangefinder and/or a tripod rangefinder. Using the measurements of the room and/or region of interest, the programming device may be configured to calculate the dimensions of the room and/or region of interest as well as the offset vector between the origin of the global coordinate system and the origin of the local coordinate system of the region of interest at 716. In addition, the occupant detection sensor itself may be configured to determine the offset vector in response to the locations (e.g., X-Y coordinates) of the corners of the room (e.g., as determined from one or more Doppler phantoms and/or an installer tracing the perimeter of the room during the self-configuration procedure).

At 718, bounds (e.g., dimensions or boundaries) of the region of interest may be established. For example, the bounds may be set equal to and/or determined from the configuration data collected at 712 (e.g., by the programming device). If the region of interest is a rectangle or square, the bounds may be calculated from the distances between the occupant detection sensor and the walls determined at 716 (e.g., the dimensions of the room). In addition, the occupant detection sensor itself may be configured to calculate the bounds using the locations (e.g., X-Y coordinates) of the corners of the room (e.g., as determined from one or more Doppler phantoms and/or an installer tracing the perimeter of the room during the self-configuration procedure).

At 718, the configuration data (e.g., the rotation angle $\varphi_R$, the offset vector, and/or the dimensions of the region of interest) determined at 712-716 may be stored in the occupant detection sensor. If the configuration data is determined using the programming device, the programming device may be configured to transmit the configuration data to the occupant detection sensor prior to the occupant detection sensor storing the configuration data at 718. Note that if the x-axis of the global coordinate system is aligned with (e.g., parallel and/or perpendicular to) one or more walls of the room (e.g., parallel to the x-axis of the region of interest), the rotation angle $\varphi_R$ may be included in the configuration data and set to 0°, or the rotation angle may not be included in the configuration data. In the latter case, the occupant detection sensor may determine that the rotation angle is 0°. At 720, the configuration procedure 700 may exit.

During normal operation of the occupant detection sensor, the control circuit may use the rotation angle $\varphi_R$ and/or the offset vector to convert (e.g., transform) a location in the global coordinate system of the occupant detection sensor (e.g., as determined by the occupant detection circuit) to a location in the local coordinate system of the region of interest (as will be described in greater detail below). The control circuit may use the dimensions of the region of interest to determine if the location in the local coordinate system is within the bounds of the region of interest. During the configuration procedure 700, the control circuit may also transform locations of the vertices (e.g., corners) of the region of interest in the global coordinate system into locations of the vertices of the region of interest in the local coordinate system. For example, the control circuit may use the locations of the vertices of the region of interest in the local coordinate system for further configuration of the occupant detection sensor (e.g., during normal operation).

Figure 8:
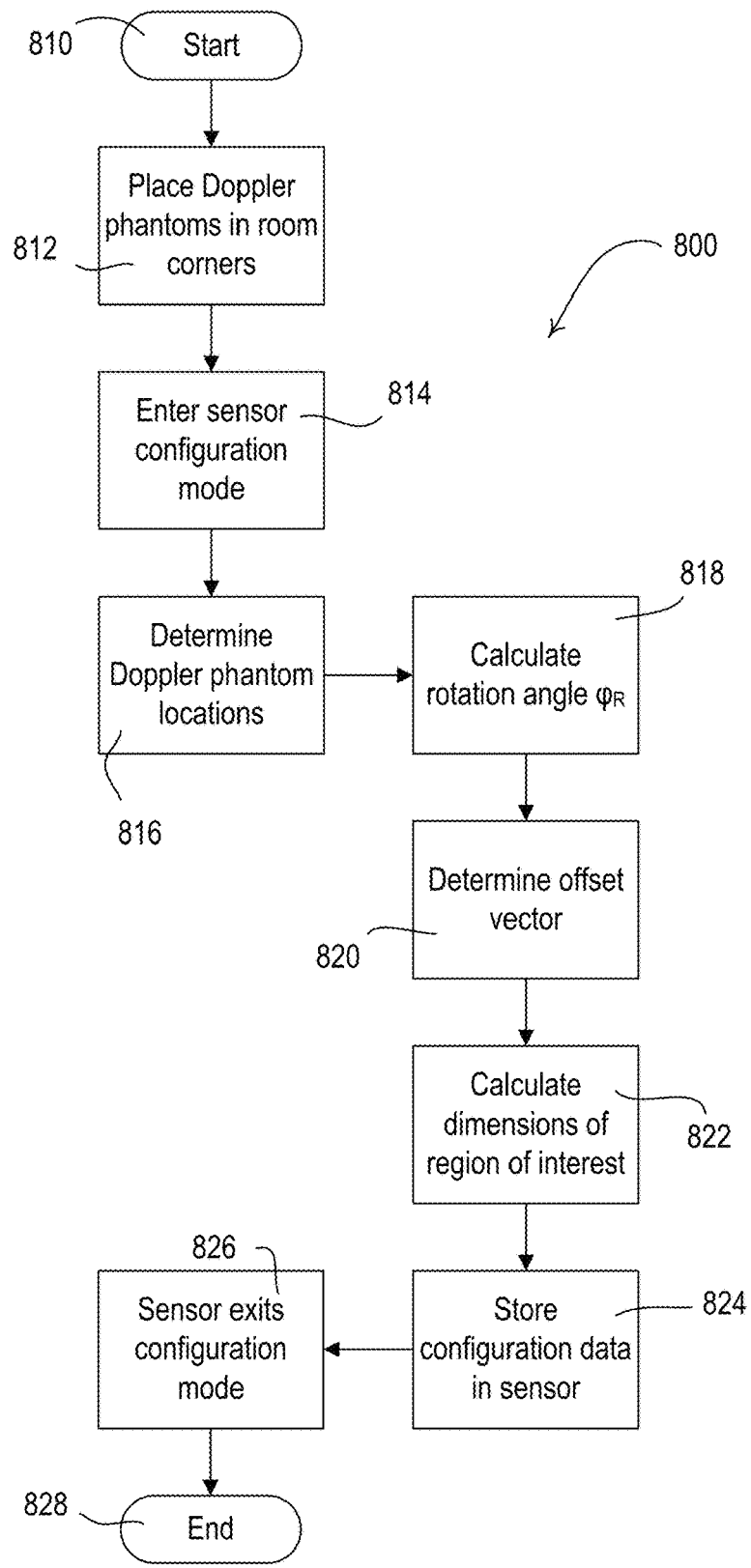
Figure 9:
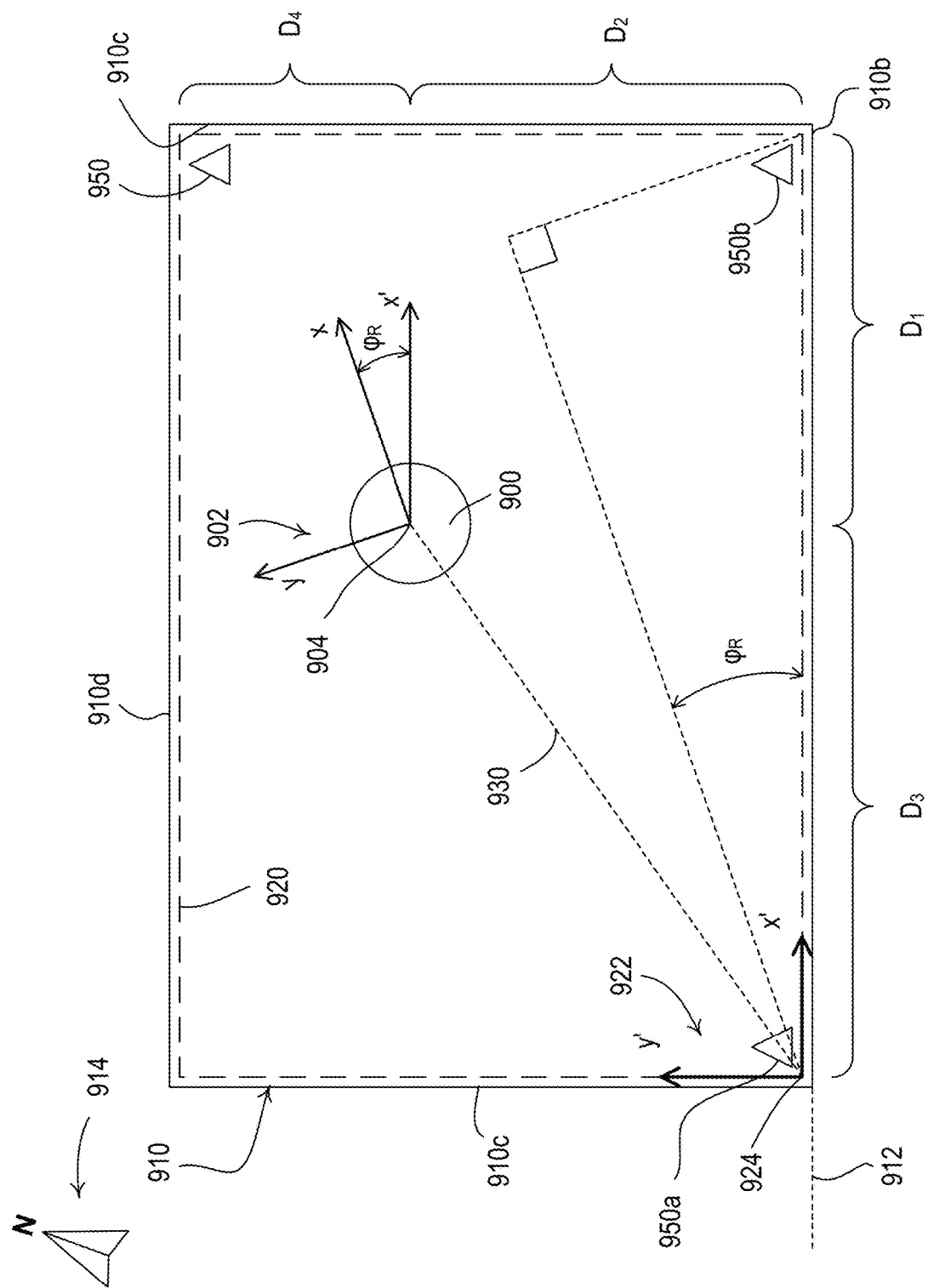
FIG. 9 is a top-down view of an example room for illustrating the operation of the configuration procedure 800 for the occupant detection sensor.

FIG. 8 is a flowchart of an example configuration procedure 800 that may be executed to configure an occupant detection sensor 900 (e.g., the ceiling-mounted occupant detection sensor 180, the wall-mounted occupant detection sensor 182, and/or the occupant detection sensor 400). FIG. 9 is a top-down view of an example room 910 for illustrating the operation of the configuration procedure 800 for the occupant detection sensor 900. For the example of FIG. 9, the example room 910 may be rectangular with four walls 910a-910d, and the coverage area of the occupant detection sensor 900 may extend beyond the extent of the room 910, such that the room is fully encompassed by the coverage area. The coverage area of the occupant detection sensor 900 may be characterized by a global coordinate system 902 having an origin 904 located at a center point of the occupant detection sensor. The occupant detection sensor 900 may also be characterized by an initial region of interest (not shown).

The configuration procedure 800 may be executed to configure a desired region of interest 920, which may be, for example, the extent of the room 910. The desired region of interest 920 may be characterized by a local coordinate system 922 having an origin 924 located at one of the corners of the desired region of interest. The desired region of interest 920 may be aligned with the walls of the room 910. As shown in FIG. 9, the x-axis of the global coordinate system 902 of the occupant detection sensor 900 may not be aligned with the x-axis of the local coordinate system 922 of the desired region of interest 920. For example, a rotation angle $\varphi_R$ may exist between the x-axis of the global coordinate system 902 and the x-axis of the local coordinate system 922. The local coordinate system 922 may also be offset from the global coordinate system 902 by an offset vector 930.

The configuration procedure 800 may be primarily executed by a control circuit of the occupant detection sensor 900 (e.g., the radar detection processor 412 and/or the control circuit 420 of the occupant detection sensor 400), for example, as part of a self-configuration procedure. The configuration procedure 800 may be executed with one or more commissioning devices or location markers, such as Doppler phantoms 950a, 950b, 950c, located in two or more corners of the room 910. Since the room 910 is rectangularly shaped, the room 910 may have Doppler phantoms 950a, 950b, 950c in three corners.

The configuration procedure 800 may begin at 810. At 812, an installer may place the Doppler phantoms 950 in two or more corners of the room 910 (e.g., three corners as shown in FIG. 9). At 814, an installer may cause the occupant detection sensor to enter a sensor configuration mode (e.g., a self-configuration mode). The installer may cause the occupant detection sensor to enter the sensor configuration mode while the installer is not located in the room 910 (e.g., such that the occupant detection sensor 900 may not mistake the installer for one of the Doppler phantoms 950a-950c). For example, the installer may use a sensor configuration software (e.g., a sensor configuration app) running on a programming device, such as the mobile device 140 (e.g., a smart phone) to transmit (e.g., directly transmit) a message to the occupant detection sensor to cause the occupant detection sensor to enter the sensor configuration mode. In addition, the installer may shine a laser pointer on a laser receiving circuit (not shown) in the occupant detection sensor 900 (e.g., through an opening in an enclosure of the occupant detection sensor 900) to cause the occupant detection sensor to enter the sensor configuration mode.

At 816, the occupant detection sensor (e.g., the control circuit of the occupant detection sensor) may determine locations $(x_a, y_a)$, $(x_b, y_b)$, $(x_c, y_c)$ of the respective Doppler phantoms 950a, 950b, 950c in the global coordinate system 902. For example, the control circuit may be configured to receive the locations $(x_a, y_a)$, $(x_b, y_b)$, $(x_c, y_c)$ of the respective Doppler phantoms 950a, 950b, 950c in the room from an occupant detection circuit (e.g., from the radar detection processor 412 of the radar detection circuit 410 via the communication bus 422). At 818, the occupant detection sensor 900 may be configured to calculate the rotation angle $\varphi_R$ (e.g., the rotation angle $\varphi_R$ between the x-axis of the global coordinate system 902 and the x-axis of the local coordinate system 922 shown in FIG. 9) using the locations of two of the Doppler phantoms 950a-950c. For example, the occupant detection sensor 900 may be configured use the locations $(x_a, y_a)$, $(x_b, y_b)$ of the Doppler phantoms 950a, 950b to calculate the rotation angle $\varphi_R$, e.g., $$\varphi_R = \tan^{-1}\left(\frac{y_a - y_b}{x_a - x_b}\right).$$

The control circuit of the occupant detection sensor 900 may be configured to determine the solution to the arctangent function (e.g., $\tan^{-1}$), for example, by calculating the solution to the arctangent function and/or retrieving from memory the solutions to the arctangent function. At 820, the occupant detection sensor 900 may determine an offset vector $(x_{OFF}, y_{OFF})$ (e.g., the offset vector 930 between the origin 904 of the global coordinate system 902 and the origin 924 of the local coordinate system 922 as shown in FIG. 9). For example, the occupant detection sensor 900 may be configured to determine the offset vector $(x_{OFF}, y_{OFF})$ from the locations $(x_a, y_a)$ of one of the Doppler phantoms 950a, e.g., $x_{OFF}=-x_a$ and $y_{OFF}=-y_a$.

At 822, the occupant detection sensor 900 may determine dimensions $X_{ROI}$, $Y_{ROI}$ of the region of the interest (e.g., the desired region of interest 920). For example, the occupant detection sensor 900 may be configured to calculate the dimensions $X_{ROI}$, $Y_{ROI}$ using the locations $(x_a, y_a)$, $(x_b, y_b)$, $(x_a, y_c)$ of all three Doppler phantoms 950a, 950b, 950c, e.g., $X_{ROI}=\text{sqrt}[(y_a-y_b)^2+(x_a-x_b)^2]$; and $Y_{ROI}=\text{sqrt}[(y_b-y_c)^2+(x_b-x_c)^2]$.

The control circuit of the occupant detection sensor 900 may be configured to determine the solution to the square root function (e.g., sqrt), for example, by calculating the solution to the square root function and/or retrieving from memory the solutions to the square root function. At 824, the occupant detection sensor 800 may store the sensor configuration data in memory. For example, the sensor configuration data may include the rotation angle $\varphi_R$, the offset vector $(x_{OFF}, y_{OFF})$, and/or the dimensions $X_{ROI}$, $Y_{ROI}$ of the desired region of the interest 920. At 826, the occupant detection sensor 900 may exit the sensor configuration mode, before the configuration procedure 800 exits at 828.

Figure 10:
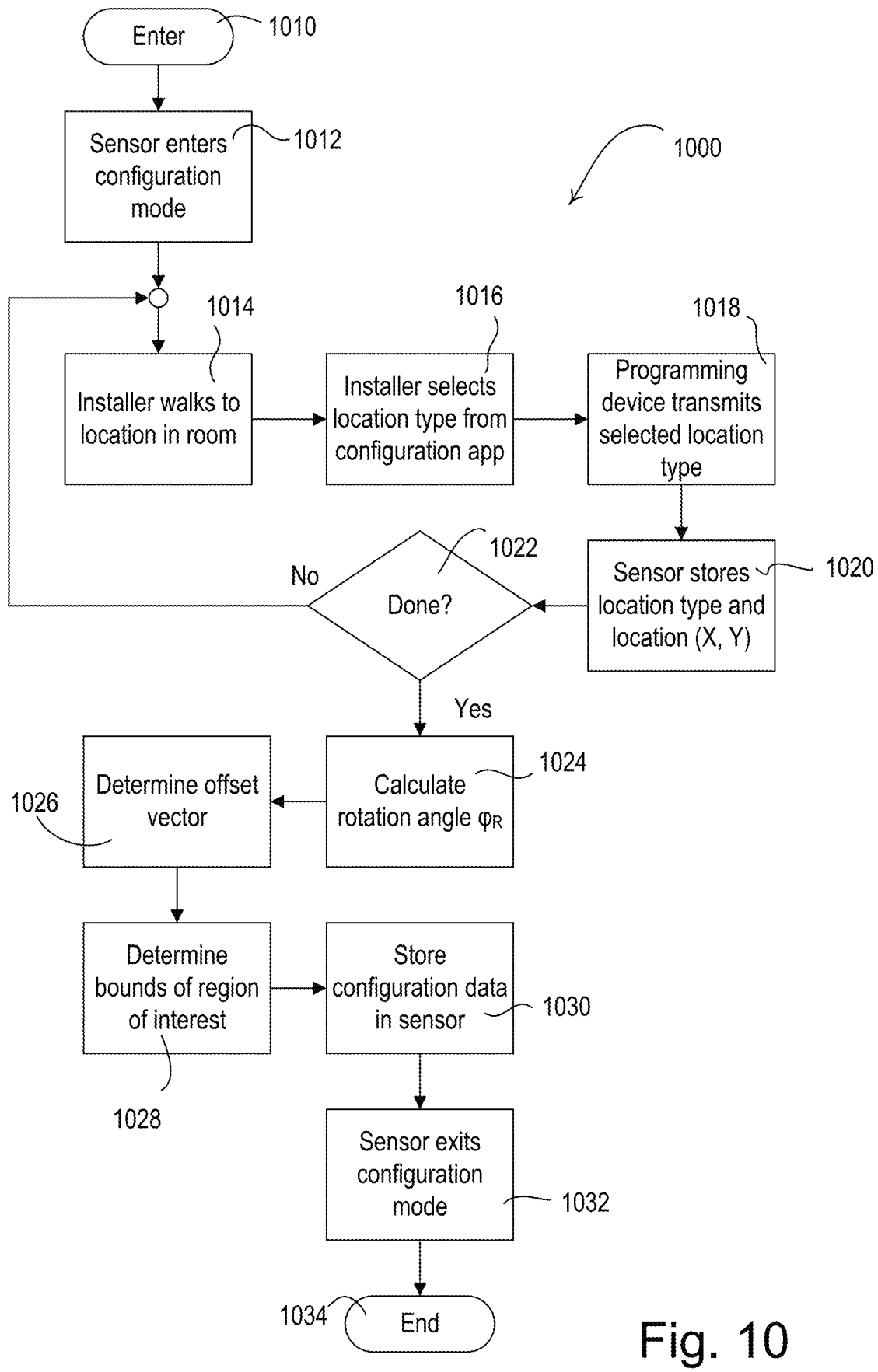
FIG. 10 illustrates an example configuration procedures that may be executed to configure an occupant detection sensor.

FIG. 10 is a flowchart of another example configuration procedure 1000 that may be executed to configure an occupant detection sensor (e.g., the ceiling-mounted occupant detection sensor 180, the wall-mounted occupant detection sensor 182, and/or the occupant detection sensor 400). For example, the configuration procedure 1000 may be executed to configure a region of interest that has a rectangular shape (e.g., such as the desired region of interest 920 shown in FIG. 9). In addition, the configuration procedure 1000 may be executed to configure regions of interest that have complex shapes, such as an L-shape, a C-shape, or other polygon having four or more sides. Throughout the configuration procedure 1000, an installer may utilize a configuration application running on a programming device, such as the mobile device 140 (e.g., a smart phone), which may be in communication with (e.g., direct communication with) the occupant detection sensor for configuring the occupant detection sensor. At 1010, the installer may start the configuration procedure 1000, for example, by opening a configuration application running on the network device and/or selecting a "start configuration" option and/or button on the configuration application.

At 1012, the occupant detection sensor may enter a configuration mode. At 1014, the installer may walk to a location in the room. At 1016, the installer may select a location type using the programming device. For example, the location may indicate a part of the room and/or an object in the room (e.g., a corner, a doorway, a desk chair, etc.). The programming device may then transmit an indication of the selected location type to the occupant detection sensor at 1018, and the occupant detection sensor may store the location type and the location (e.g., X-Y coordinates) in memory at 1020. If the installer is not done identifying locations in the room at 1022, the installer may walk to a different location at 1014 and select the appropriate location type at 1016. For example, if the room is rectangular, the installer may walk to the four corners of the room and select the appropriate the location type (e.g., corner) at 1016 at each corner. If the installer is done identifying locations in the room (e.g., in the installer selected a "done" option and/or button on the programming device) at 1022, the occupant detection sensor may be configured to determine the rotation angle $\varphi_R$ using the locations of two of the corners of the room at 1024 (e.g., using the locations of the corners of the room determined at 1018-1022). For example, if the room is rectangular, the occupant detection sensor may be configured to calculate the rotation angle $\varphi_R$ in a similar manner as at 818 of the configuration procedure 800 shown in FIG. 8. At 1026, the occupant detection sensor may determine an offset vector $(x_{OFF}, y_{OFF})$ using the location of one of the corners of the room (e.g., which may be set as the origin of the local coordinate system associated with the region of interest). For example, if the room is rectangular, the occupant detection sensor may be configured to determine the offset vector $(x_{OFF}, y_{OFF})$ in a similar manner as at 820 of the configuration procedure 800 shown in FIG. 8.

At 1030, the occupant detection sensor may be configured to determine bounds of the region of interest for the occupant detection sensor (e.g., as defined by the perimeter and/or dimensions of the room and/or region of interest). If the room is rectangular, the occupant detection sensor may be configured to determine the bounds by determining dimensions $X_{ROI}$, $Y_{ROI}$ of the region of interest, for example, in a similar manner as at 822 of the configuration procedure 800 shown in FIG. 8. At 1032, the occupant detection sensor may store the sensor configuration data in memory. For example, the sensor configuration data may include the rotation angle $\varphi_R$, the offset vector ($x_{OFF}$, $y_{OFF}$), the bounds (e.g., the dimensions $X_{ROI}$, $Y_{ROI}$) of the region of the interest, and/or locations determined at 1018-1022 that may define masked areas or static areas. For example, the occupant detection sensor may configure masked areas around locations that were designated as doorways or similar objects at 1016 and configured static areas around locations that were designated as desk chairs or similar objects at 1016. For example, the occupant detection sensor may be configured to ignore data regarding occupants in a masked region within the region of interest. Among other purposes, the use of the region of interest(s) and/or masked region(s) may allow the occupant detection sensor to focus on the occupants of just the room and ignore moving bodies in other areas, for example, in a hallway outside of a doorway. At 1034, the occupant detection sensor may exit the sensor configuration mode before the configuration procedure 1000 exits at 1036.

While the configuration procedure 1000 as shown in FIG. 10 allows the installer to identify the locations of corners, doorways, and desk chairs in the room, the configuration procedure could also allow the installer to identify other locations in the room, such as, for example, corners of a desk, corners of a table, a keyboard of a computer, and/or a noise source (e.g., such as a fan or other moving object that is not an occupant of the room). Rather than (or in addition to) identifying the corners of the room to identify the perimeter of the room, the configuration application 1000 may allow the installer to identify the perimeter or the room by walking around the perimeter of the room. In addition, the configuration procedure 1000 of FIG. 10 may be used to identify the location of multiple corners, doorways, desks, desk chairs, etc. of the room. Further, the configuration procedure 1000 may allow an installer to define a region of interest having a complex shape, such as a polygon having more than four sides.

Figure 11A:
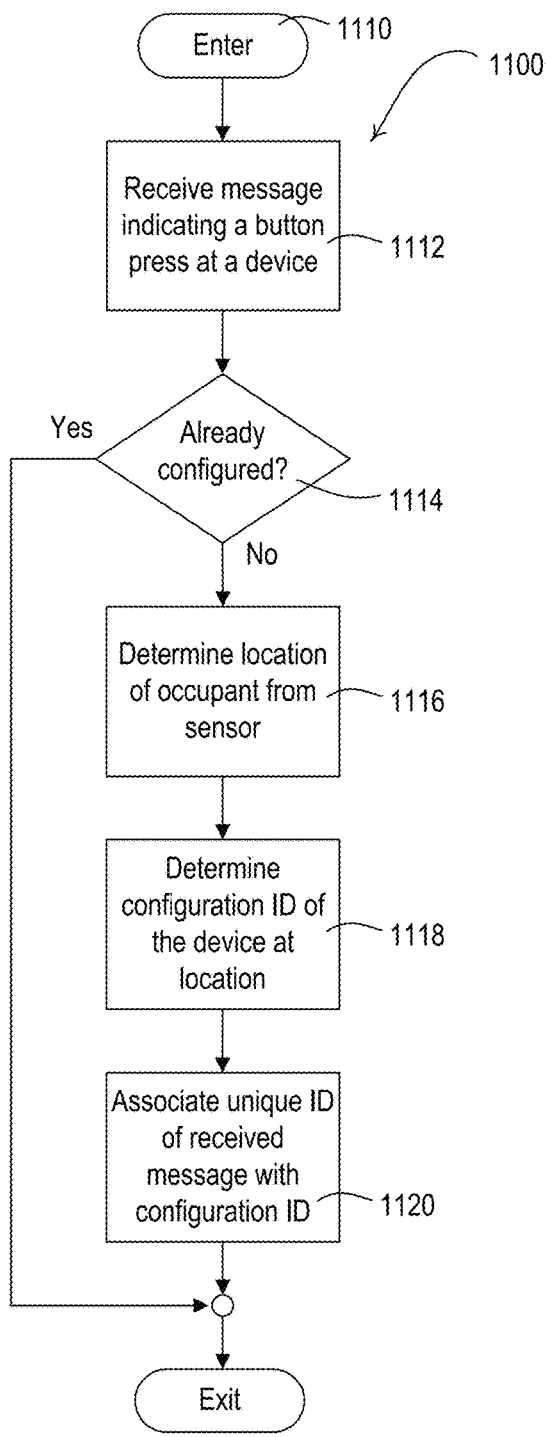
FIGS. 11A-11B are a flowcharts of example configuration procedures that may be executed by a system controller of a load control system.

FIG. 11A is a flowchart of a configuration procedure 1100 that may be executed for configuring a load control system (e.g., the load control system 100). For example, the configuration procedure 1100 may be executed by a control circuit of a control device of the load control system, such as an occupant detection sensor (e.g., the ceiling-mounted occupant detection sensor 180, the wall-mounted occupant detection sensor 182, and/or the occupant detection sensor 400), a system controller (e.g., the system controller 110), and/or a mobile device (e.g., the mobile device 150). The configuration procedure 1100 may be executed by the control circuit to determine the location of a device, such as a dimmer switch (e.g., the dimmer switch 120), a remote control device (e.g., the remote control device 170), and/or a temperature control devices (e.g., the thermostat 160) of the load control system. The configuration procedure 1100 may be used during the commissioning of the load control system. The control circuit may be configured to perform the configuration procedure 1100 during a configuration procedure and/or in response to receiving a message from a control device of the load control system.

The configuration procedure 1100 may begin at 1110. At 1112, the control circuit may receive a message that indicates that an actuator of the device (e.g., a keypad, a dimmer switch, a thermostat, etc.) was pressed (e.g., actuated). For example, the message may include a unique identifier of the device from which the message was received. At 1114, the control device may determine if the device from which the message was received has already been configured. If so, the configured procedure 1110 may end. If the device from which the message was received has not already been configured at 1114, the control circuit may determine the location of the occupant (e.g., the occupant that performed the button press) at 1116. For example, the control circuit of a system controller and/or a mobile device may determine the location of the occupant from an occupant detection sensor (e.g., the ceiling-mounted occupant detection sensor 180, the wall-mounted occupant detection sensor 182, and/or the occupant detection sensor 400). Alternatively or additionally, the control circuit of an occupant detection sensor may determine the location (e.g., X-Y coordinates) of the occupant in response to an occupant detection circuit (e.g., a radar detection circuit). The occupant detection sensor may determine a location of the occupant as described herein. The occupant's location at the time of the button press may be indicative of the location of the device. Further, in some examples, the control circuit may determine whether there is only one occupant after 1114. If the control circuit determines that there is only one occupant, then the control circuit may proceed to 1116. If the control circuit determines that there is more than one occupant, then the control circuit may exit the procedure 1110.

At 1118, the control circuit may determine a configuration identifier of the device. The control circuit may associate a configuration identifier with the device to enable control of the device in the room or space (e.g., the load control environment). The configuration identifier may indicate a fixture, group, zone, area, and/or location of the device that may be defined by configuration data (e.g., the lighting control configuration information). A configuration identifier may include a floor plan identifier that indicates (e.g. represents) a corresponding location of the device within a room or building. Alternatively or additionally, the configuration identifier may include a group or zone identifier that indicates a plurality of devices that have been discovered and added to a group of devices for configuration and/or control. The control circuit may determine the configuration identifier of the device based on the location of the occupant determined at 1116. Further, the control circuit may store the location of the device within the space (e.g., the region of interest). Accordingly, the control circuit may map the location of the devices within the space through the assistance of the occupant detection sensor and/or occupant detection circuit.

At 1120, the control circuit may associate (e.g., pair) a unique identifier of the device with the configuration identifier of the device. The unique identifier may be determined based on the message received from the device (e.g., at 1112). In some examples, the unique identifier may be a serial number or address of the device, and may be included in the message received from the device. The unique identifier may be used for communicating with the device during normal operation of the load control system. For example, after associating the unique identifier with the device, the control circuit may communicate with the device using the unique identifier. As such, the control circuit may commission the space through the use of the occupant detection sensor. After the association is performed at 1120, the configuration procedure 1100 may end. In some examples, the control circuit may execute the procedure 1100 when the system is being configured (e.g., first configured). In such examples, the control circuit may perform 1116-1120 for one or more devices, up to all devices in the space.

Figure 11B:
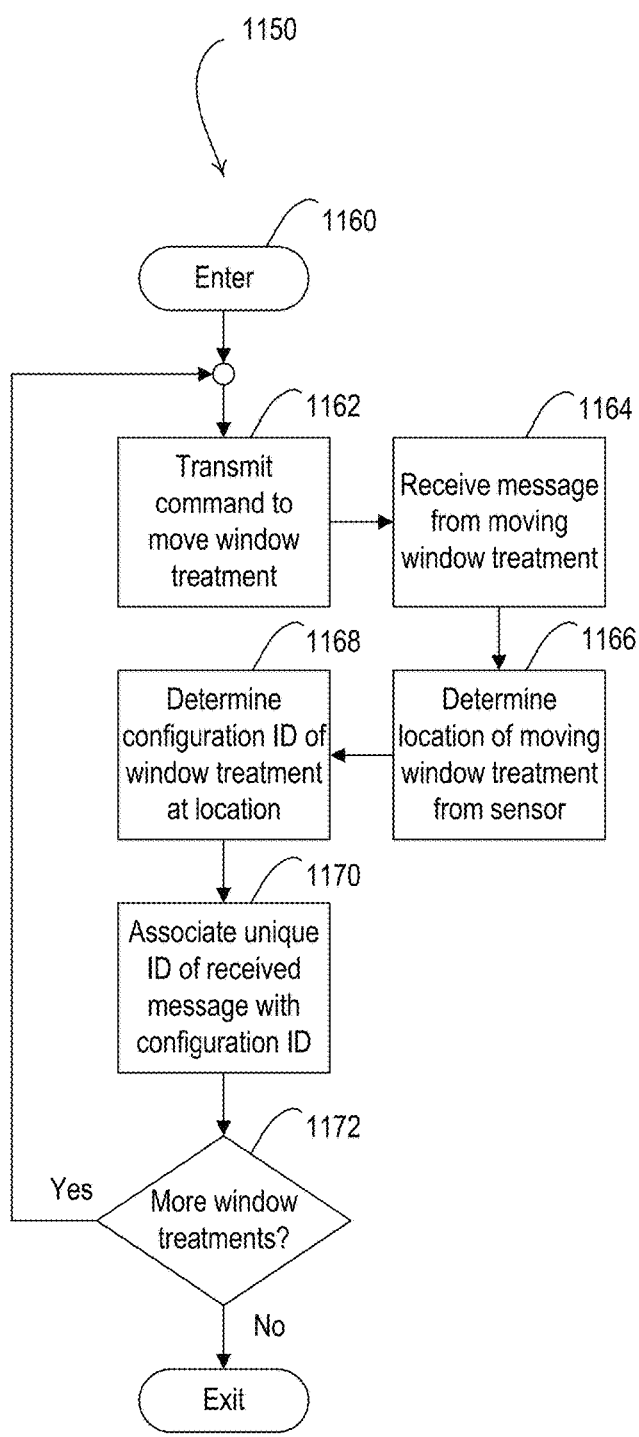

FIG. 11B is a flowchart of a configuration procedure 1150 that may be executed for configuring a load control system (e.g., the load control system 100). For example, the configuration procedure 1150 may be executed by a control circuit of a control device of the load control system, such as an occupant detection sensor (e.g., the ceiling-mounted occupant detection sensor 180, the wall-mounted occupant detection sensor 182, and/or the occupant detection sensor 400), a system controller (e.g., the system controller 110), and/or a mobile device (e.g., the mobile device 150). The configuration procedure 1150 may be executed by the control circuit to determine the location of one or more motorized window treatments of the load control system (e.g., the load control system 100). The control circuit may be configured to perform the configuration procedure 1150 during a configuration procedure.

The configuration procedure 1150 may begin at 1160. At 1162, the control circuit may transmit a command to a motorized window treatment (e.g., one of the motorized window treatments 150 of the load control system 100). The command may instruct the motorized window treatment to move a covering material of the motorized window treatment (e.g., fully raise, fully close, partially raise, and/or partially lower the covering material). At 1164, the control circuit may receive a message from the motorized window treatment that, for example, includes an acknowledgement receipt, an indication that the motorized window treatment is moving the covering material, and/or a unique identifier of the motorized window treatment. At 1166, the control circuit may determine the location of the motorized window treatment with the moving covering material. For example, the control circuit of a system controller and/or a mobile device may determine the location of the motorized window treatment with the moving covering material from the occupant detection sensor (e.g., the ceiling-mounted occupant detection sensor 180, the wall-mounted occupant detection sensor 182, and/or the occupant detection sensor 400). In addition, the control circuit of an occupant detection sensor may determine the location (e.g., X-Y coordinates) of the occupant in response to an occupant detection circuit (e.g., a radar detection circuit). The occupant detection sensor may determine the location of the motorized window treatment with the moving covering mater in a manner similar to how the occupant detection sensor determines the location of a user that is moving through the space, for example, by detecting the movement of the motorized window treatment within the coverage area (e.g., region of interest) of the occupant detection sensor.

At 1168, the control circuit may determine a configuration identifier of the motorized window treatment. The configuration identifier of the motorized window treatment may be stored within a memory of the control device executing the procedure 1150. At 1170, the occupant detection sensor may associate a unique identifier of the motorized window treatment with the configuration identifier of the motorized window treatment. The unique identifier may be determined based on the message received from the motorized window treatment (e.g., at 1164). In some examples, the unique identifier may be a serial number or address of the motorized window treatment and may be included in the message received from the motorized window treatment. Further, the control device may store the location of the motorized window treatment within the space (e.g., the region of interest). Accordingly, the control device may map the location of the motorized window treatments within the space through the assistance of the occupant detection sensor. As such, the control device may commission the space through the use of the occupant detection sensor.

At 1172, the control circuit may determine whether there are more motorized window treatments that have yet to be configured (e.g., associated with a configuration identifier). In some examples, the control circuit may determine whether there are more motorized window treatments by determining whether each motorized window treatment in a list of motorized window treatments has its configuration identifier associated with a unique identifier. The list of motorized window treatments may be stored in memory and/or received from the system controller and/or the mobile device. If all of the motorized window treatments have been associated, the configuration procedure 1150 may exit. If there are additional motorized window treatments, the configuration procedure may return to 1162.

FIG. 12A is a flowchart of a configuration procedure 1200 that may be executed for configuring an occupant detection sensor (e.g., the ceiling-mounted occupant detection sensor 180, the wall-mounted occupant detection sensor 182, and/or the occupant detection sensor 400). For example, the configuration procedure 1200 may be executed by a control circuit of the occupant detection sensor (e.g., the radar detection processor 412 and/or the control circuit 420). The control circuit may be configured to detect movement in the space in response to an occupant detection circuit (e.g., in response to the radar detection processor 412 of the radar detection circuit 410). For example, the control circuit may execute the configuration procedure 1200 to mask off areas that are triggering the occupant detection sensor (e.g., causing the occupant detection sensor to detect movement in the space) when the room is unoccupied. For example, some movement may not be indicative of an occupant in the space (e.g., may be noise), such as movement that is due to people walking outside of the space, such as walking by a doorway or window, a fan or other moving object in the space (e.g., an oscillating fan), an object that is moving as a result of air flow (e.g., a poster on the wall), etc. The control circuit may be configured to perform the configuration procedure 1200 periodically during a commissioning procedure of the occupant detection sensor and/or in response to receiving a message (e.g., from a system controller or a mobile device).

The configuration procedure 1200 may begin at 1210. For example, the occupant detection sensor may include a low-power detection circuit (e.g., the low-power detection circuit 440), such as a PIR detector circuit that generates a PIR detect signal (e.g., the PIR detect signal $V_{PIR}$) that indicates an occupancy and/or vacancy condition in the space in response to detected infrared energy in the room. At 1212, the control circuit may determine if the magnitude of the PIR detect signal $V_{PIR}$ is greater than a threshold (e.g., which may indicate the presence of occupants in the space). If the control circuit determines that the magnitude of the PIR detect signal $V_{PIR}$ is above the threshold, the control circuit may exit the configuration procedure 1200. For example, the PIR detector circuit may drive the magnitude of the PIR detect signal $V_{PIR}$ high (e.g., towards the supply voltage $V_{CC}$) when the PIR detector circuit detects one or more occupants in the room, and drive the magnitude of the PIR detect signal $V_{PIR}$ low (e.g., towards circuit common) when the PIR detector circuit does not detect any occupants in the room.

If the control circuit determines that the magnitude of the PIR detect signal $V_{PIR}$ is below the threshold at 1212 (e.g., which may indicate that there are no occupants in the space), the control circuit may determine if there is movement in the coverage area and/or region of interest (ROI) in response to the occupant detection circuit of the occupant detection sensor at 1214. As noted herein, movement may be due to people walking outside of the space, such as walking by a doorway or window, a fan or other moving object in the space (e.g., an oscillating fan), an object that is moving as a result of air flow (e.g., a poster on the wall), etc. For example, the occupant detection sensor may be configured to determine the locations of the movement as coordinates (e.g., X-Y coordinates) in a two-dimensional coordinate system associated with (e.g., defined by) the occupant detection circuit of the occupant detection sensor (e.g., and ignore the Z-coordinate information determined by the occupant detection circuit). The radar detection processor of the occupant detection sensor may build a radar image (e.g., an occupant map) of the coverage area from the signals received from a receiving antenna array of the occupant detection sensor, for example, as described herein. If the control circuit determines that there is no movement in the coverage area and/or region of interest at 1214, the configuration procedure 1200 may exit.

However, if the control circuit determines that there is movement in the coverage area and/or region of interest at 1214, the control circuit may configure regions around locations of movement (e.g., the location of the movement in the occupant map) as masked regions (e.g., such as the masked areas/regions of FIG. 2F) at 1216. For example, if the control circuit determines that there is movement in the coverage area and/or region of interest, but the PIR detector circuit does not detect any occupants, then the locations of the movement detected by the occupant detection sensor are most likely movements that do not indicate occupants in the region or room. Accordingly, the control circuit may set or configure a masked region over the identified noise source so that the noise source may be ignored (e.g., excluded) when determining the occupant count for the room during normal operation. As a result, in addition to refining the ability of the system to perform occupant detection, the occupant detection sensor may also be less susceptible to noise within or near the room and the occupant count will be more accurate. At 1218, the control circuit may store the masked regions in memory, and the procedure 1200 may exit. Alternatively or additionally, the control circuit may send the masked regions to a system controller (e.g., the system controller 110) and/or a mobile device (e.g., the mobile device 140) for storage.

FIG. 12B is a flowchart of a configuration procedure 1250 that may be executed for configuring an occupant detection sensor (e.g., the ceiling-mounted occupant detection sensor 180, the wall-mounted occupant detection sensor 182, and/or the occupant detection sensor 400). For example, the configuration procedure 1250 may be executed by a control circuit of the occupant detection sensor (e.g., the radar detection processor 412 and/or the control circuit 420). For example, the control circuit may execute the configuration procedure 1250 to mask off the locations of motorized window treatments within the room. The control circuit may be configured to perform the configuration procedure 1250 periodically during commissioning procedure of the occupant detection sensor and/or in response to receiving a message (e.g., from a system controller or a mobile device).

The configuration procedure 1250 may begin at 1260. At 1262, the control circuit may receive an indication that a window treatment (e.g., one of the motorized window treatments 150 of the load control system 100) is moving. For example, the control circuit may receive the indication from a system controller (e.g., the system controller 110), a mobile device (e.g., the mobile device 140), and/or a motorized window treatment (e.g., one of the motor drive unit of the motorized window treatments 150). For example, the system controller or the mobile device may transmit an indication to the control circuit that the motorized window treatment is moving (e.g., moving at a known speed), wherein the indication may be transmitted by the system controller or the mobile device in response to controlling the motorized window treatment (e.g., transmitting a command to control the motorized window treatment to move). For instance, the control circuit may receive an indication of the known speed that the motorized window treatment will be moving, which may be used to help identified the movement related to the motorized window treatment in the region of interest. At 1264, the control circuit may determine whether there is movement in a region of interest (ROI) of the occupant detection sensor. If there is not movement in the region of interest (ROI), the configuration procedure 1250 may exit. If the control circuit determines that there is movement in the region of interest (ROI) at 1264, the control circuit may determine if the motorized movement is at the known speed (e.g., a speed that is preconfigured, received in the indication, and/or received from the system controller) at 1266. In some examples, 1266 may be omitted. The known speed may be the speed of the normal movement of the opening or closing of the covering material of the window treatments of the load control system. If the speed of the movement does not match with the known speed of the motorized window treatment, the control circuit may exit the configuration procedure 1250.

If the control circuit determines that the movement in the region of interest (ROI) is at the known speed (e.g., that the detected movement is movement of the covering material of the motorized window treatment) at 1266, the control circuit may configure a masked region around the location of the movement (e.g., the masked areas/regions of FIGS. 3A-3C, and/or 10). Accordingly, the control circuit may not be triggered by movements of the motorized window treatment in the future, which for example, may prevent the movement of the motorized window treatment from affecting the occupant count of the occupant detection sensor. At 1270, the control circuit may store the masked region around the location of the movement in memory. Alternatively or additionally, the control circuit may send the masked regions to a system controller (e.g., the system controller 110) and/or a mobile device (e.g., the mobile device 140) for storage.

Figure 13:
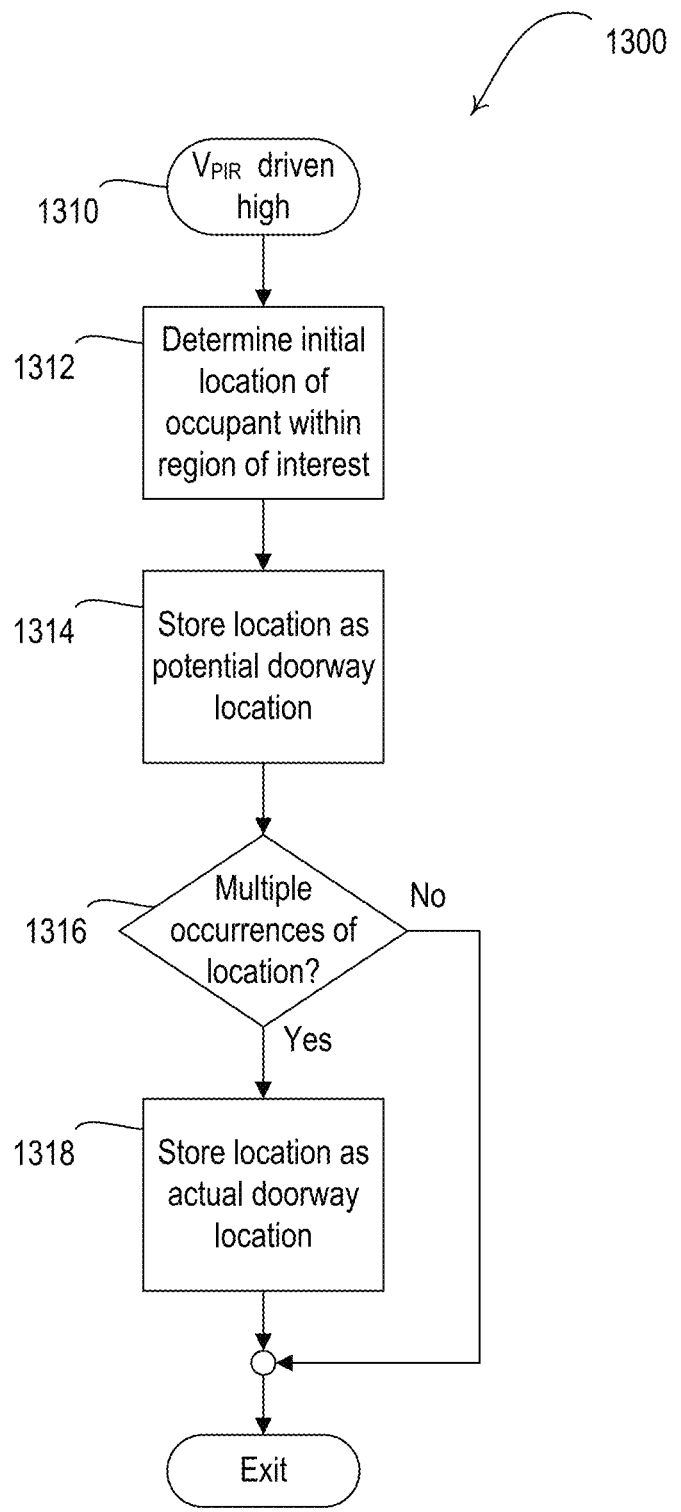

FIG. 13 is a flowchart of a configuration procedure 1300 that may be executed for configuring an occupant detection sensor (e.g., the ceiling-mounted occupant detection sensor 180, the wall-mounted occupant detection sensor 182, and/or the occupant detection sensor 400). For example, the configuration procedure 1300 may be executed by a control circuit of the occupant detection sensor (e.g., the radar detection processor 412 and/or the control circuit 420). For example, the control circuit may execute the configuration procedure 1300 to configure (e.g., auto-configure) the location of one or more egress locations (e.g., doorways and/or entryways) in or around the room that the occupant detection sensor is installed. The control circuit may be configured to perform the configuration procedure 1300 periodically during commissioning procedure of the occupant detection sensor, during normal operation, and/or in response to receiving a message (e.g., from a system controller or a mobile device).

The configuration procedure 1300 may begin at 1310 in response to a PIR detect signal (e.g., the PIR detect signal $V_{PIR}$) generated by a low-power detection circuit (e.g., the low-power detection circuit 440) of the occupant detection sensor. The PIR detect signal may indicate an occupancy and/or vacancy condition in the space in response to detected infrared energy in the room. Further, as noted, the low-power detection circuit may drive the magnitude of the PIR detect signal high (e.g., toward the supply voltage $V_{CC}$) when the low-power detection circuit detects one or more occupants in the room, and drive the magnitude of the PIR detect signal low (e.g., towards circuit common) when the low-power detection circuit does not detect any occupants in the room. For example, the configuration procedure 1300 may begin at 1310 when the lower-power detection circuit drives the magnitude of the PIR detect signal high, (e.g., which may also cause the control circuit to enable a radar detection circuit (e.g., the radar detection circuit 410), for example, as described herein). At 1312, the control circuit may determine an initial location of an occupant within a region of interest (ROI) (e.g., the region of interest 204 of FIG. 2F). For example, the region of interest may be associated with (e.g., characterized by) a coordinate system, e.g., the local coordinate system 242, having the origin 244 (e.g., the (0,0) coordinate) that may be located at one of the corners of the region of interest.

At 1314, the control circuit may store the entrance location (e.g., the initial location) of the occupant within the region of interest as a potential egress (e.g., doorway and/or entryway) location. For example, the occupant detection sensor may initially detect the presence of an occupant when they enter the room, and since occupants usually enter the room through a doorway and/or entryway, the entrance location may be a potential egress location of a doorway and/or entryway to the space and/or region of interest. In addition, the occupant detection sensor may also detect the departure of an occupant when they exit the room, and the control circuit may store the departure location of the occupant within the region of interest as a potential egress location. At 1316, the control circuit may determine if there are multiple occurrences of a potential egress location (e.g., the entrance location of an occupant and/or the departure location of an occupant) being at the same location within the region of interest. If there are multiple occurrences of a potential egress location at the same location (e.g., a percentage and/or frequency of one of the potential egress locations are at the same location) over a period of time, there is a strong likelihood that the potential egress location is the location of a doorway and/or entryway (e.g., an actual egress location). For example, the occupant detection sensor may track the potential egress locations over a period of time and compare a percentage of egress locations that are at a particular location to a threshold percentage. In some examples, the threshold percentage may be a single value, such as 80%, while in other examples, the occupant detection sensor may be configured with a lower threshold percentage, such as 40%, to account for situations where there are multiple (e.g., two) doorways into and out of the room (e.g., multiple egress locations that exceed the lower percentage threshold). The storage of the egress locations may be updated over time, for example, such that egress locations that are of a certain age (e.g., over a year old) may be ignored. This may assist in more quickly assessing the locations of doorways and/or entryways after renovations to the room or space.

If the control circuit determines that the potential egress location of the occupant detected at 1312 is not the same as other previously-stored initial locations at 1316 (e.g., or below a threshold percentage of stored potential egress locations), the configuration procedure 1300 may exit. However, if the control circuit determines that there are multiple occurrences of the potential egress location of an occupant at the same location (e.g., a percentage and/or frequency of potential egress locations are at the same location), the control circuit may store the potential egress location of the occupant detected at 1312 as an actual egress location in memory at 1318. Alternatively or additionally, the control circuit may send an indication of the actual egress location to a system controller (e.g., the system controller 110) and/or to a mobile device (e.g., the mobile device 140). Further, in some examples, the occupant detection sensor and/or system controller may configure the region of interest such that noise generated by people walking outside of, but close to the actual doorway location do not trigger occupant counts by the occupant detection sensor. For example, the control circuit may mask off the actual doorway location and/or mask off a location that is just outside of the actual doorway location, such as through the use of the procedure 1200 (e.g., 1216 and 1218 of the procedure 1200).

Figure 14:
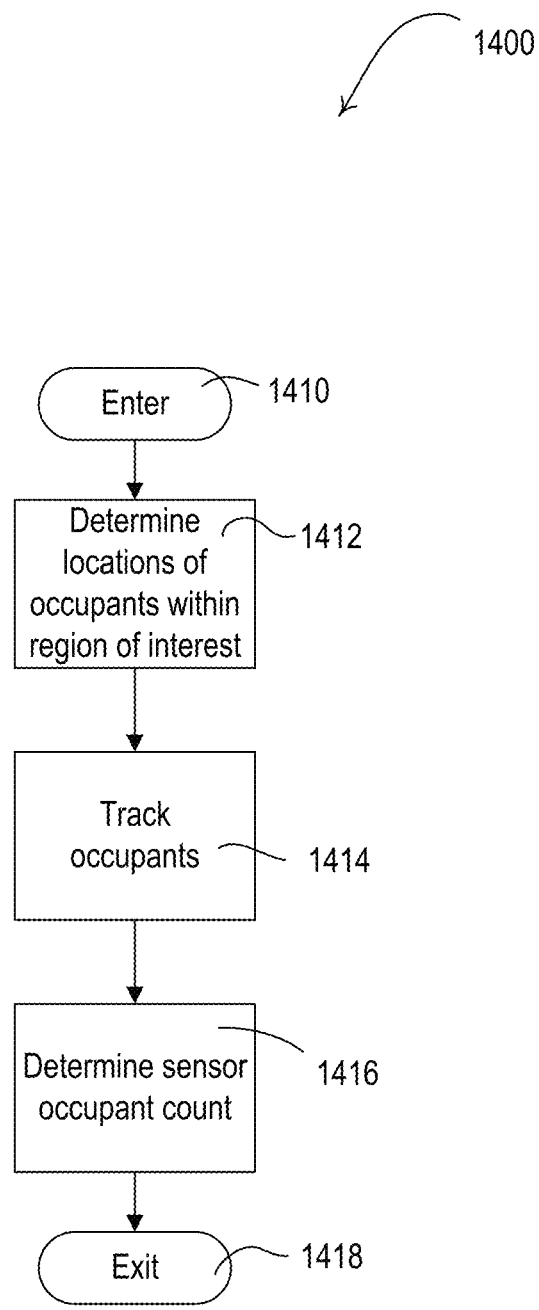

FIG. 14 is a flowchart of a control procedure 1400 that may be executed by an occupant detection sensor (e.g., the ceiling-mounted occupant detection sensor 180, the wall-mounted occupant detection sensor 182, and/or the occupant detection sensor 400) during normal operation. For example, the control procedure 1400 may be executed by a control circuit of the occupant detection sensor (e.g., the radar detection processor 412 and/or the control circuit 420). The control circuit may execute (e.g., periodically execute) the control procedure 1400 at 1410 to process occupant data determined by an occupant detection circuit (e.g., the radar detection circuit 410). The occupant data may comprise a tracking number and a location (e.g., an X-Y coordinate) in a global coordinate system of the occupant detection sensor for each occupant in a coverage area of the occupant detection sensor. For example, the control procedure 1400 may be executed to determine an occupant count (e.g., a sensor occupant count) of the number of occupants in a region of interest (e.g., the rectangular region of interest 920 shown in FIG. 9).

At 1412, the control circuit may use the occupant data received from the occupant detection circuit to determine the locations of the occupants within a region of interest. For example, the control circuit may transform the locations of each occupant in the global coordinate system into the local coordinate system of the occupant sensor. If the locations of the occupants in the local coordinate system fall within the bounds of the region of interest, the control circuit may store the location of the respective occupant and the corresponding tracking number in memory for further processing. At 1414, the control circuit may track the locations of the occupants in the region of interest. For example, the control circuit may be configured to continue to track occupants that have become stationary at 1414 even though the occupants may not be detected by the occupant detection circuit of the occupant detection sensor. At 1416, the control circuit may determine a sensor occupant count (e.g., by counting the number of occupants determined to be within the region of interest at 1414), before the control procedure 1400 exits at 1418. Further, in some examples, the control circuit may transmit the occupant count to a system controller or a mobile device for reporting and/or controlling one or more electrical loads in response to the count.

Figure 15:
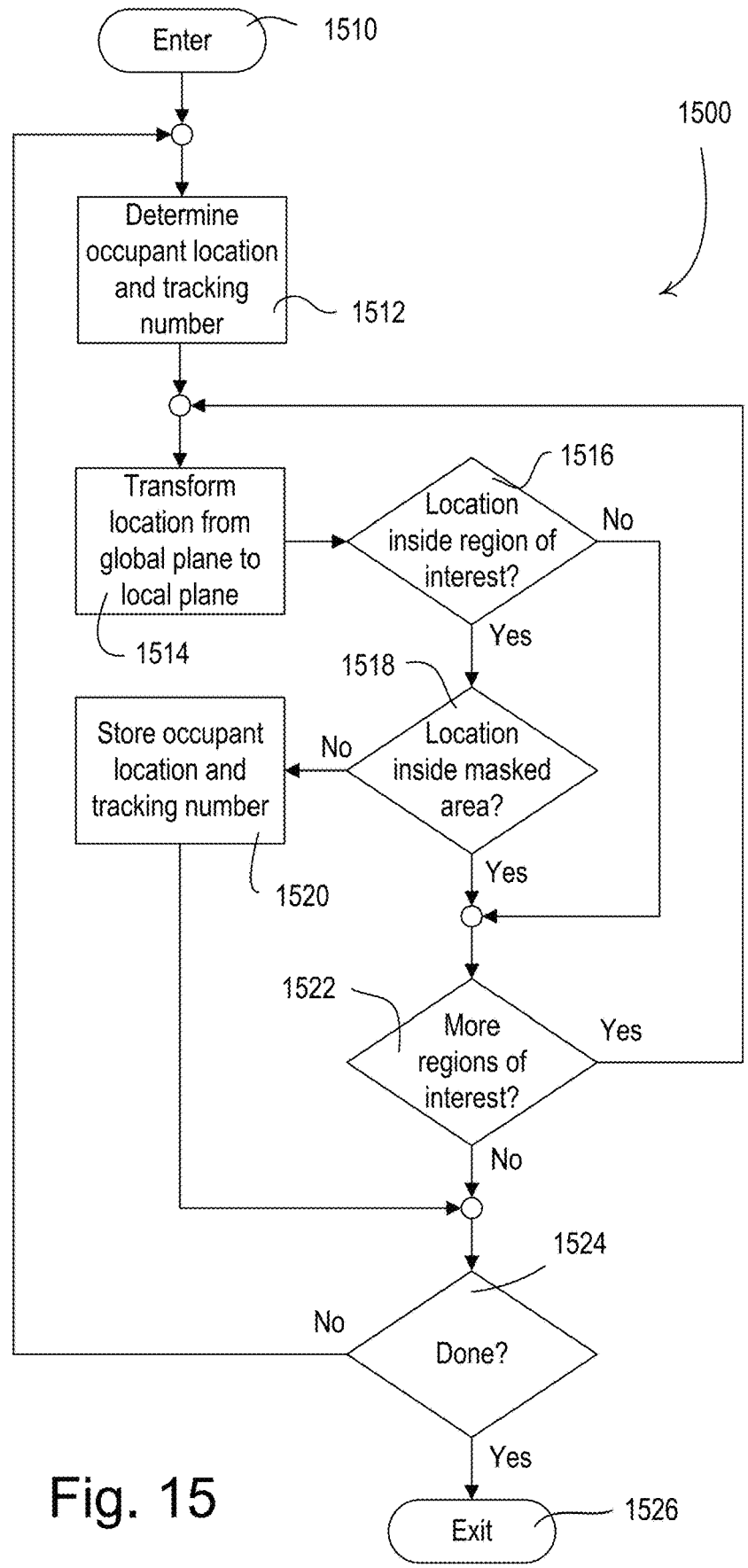

FIG. 15 is a flowchart of a location determination procedure 1500 that may be executed by an occupant detection sensor (e.g., the ceiling-mounted occupant detection sensor 180, the wall-mounted occupant detection sensor 182, and/or the occupant detection sensor 400) during normal operation. The location determination procedure 1500 may be executed by a control circuit of the occupant detection sensor (e.g., the radar detection processor 412 and/or the control circuit 420). For example, the location determination procedure 1500 may be executed at 1412 of the control procedure 1400 shown in FIG. 14.

The location determination procedure 1500 may begin at 1510. At 1512, the control circuit may determine the location (x, y) of an occupant in the global coordinate system and a tracking number of the occupant from an occupant detection circuit (e.g., the radar detection circuit 410). At 1514, the control circuit may transform the location (x, y) of the occupant in the global coordinate system to a location (x', y') in the local coordinate system. For example, the control circuit may use a linear transformation to determine the location (x', y') in the local coordinate system, e.g., $$\begin{bmatrix} x' \\ y' \end{bmatrix} = \begin{bmatrix} \cos(\varphi_R) & \sin(\varphi_R) \\ -\sin(\varphi_R) & \cos(\varphi_R) \end{bmatrix} \begin{bmatrix} x \\ y \end{bmatrix} - \begin{bmatrix} x'_{off} \\ y'_{off} \end{bmatrix};$$

or $$x' = x \cdot \cos(\varphi_R) + y \cdot \sin(\varphi_R) - x'_{off}; \text{ and}$$

$$y' = x \cdot -\sin(\varphi_R) + y \cdot \cos(\varphi_R) - y'_{off};$$

where $$\begin{bmatrix} x'_{off} \\ y'_{off} \end{bmatrix} = \begin{bmatrix} \cos(\varphi_R) & \sin(\varphi_R) \\ -\sin(\varphi_R) & \cos(\varphi_R) \end{bmatrix} \begin{bmatrix} x_{off} \\ y_{off} \end{bmatrix};$$

or $$x'_{off} = x_{off} \cdot \cos(\varphi_R) + y_{off} \cdot \sin(\varphi_R); \text{ and}$$

$$y'_{off} = x_{off} \cdot -\sin(\varphi_R) + y_{off} \cdot \cos(\varphi_R).$$

$\varphi_R$ may represent a rotation angle between the global coordinate system and the local coordinate system, and $x_{off}$ and $y_{off}$ may represent an offset vector between respective origins of the two coordinate systems, as described herein. At 1516, the control circuit may determine if the location (x', y') in the local coordinate system is within the bounds of the region of interest. For example, when the region of interest is a rectangle, the control circuit may determine if the coordinates of the location (x', y') in the local coordinate system are less than the respective maximum dimensions $X_{ROI}$, $Y_{ROI}$ of the region of the interest at 1516 to determine if the location of the occupant is within the bounds of the region of interest.

If the location (x', y') in the local coordinate system is within the bounds of the region of interest at 1516, the control circuit may determine if the location (x', y') is within a masked area at 1518. If the location (x', y') is not within a masked area at 1518, the control circuit may store the location (x', y') in the local coordinate system and the tracking number in memory at 1520. In addition, the control circuit may store the location (x, y) in the global coordinate system and the tracking number in memory at 1520. If the location (x', y') is not within the bounds of the region of interest at 1516 or the location (x', y') is within a masked area at 1518, the control circuit may not store the location (x', y') or the tracking number in memory at 1520. If there are more regions of interest in the present room at 1522, the location determination procedure 1500 may loop around to allow the control circuit to determine if the occupant location is in the next region of interest. The control circuit may continue to determine if the occupant location is in each region of interest in the room until the control circuit determines that the occupant location is in one of the regions of interest at 1518 or there are no more regions of interest at 1522. If the control circuit does not determine that the occupant location is in any of the regions of interest, the control circuit may not store the location (x', y') or the tracking number in memory at 1520. If the control circuit is not done processing the locations of occupants received from the occupant detection circuit at 1524, the location determination procedure 1500 may loop around to determine the location of the next occupant and associated tracking number at 1512. When the control circuit is done processing the locations of occupants received from the occupant detection circuit at 1524, the location determination procedure 1500 may exit at 1526.

The control circuit may use the transformation shown above (e.g., at 1514 of the location determination procedure 1500) to transform a location (x, y) in the global coordinate system to a location (x', y') in the local coordinate system when the region of interest is a polygon, such as a square or rectangle. When the region of interest is a circle, the control circuit may transform a location (x, y) in the global coordinate system to a location (x', y') in the local coordinate system by subtracting an offset vector from the location (x, y) in the global coordinate system. The bounds of a circular region of interest may be a dimension of the region of interest, as indicated by a diameter or radius. For example, the control circuit may be configured to determine if the location (x', y') in the local coordinate system is within the bounds of the region of interest (e.g., at 1516 of the location determination procedure 1500) by determining if a distance between an origin of the circular region of interest and the location (x', y') is less than the radius. When the region of interest is a circle, the control circuit may be configured to determine if the location of an occupant is within the bounds of the region of interest without transforming the location of the occupant to a local coordinate system. For example, the control circuit may calculate a distance between the occupant and the center of the circular region of interest using locations of the occupant and the center of the circular region of interest in the global coordinate system. The control circuit may then determine that the occupant is within the bounds of the circular region of interest if the distance is smaller than the radius of the circle and that the occupant is outside the bounds of the circular region of interest if the distance is greater than the radius of the circle.

Figure 16A:
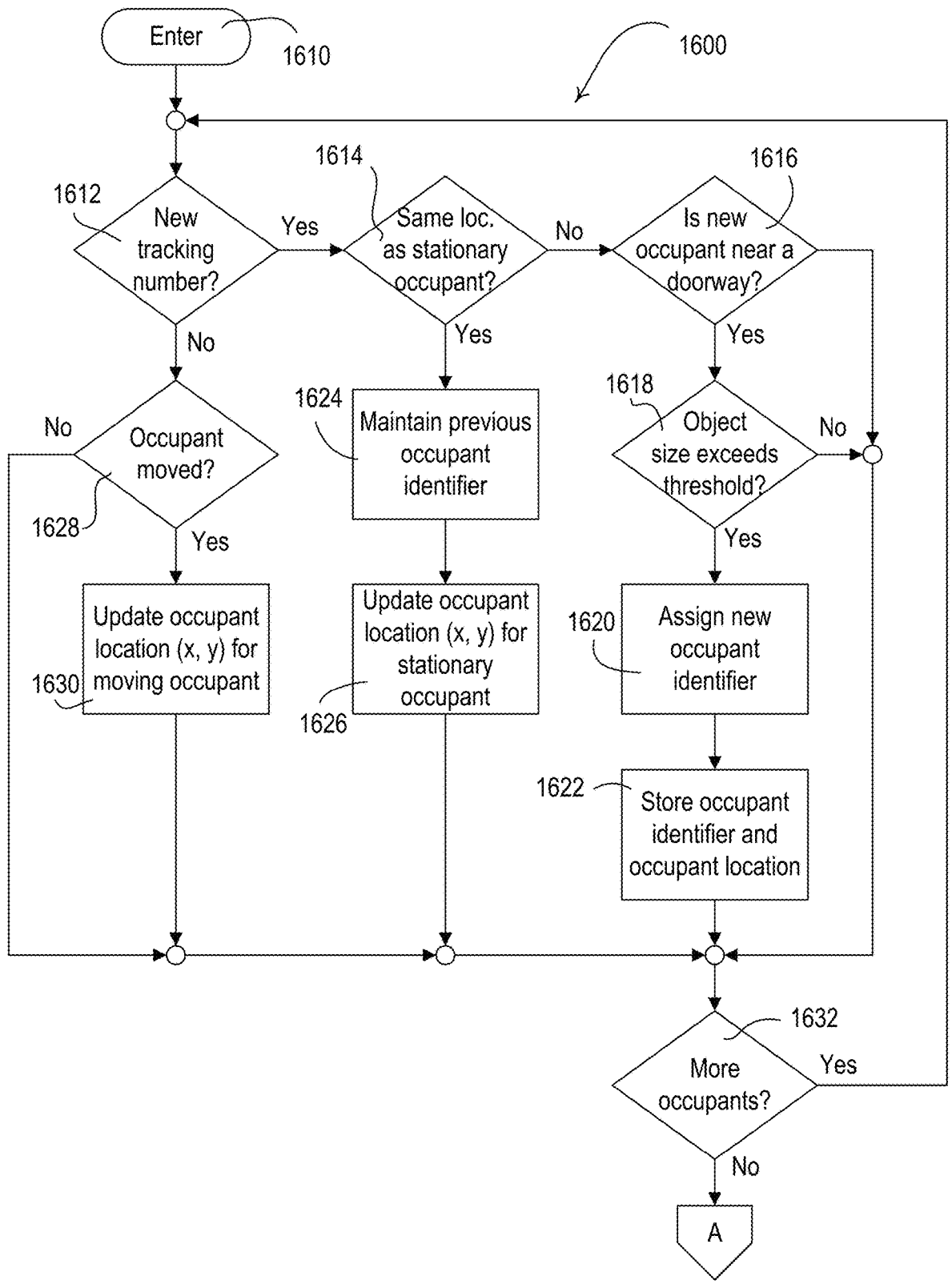
Figure 16B:
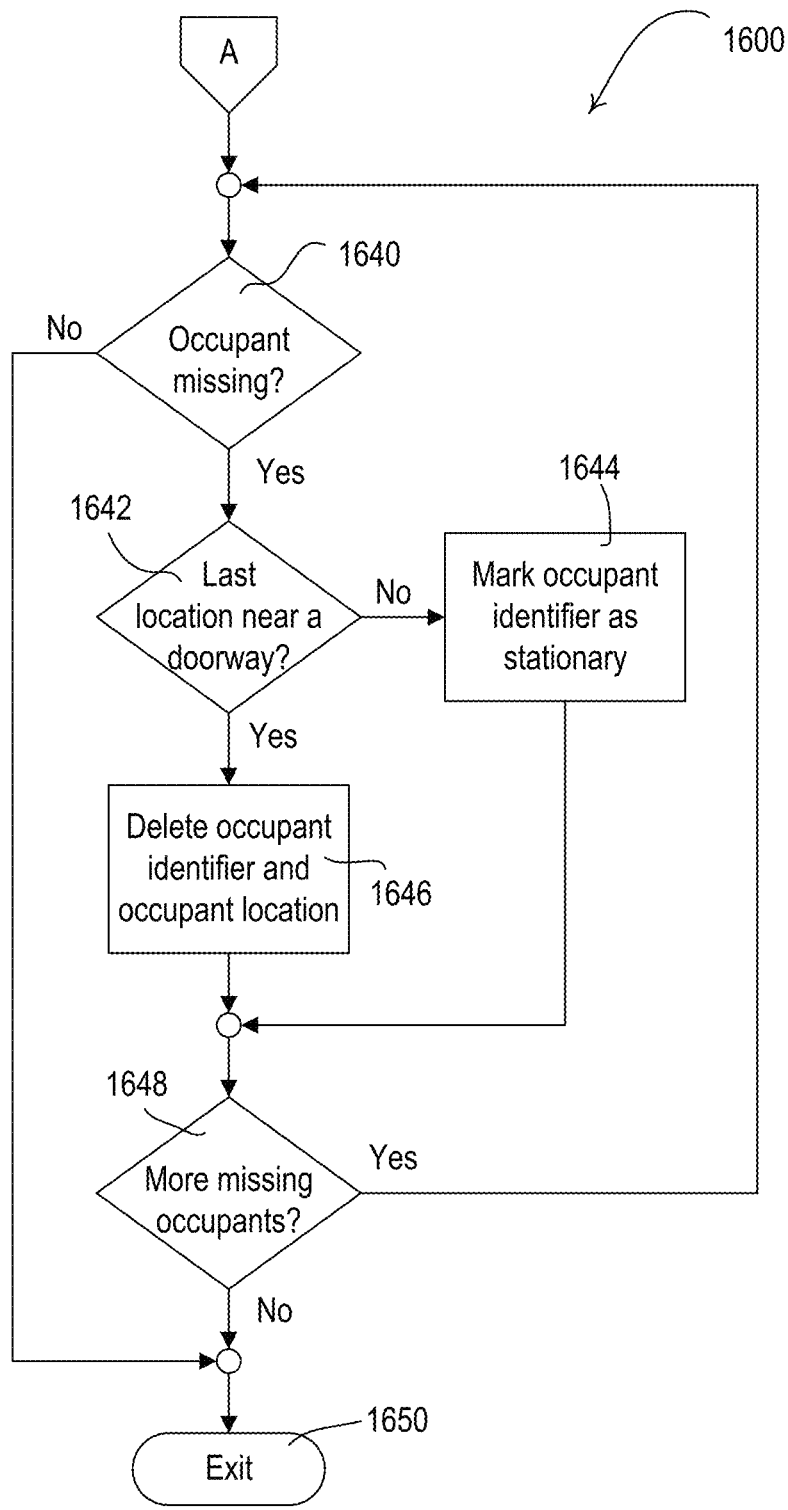

FIGS. 16A and 16B show a flowchart of an example occupant tracking procedure 1600 that may be executed by an occupant detection sensor (e.g., the ceiling-mounted occupant detection sensor 180, the wall-mounted occupant detection sensor 182, and/or the occupant detection sensor 400) during normal operation. The occupant tracking procedure 1600 may be executed by a control circuit of the occupant detection sensor (e.g., the radar detection processor 412 and/or the control circuit 420) at 1610. For example, the occupant tracking procedure 1600 may be executed at 1414 of the control procedure 1400 shown in FIG. 14. The control circuit may track the occupants during the occupant tracking procedure 1600 using the occupant data determined and/or generated by the location determination procedure 1500 shown in FIG. 15. For example, the occupant data may comprise a tracking number and a location (e.g., X-Y coordinate) in the local coordinate system for each occupant in the region of interest. In addition, the occupant data may comprise a tracking number and a location (e.g., X-Y coordinate) in the global coordinate system for each occupant in the region of interest.

As shown in FIG. 16A, the control circuit may process each occupant in the occupant data one at a time (e.g., for only those occupants in the region of interest). At 1612, the control circuit may determine if the occupant is a new occupant by determining if the tracking number of the occupant is new (e.g., the tracking number is new if the tracking number is not the same as any tracking number stored by the occupant detection sensor). If the tracking number is new at 1612, the control circuit may determine if the new occupant is at substantially the same location as (e.g., within a predetermined range of) a previously-identified stationary occupant at 1614 (e.g., the new occupant is the same as the stationary occupant). If the new occupant is not at substantially the same location as a stationary occupant at 1614, but is located near a doorway at 1616, the control circuit may determine if the size of the new occupant exceeds a size threshold at 1618. If the size of the new occupant exceeds the size threshold at 1618, the control circuit may assign the new occupant a new occupant identifier at 1620 and store the occupant identifier along with the tracking number and the occupant location (e.g., as received from the occupant detection circuit) at 1622. The size threshold may be preconfigured for the occupant detection sensor, for example, during a commissioning procedure.

If the new occupant is at substantially the same location as a stationary occupant at 1614, the control circuit may maintain the previous occupant identifier for the stationary occupant at 1624, and update the occupant location for the stationary occupant at 1626 with the newly determined location (e.g., so that slight movements of the occupant may not accumulate over time to cause erroneous conditions). The control circuit may update the stored tracking number for the stationary occupant with the new tracking number at 1624. If the tracking number for the occupant is not new at 1612 (e.g., the tracking number is not new if the tracking number is the same as a tracking number stored by the occupant detection sensor), the control circuit may determine if the previously-identified occupant (e.g., identified by the tracking number) has moved at 1628. If the occupant has moved at 1628, the control circuit may update the occupant location for the moving occupant at 1630. If there are more occupants at 1632, the occupant detection procedure 1600 may loop around to process the next occupant.

Referring to FIG. 16B, if there are not more occupants to process at 1632, the control circuit may determine if one of the previously-identified occupants is missing (e.g., no longer in the room) at 1640. For example, the control circuit may determine that an occupant is missing at 1640 if the occupant is no longer in the region of interest (e.g., if the occupant is not in the occupant data). If an occupant is missing at 1640 and the last known location of the occupant was near a doorway at 1642, the control circuit may delete the occupant identifier and occupant location from memory at 1644. If the last known location of the missing occupant was not near a doorway at 1642, the control circuit may mark the occupant as stationary at 1644. If there are more missing occupants at 1648, the occupant detection procedure 1600 may loop around to process the next missing occupant. If there are not more missing occupants at 1648, the occupant detection procedure may exit at 1650. The location of the doorway may be learned/determined by the control circuit, for example, during the commissioning procedure described herein.

Figure 17:
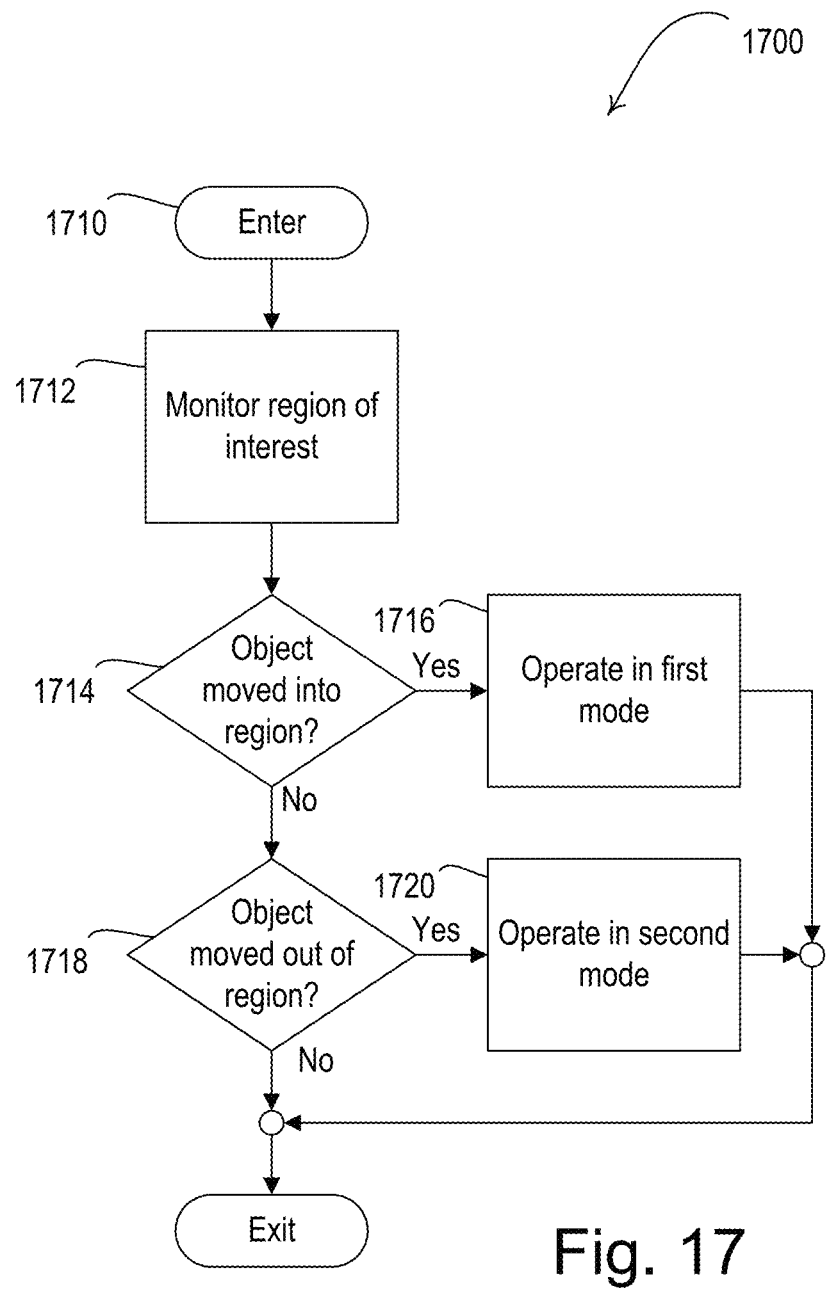

FIG. 17 shows a flowchart of an example control procedure 1700 that may be executed by an occupant detection sensor (e.g., the ceiling-mounted occupant detection sensor 180, the wall-mounted occupant detection sensor 182, and/or the occupant detection sensor 400) during normal operation. The control procedure 1700 may be executed by a control circuit of the occupant detection sensor (e.g., the radar detection processor 412 and/or the control circuit 420) at 1710. For example, the control circuit may execute the control procedure 1700 to detect movement of objects, such as partitions, shades, and/or windows within the space. The control circuit may be configured to perform the control procedure 1700 periodically during normal operation and/or in response to receiving a message (e.g., from a system controller or a mobile device).

At 1712, the control circuit may monitor a region of interest (e.g., the region of interest of FIGS. 3A-3C, 7, and/or 10). For example, the control circuit may be configured to receive the locations (e.g., X-Y coordinates) of occupants in the space from an occupant detection circuit (e.g., from the radar detection processor 412 of the radar detection circuit 410 via the communication bus 422), retrieve the boundaries of the region of interest from memory, and discard the locations of occupant that are not inside of the region of interest.

At 1714, the control circuit may determine that an object (e.g., a partition, a window treatment, a window, and/or the like) has moved within and/or into the region of interest. For example, when the object is a partition, the region of interest may be a region that the partition occupies when the partition is closed. The control circuit may determine that the partition has moved into of the region of interest when the partition is moved from an open position to a closed position, for example, to divide one room into two spaces. The partition may be a room partitioning device (e.g., a room divider), which may include multiple panels or a single panel, may be free-standing or attached to one or more walls and/or a ceiling, and may be easily moveable and/or firmly fixed. When the object is a window treatment (e.g., a manual or motorized window treatment), the region of interest may be a region that the window treatment occupies when the window treatment is closed. The control circuit may determine that the window treatment has moved into the region of interest when the window treatment is moved from a fully-lowered position (e.g., a closed position, such as a fully-closed position) to a fully-raised position (e.g., an open position, such as a fully-open position) or a partially-raised position (e.g., a partially-open position and/or an intermediate position between the fully-lowered position and the fully-raised position). Further, when the object is a window, the region of interest may be a region that the window occupies when the window is closed. The control circuit may determine that the window has been moved into the region of interest when the window is moved from the fully-lowered position to the fully-raised position.

If the control circuit determines that an object has moved within and/or in into the region of interest, the occupant detection sensor may operate in a first mode at 1716 and then exit the control procedure 1700. If the object is a partition, the first mode may be a partition-closed mode. For example, when operating in the partition-closed mode, the control circuit may divide (e.g., separate) the space into multiple regions of interest, as defined by the location of the partition, and determine separate occupant counts in each of the multiple regions of interest. In addition, the control circuit may mask off regions that are on one side of the petition (e.g., within one region of interest) and only react or count occupants on the other side of the petition (e.g., within the other region of interest). Further, when operating in the partition-closed mode, the control circuit may divide the space into multiple control areas, each having distinct electrical loads and load control devices, where the electrical loads and load control devices of each control area may be control separately by the load control system and each control area may have a separate occupant count. If the object is a window treatment, the first mode may be a daylighting-disabled mode. For example, when operating in the daylighting-disabled mode, the control circuit and/or the system controller may not control lights in response to feedback from a daylight sensor within the room. If the object is a window, the first mode may be a closed-window mode. For example, when operating in the closed-window mode, the control circuit and/or the system controller may control motorized window treatments (e.g., the motorized window treatments 150) and/or an HVAC system (e.g., the HVAC system 162) in a normal mode of operation.

If the control circuit determines that an object has not moved within and/or into the region of interest, the control circuit may determine whether an object has moved out of the region of interest at 1718. If the control circuit determines that an object has moved out of the region of interest, the control circuit and/or the system controller may operate in a second mode at 1720. When the object is a partition, the second mode may be a partition-open mode (e.g., if a partition is removed from the region of interest). For example, in the partition-open mode, the control circuit may recalibrate the region of interest (e.g., unmask a previously masked off region, or redetermine the boundaries region of interest) to ensure that the space that was formally on the other side of the partition is included within the region of interest. Accordingly, in the partition-open mode, the control circuit may combine the control areas that were previously divided by the partitions into a single control area, and combine the occupant counts of both the previously separated regions of interest. In addition, when operating in the partition-open mode, the control circuit may control the room as a single control area (e.g., rather than the multiple control areas in the partition-closed mode), where all and/or any the electrical loads and load control devices of each control area may be controlled together by the load control system.

If the object is a window treatment, the second mode may be a daylighting mode (e.g., the occupant detection sensor and/or system controller may control lights in response to the daylight sensor). For example, when operating in daylighting mode, the control circuit and/or the system controller may control lights in response to feedback from the daylight sensor within the room. If the object is a window, the second mode may be a window-open mode (e.g., a window is at least partly opened). The control circuit may, in some examples, determine that the window has moved from closed to open (or vice versa) based on a change in the dielectric constant at the location of movement (e.g., detecting that the dielectric constant before the movement is different at the location that the dielectric constant after the movement). In the window-open mode, the control circuit and/or system controller may send an alert to a user (e.g., a mobile device 140) that indicates that the window is open. In some instances, the alert is sent after the window has been detected to left open for a predetermined period of time (e.g., over an hour) or at a particular time of the day (e.g., such as 5 pm) and/or if the control circuit and/or system controller receives a notification that it is raining. In the window-open mode, the control circuit and/or system controller may close a window treatment (e.g., shades) to cover the window and/or may adjust a thermostat (e.g., the thermostat 160) within the space (e.g., to prevent unnecessary heating or cooling of a room that has an open window).

The control circuit of the occupant detection sensor may operate in a partition-opened mode and in a partition-closed mode for spaces that include one or more partitions. In the partition-opened mode, the control circuit may maintain the region of interest as a single region of interest (e.g., a total region of interest). In the partition-closed mode, the control circuit may divide the region of interest into multiple regions of interest (e.g., first and second portion of the total region of interest), as defined by the location of the partition. As noted, the occupant detection sensor may include a radar detection circuit (e.g., the radar detection circuit 410) and a low-power detection circuit (e.g., the low-power detection circuit 440), such as a PIR detector circuit. The occupant detection sensor may be mounted in one of the two portions of the total region of interest (e.g., the first portion of the total region of interest as discussed herein). The radar detection circuit of the occupant detection sensor may be configured to detect occupants in both of the first and second portions of the total region of interest independent of the position of the partition (e.g., either open or closed). The PIR detector circuit of the occupant detection sensor may be able to detect occupants in both of the two portions of the total region of interest when the partition is open, and only in one of the two portions of the total region of interest when the partition is closed (e.g., in the first region since the occupant detection sensor is mounted in the first region). The control circuit of the occupant detection circuit may be configured to determine that the partition is open when the radar detection circuit detects movement in the second portion and not in the first portion, and the PIR detector circuit detects movement. The control circuit of the occupant detection circuit may be configured to determine that the partition is closed when the radar detection circuit detects movement in the second portion and not in the first portion, and the PIR detector circuit does not detect movement.

Figure 18:
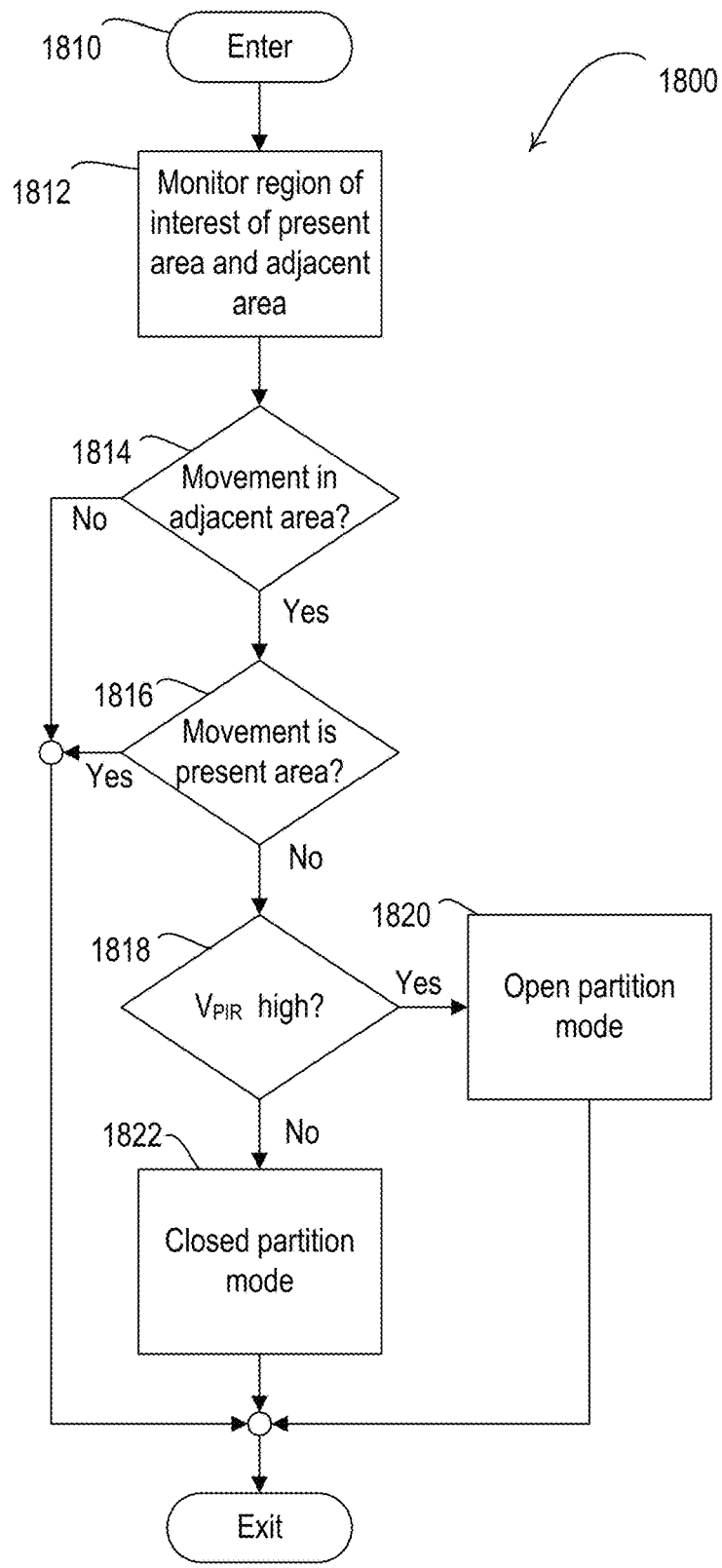

FIG. 18 shows a flowchart of an example control procedure 1800 that may be executed by an occupant detection sensor (e.g., the ceiling-mounted occupant detection sensor 180, the wall-mounted occupant detection sensor 182, and/or the occupant detection sensor 400) of a load control system (e.g., the load control system 100) during normal operation. The control procedure 1800 may be executed by a control circuit of the occupant detection sensor (e.g., the radar detection processor 412 and/or the control circuit 420), for example, to determine whether the occupant detection sensor should operate in a partition-opened mode or a partition-closed mode. As noted, the partition may be a room partitioning device (e.g., a room divider), which may include multiple panels or a single panel, may be free-standing or attached to a wall/walls or a ceiling, and may be easily moveable and/or firmly fixed. The control circuit may be configured to operate in the partition-opened mode when the partition is open and in the partition-closed mode when the partition is closed.

The control procedure 1800 may start at 1810. At 1812, the control circuit may monitor a region of interest (e.g., the total region of interest) that includes a present portion where the occupant detection sensor is mounted (e.g., the first portion of the total region of interest) and an adjacent portion next to the present portion (e.g., the second portion of the total region of interest). In some examples, the occupant detection sensor may be configured (e.g., at a commissioning step) with multiple regions of interests, such as the total region of interest as well as the present portion (e.g., the first portion) of the total region of interest and the adjacent portion (e.g., the second portion) of the total region of interest, where for example, the partition may extend between the present and adjacent regions of interest when in the closed position.

The occupant detection sensor may comprise an occupant detection circuit (e.g., the radar detection circuit 410) that is configured to detect movement in the present portion and/or the adjacent portion (e.g., the total region of interest). In addition, the occupant detection sensor may include a low-power detection circuit (e.g., the low-power detection circuit 440), such as a PIR detector circuit that generates a PIR detect signal (e.g., the PIR detect signal $V_{PIR}$), which may indicate movement in both the present portion and the adjacent portion (e.g., the total region of interest) when the partition is open and movement in the present portion only when the partition is closed.

The control circuit of the occupant detection sensor may be configured to determine if the partition is open or closed in response to the PIR detect signal generated by the PIR detector circuit when movement is detected in the adjacent portion (e.g., there are occupants in the adjacent portion), but movement is not detected in the present portion (e.g., there are no occupants in the present portion). The control circuit may first determine, in response to the occupant detection circuit, if movement is detected in the adjacent portion, but not in the present portion (e.g., at 1814 and 1816). At 1814, the control circuit may determine whether there is movement in the adjacent portion. For example, the control circuit may be configured to detect movement within the region of interest of the occupant detection sensor that is outside of the present portion of the region of interest (e.g., within the adjacent portion of the region of interest). If the control circuit does not detect movement in the adjacent portion at 1814, the control procedure 1800 may exit. If the control circuit detects movement in the adjacent portion at 1814, the control circuit may determine whether there is movement in the present portion at 1816. If the control circuit detects movement in the present portion (e.g., in the region of interest of the present area), the control procedure 1800 may exit.

If the control circuit detects movement in the adjacent portion at 1814 but not in the present portion at 1816, the control circuit may determine at 1818 whether the PIR detector circuit has detected movement in response to the PIR detect signal generated by the PIR detector circuit. For example, the PIR detector circuit may drive the magnitude of the PIR detect signal $V_{PIR}$ high when the PIR detector circuit detects one or more occupants, and drive the PIR detect signal $V_{PIR}$ low when the PIR detector circuit does not detect any occupants. Infrared signals, such as those generated by the occupants and received by the PIR detector circuit, do not transmit through walls, such as the partition. Therefore, if the control circuit determines that the PIR detect signal $V_{PIR}$ is high at 1818, the control circuit may operate in the partition-open mode at 1820, and the control circuit may exit the control procedure 1800. Accordingly, if the control circuit detects movement in the adjacent portion but not in the present portion, but the PIR detect signal $V_{PIR}$ indicates that the room is occupied, then the partition must be in the open position. If the control circuit determines that the PIR detect signal $V_{PIR}$ is low at 1818, the control circuit may operate in the partition-closed mode at 1822, and the control circuit may exit the control procedure 1800. Accordingly, if the control circuit detects movement in the adjacent portion but not in the present portion, but the PIR detect signal $V_{PIR}$ indicates that the room is not occupied, then the partition must be in the closed position.

In a partition-closed mode, the control circuit may break the space into multiple regions of interest (e.g., the first and second portions of the total region of interest), as defined by the location of the partition. In addition, the control circuit may mask off regions that are on one side of the petition (e.g., one of the first and second portions of the total region of interest), and/or only react or count occupants on one side of the petition (e.g., the one of the first and second portions of the total region of interest). In the partition-open mode, the control circuit may not break the space into multiple regions of interest (e.g., just respond to the total region of interest) to ensure that both portions (e.g., the present and adjacent portions) on both sides of the partition are included within a single region of interest (e.g., the total region of interest). For example, the control circuit may monitor and determine the occupant count of the total region of interest (e.g., the present portion and the adjacent portion of the total region of interest). In addition, the control circuit of the occupant detection sensor may be configured to transmit the determined mode (e.g., the partition-closed mode and/or the partition-open mode) to a control device of the load control system (e.g., the system controller 110). The system controller may be configured to control the electrical loads and/or the load control devices of the load control system in response to the input devices in a different manner based on whether the determined mode is the partition-closed mode or the partition-open mode.

Figure 19:
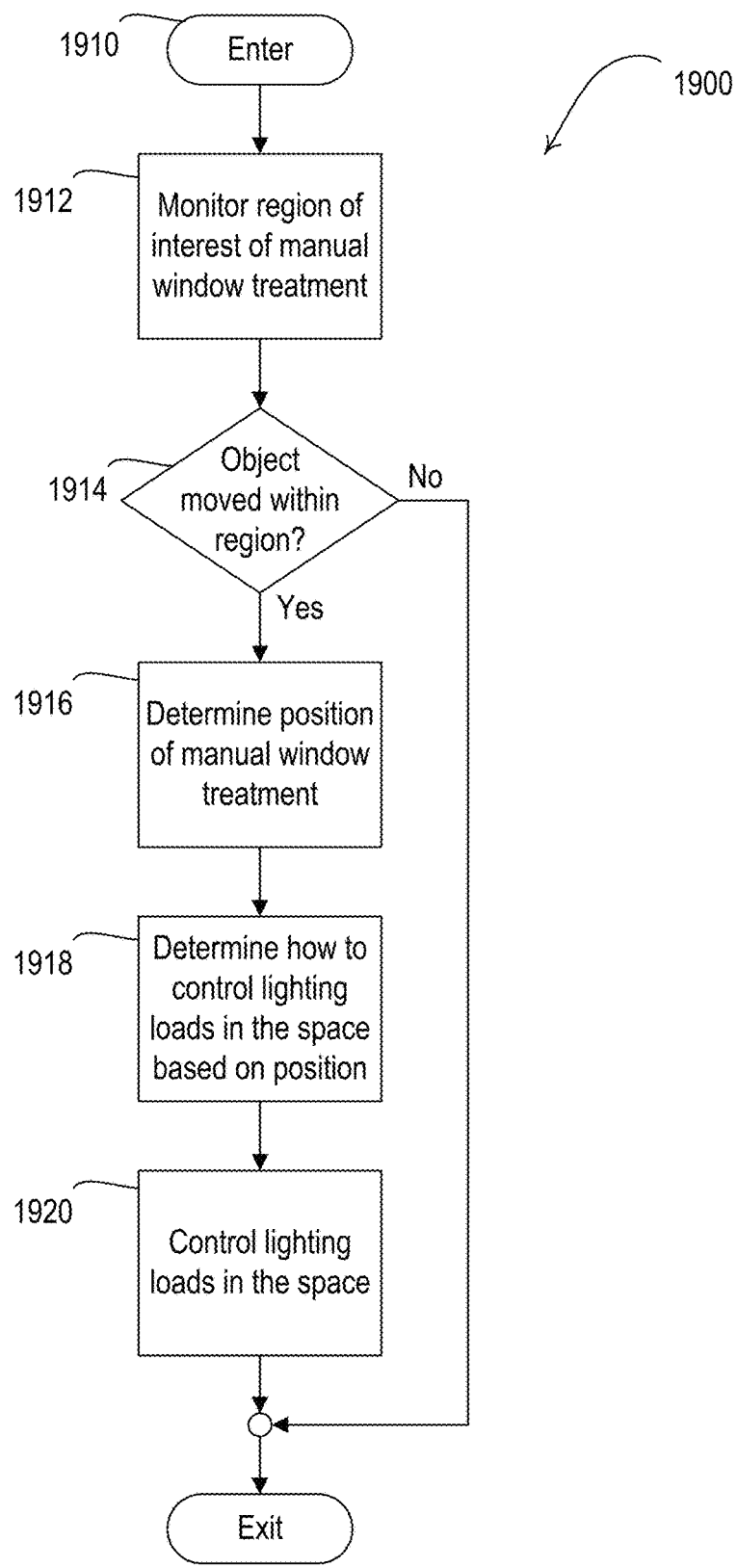
FIG. 19 shows a flowchart of an example light intensity control procedure that may be executed by a system controller of a load control system.

FIG. 19 shows a flowchart of an example control procedure 1900 that may be executed by a system controller (e.g., system controller 110) of a load control system (e.g., the load control system 100). The control procedure 1900 may be executed by the system controller to determine the position of a manual window treatment of the load control system, and to control one or more lighting loads of the load control system based on the position of the manual window treatment. Alternatively or additionally, the control procedure 1900 may be executed by the system controller to determine the position of an automated window treatment that is unable to communicate with the system controller. The system controller may be configured to perform the control procedure 1900 in response to receiving a message from an occupant detection sensor (e.g., the ceiling-mounted occupant detection sensor 180, the wall-mounted occupant detection sensor 182, and/or the occupant detection sensor 400) and/or periodically during normal operation.

The control procedure 1900 may begin at 1910. At 1912, the system controller may monitor a region of interest of a manual window treatment based on feedback from an occupant detection sensor. The occupant detection sensor may determine the region of interest of a manual window treatment, for example, through a commissioning procedure and/or from an installer of the occupant detection sensor. At 1914, the system controller may determine whether the manual window treatment within the region of interest has moved, for example, based on feedback from the occupant detection sensor. If the system controller determines that the manual window treatment has not moved within the region of interest, the system controller may exit the control procedure 1900. If the system controller determines that the manual window treatment has moved within the region of interest, the system controller may determine a position of the manual window treatment at 1916. The system controller may determine the position of the manual window treatment based on feedback from the occupant detection sensor, which may determine the position of the manual window treatment based on the detection of (or lack of a detection of) the window treatment.

At 1918, the system controller may determine how to control the lighting loads in the space (e.g., the space in which the occupant detection sensor and the manual window treatment is located) based on a position of the manual window treatment (e.g., whether the manual window treatment is in an fully-lowered position or in a fully-raised and/or partially-raised position, or based on an intermediate position of the manual window treatment between the fully-lowered and fully-raised positions). In some examples, the system controller may adjust the intensity levels of the lighting loads based on the position of the manual window treatment. The system controller may operate in a daylighting mode when the manual window treatment is in the fully-raised position and/or the partially-raised position (e.g., an intermediate position between the fully-lowered position and the fully-raised position), and not operate in the daylighting mode when the manual window treatment is in the fully-lowered position. When operating in the daylighting mode, the system controller may control lighting loads in response to feedback from a daylight sensor within the room (e.g., to offset for the addition of ambient light that is entering through the window when the manual window treatment is in the fully-raised and/or partially-raised position). Further, in some examples, the system controller may be configured to control a position of one or more other window treatments in the space (e.g., automated window treatments) in response to the position of the manual window treatment. For instance, the system controller may set the position of the one or more other window treatments in the space to be at the same position as the manual window treatment (e.g., a fully-lowered position, a partially-raised position, and/or a fully-raised position of the manual window treatment). At 1920, the system controller may control the lighting loads (e.g., and/or one or more automated window treatments) based on the position of the manual window treatment, and the control procedure 1900 may exit.

Alternatively or additionally, the system controller may determine how to control the automated window treatments in the space (e.g., the space in which the occupant detection sensor and the manual window treatment is located) based on a position of the manual window treatment (e.g., whether the manual window treatment is in an fully-lowered position or in a fully-raised and/or partially-raised position, or based on an intermediate position of the manual window treatment between the fully-lowered and fully-raised positions). For example, the system controller may control the automated window treatments to be at the same position as the manual window treatments within the same space.

Figure 20C:
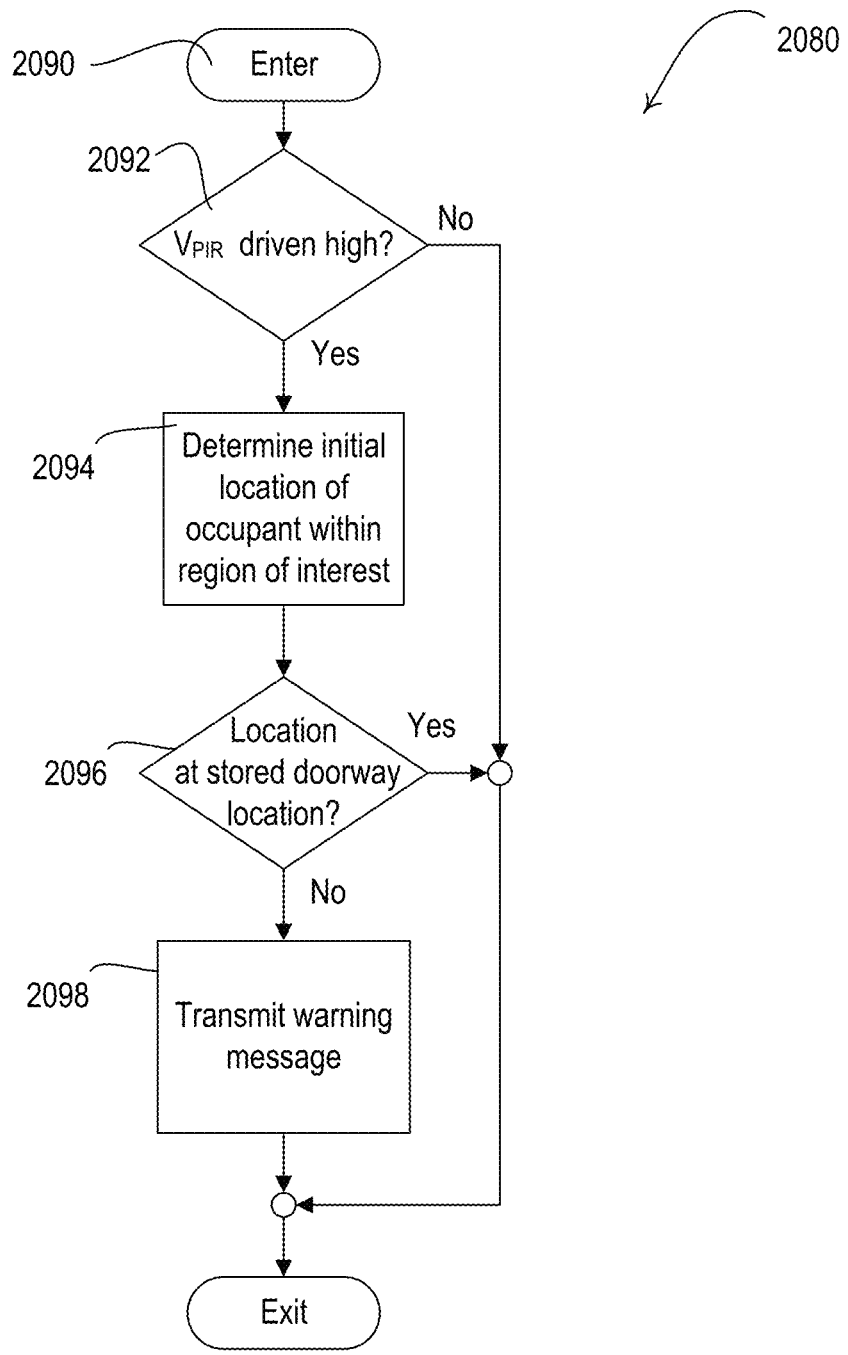

FIGS. 20A-20C illustrate example flowcharts for determining that a sensor has been rotated after installation. FIG. 20A shows a flowchart of an example sensor misalignment detection procedure 2000 that may be executed by an occupant detection sensor (e.g., the ceiling-mounted occupant detection sensor 180, the wall-mounted occupant detection sensor 182, and/or the occupant detection sensor 400). The sensor misalignment detection procedure 2000 may be executed by a control circuit of the occupant detection sensor (e.g., the radar detection processor 412 and/or the control circuit 420) periodically during normal operation and/or commissioning of the occupant detection sensor. The control circuit may perform the sensor misalignment detection procedure 2000 to detect whether the orientation of the occupant detection sensor has changed (e.g., the direction of the boresight of the occupant detection sensor has moved), and if so, transmit an alert.

The sensor misalignment detection procedure 2000 may start at 2010. At 2012, the control circuit may determine an orientation of the occupant detection sensor using an electronic compass. For instance, in some examples, the occupant detection sensor may include an electronic compass. At 2014, the control circuit may determine if the orientation of the occupant detection sensor has changed. The orientation of the occupant detection sensor may refer to the relative rotational position of the orientation detection sensor (e.g., the direction of the boresight of the radar detection circuit). For example, the occupant detection sensor may include one or more coordinate system indicators (e.g., boresight indicators) to indicate the direction of the coordinate system (e.g., the directions of the x-axis and the y-axis of the global coordinate system 222) of the occupant detection sensor. The control circuit may determine if the orientation has changed by comparing a current orientation of the occupant detection sensor to a previous orientation of the occupant detection sensor that is stored in memory (e.g., during the commissioning process). The control circuit of the occupant detection sensor may determine that the orientation has changed by determining if the change in orientation is greater than a threshold change level (e.g., approximately 1° rotational shift).

If the control circuit determines that the orientation has not changed and/or has not changed more than the threshold change level at 2014, the control circuit may exit the sensor misalignment detection procedure 2000. If the control circuit determines that the orientation has changed (e.g., changed by more than threshold change level), the control circuit may transmit a warning message to a system controller (e.g., the system controller 110) and/or a user device (e.g., the mobile device 140) indicating that the orientation of the occupant detection sensor (e.g., the direction of the boresight) has changed, and in some examples, by how much it has changed. As such, a facility member or worker could come fix the orientation of the occupant detection sensor.

FIG. 20B shows a flowchart of an example sensor misalignment detection procedure 2050 that may be executed by an occupant detection sensor (e.g., the ceiling-mounted occupant detection sensor 180, the wall-mounted occupant detection sensor 182, and/or the occupant detection sensor 400). The sensor misalignment detection procedure 2050 may be executed by a control circuit of the occupant detection sensor (e.g., the radar detection processor 412 and/or the control circuit 420) periodically during normal operation and/or commissioning of the occupant detection sensor. The control circuit may execute the sensor misalignment detection procedure 2050 to detect whether the orientation of the occupant detection sensor has changed (e.g., the direction of the boresight of the occupant detection sensor has moved), and if so, transmit an alert. During the sensor misalignment detection procedure 2050, the control circuit may be configured to detect whether the orientation of the occupant detection sensor has changed by determining if the location of known moving object (e.g., such as a motorized window treatment) within the field of view of the occupant detection sensor has moved (e.g., when compared to a previously stored location of the object).

The sensor misalignment detection procedure 2050 may start at 2060. At 2062, the control circuit may determine if there is a command to move one or more window treatments. In some examples, the control circuit may receive a message from a system controller that a command was sent to one or more window treatments within its region of interest. If the control circuit does not receive an indication that a window treatment within its region of interest was instructed to move, the sensor misalignment detection procedure 2050 may exit. If the control circuit receives an indication that a command to move was provided to a window treatment within its region of interest at 2062, the control circuit may determine (e.g., apply) a region of interest that focuses on the location of the controlled window treatment. For example, as noted herein, the occupant detection sensor may be configured to focus on a small region of interest within a large region of interest. In this instance, the small region of interest includes the location of the motorized window treatment that received the command to move. For example, the small region of interest may extend from the fully-lowered to fully-raised positions of the motorized window treatment, for example, so that even small movements of the motorized window treatment can be detected by the occupant detection sensor. Alternatively or additionally, the small region of interest may entirely surround the motorized window treatment.

At 2066, the control circuit may determine whether it detects movement in the focused region of interest, where the focused region of interest includes the location of the motorized window treatment that received the command to move. If the control circuit detects movement within the focused region of interest at 2066, then the sensor misalignment detection procedure 2050 may exit. For example, if the control circuit detects movement within the focused region of interest at 2066, the occupant detection sensor remains in proper orientation (e.g., the alignment of the boresight has not changed). If the control circuit does not detect movement within the focused region of interest at 2066, the control circuit may transmit a warning message to a system controller (e.g., the system controller 110) and/or a user device (e.g., the mobile device 140) indicating that the orientation of the occupant detection sensor (e.g., the direction of the boresight) has changed, and in some examples, by how much it has changed.

FIG. 20C shows a flowchart of an example sensor misalignment detection procedure 2080 that may be executed by an occupant detection sensor (e.g., the ceiling-mounted occupant detection sensor 180, the wall-mounted occupant detection sensor 182, and/or the occupant detection sensor 400) during normal operation. The occupant detection sensor rotation detection control procedure 2080 may be executed by a control circuit of the occupant detection sensor (e.g., the radar detection processor 412 and/or the control circuit 420) periodically during normal operation and/or commissioning of the occupant detection sensor. The control circuit may execute the sensor misalignment detection procedure 2080 to detect whether the orientation of the occupant detection sensor has changed (e.g., the direction of the boresight of the occupant detection sensor has moved), and if so, transmit an alert.

The sensor misalignment detection procedure 2080 may start at 2090. At 2092, the control circuit may determine if a signal (e.g., a PIR detect signal) received from a low-power detection circuit (e.g., the low-power detection circuit 440) is greater than a threshold (e.g., driven high). As previously noted, the occupant detection sensor may include a low-power detection circuit, such as a PIR detector circuit that outputs a PIR detect signal (e.g., the PIR detect signal $V_{PIR}$) that indicates an occupancy and/or vacancy condition in the space in response to detected infrared energy in the room. In some examples, the control circuit may detect an occupancy condition in the space in response to the PIR detect signal $V_{PIR}$ and may subsequently enable the radar detection circuit to determine the occupant count of the room. The PIR detector circuit may drive the PIR detect signal $V_{PIR}$ high when the PIR detector circuit detects one or more occupants in the room, and drive the PIR detect signal $V_{PIR}$ low when the PIR detector circuit does not detect any occupants in the room. If the PIR detect signal is not high at 2092, the sensor misalignment detection procedure 2080 may exit.

If the PIR detect signal is high at 2092, the control circuit may detect an occupant in the region of interest and determine an initial location of the occupant within the region of interest at 2094. At 2096, the control circuit may determine if the initial location of the occupant is at a stored doorway location (e.g., a location stored as an actuation doorway location using the configuration procedure 1300 of FIG. 13). If the control circuit determines that the initial location is at a stored doorway location, the control circuit may exit the sensor misalignment detection procedure 2080. If the control circuit determines that the initial location of the occupant is not at a stored doorway location (e.g., and the occupant detection sensor is configured with stored doorway locations), the control circuit may transmit a warning message to a system controller (e.g., the system controller 110) and/or a user device (e.g., the mobile device 140) indicating that the orientation of the occupant detection sensor (e.g., the direction of the boresight) has changed, and in some examples, by how much it has changed. If the initial location of the occupant is not at a stored doorway location (e.g., and the occupant detection sensor is configured with stored doorway locations), the orientation of the occupant detection sensor (e.g., the direction of the boresight) has most likely changed.

Although features and elements are described herein in particular combinations, each feature or element can be used alone or in any combination with the other features and elements. The methods described herein may be implemented in a computer program, software, or firmware that may be incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. An occupant detection device configured to detect an occupant in a space where the occupant detection device is installed, the occupant detection device comprising:
    an occupant detection circuit configured to determine locations of one or more occupants in the space;
    a low-power detection circuit that is configured to indicate an occupancy or vacancy condition in the space; and
    a control circuit configured to:
        determine that the low-power detection circuit indicates that there are no occupants within the space;
        in response to the determination by the low-power detection circuit that there are no occupants within the space, determine that there is movement in an occupant map or a region of interest (ROI) as indicated by the locations of the one or more occupants as determined by the occupant detection circuit, and configure masked regions around the locations of the movement; and
        store the masked regions in memory, wherein movement detected within the masked regions is ignored when determining an occupant count for the space.

2. The occupant detection device of claim 1, wherein the low-power detection circuit comprises a passive infrared (PIR) detector circuit that outputs a PIR detect signal in response to detected infrared energy in the room.

3. The occupant detection device of claim 2, wherein the PIR detector circuit is configured to drive the PIR detect signal high when the PIR detector circuit detects one or more occupants in the room, and drive the PIR detect signal low when the PIR detector circuit does not detect any occupants in the room.

4. The occupant detection device of claim 1, wherein the occupant map comprises a two-dimensional (2D) radar image indicating the locations of the occupants within a coverage area of the occupant detection circuit.

5. The occupant detection device of claim 1, wherein the control circuit is configured to generate the occupant count for the space based on feedback from the occupant detection circuit.

6. The occupant detection device of claim 5, wherein the control circuit is configured to maintain the occupant count in a region of interest of the based on whether the locations of the occupants are within the region of interest or not, wherein the masked regions are located within the region of interest but detected occupants within the masked region are excluded from the occupant count.

7. The occupant detection device of claim 1, wherein the control circuit is configured to report the occupant count to a system controller.

8. The occupant detection device of claim 1, wherein the control circuit is further configured to detect movement of a window treatment in the occupant map or the region of interest of the occupant detection circuit.

9. The occupant detection device of claim 8, wherein the control circuit is further configured to:
receive a message indicating that the window treatment is moving;
determine that the movement of the window treatment in the occupant map or the region of interest is at a predetermined speed;
configure a masked region around a location of the movement based on the movement being in the occupant map or region of interest of the occupant detection circuit and the movement being at the predetermined speed; and
store the masked region in memory, wherein movement detected within the masked region is ignored when determining an occupant count for the space.

10. The occupant detection device of claim 8, wherein the control circuit is further configured to:
determine that the window treatment has moved from a fully-lowered position to a fully-raised or partially-raised position;
wherein, when a daylighting mode is disabled, lights are not controlled in response to feedback from a daylight sensor; and
wherein, when the daylighting mode is enabled, lights are controlled in response to feedback from the daylight sensor.

11. The occupant detection device of claim 8, wherein the control circuit is further configured to:
receive a message indicating that the window treatment is moving;
determine a location of the window treatment in response to the movement of the window treatment in the occupant map or the region of interest of the occupant detection circuit;
determine a configuration identifier of the window treatment in response to the location of the window treatment; and
associate a unique identifier of the window treatment with the configuration identifier of the window treatment.

12. The occupant detection device of claim 8, wherein the control circuit is further configured to:
monitor a region of interest of a manual window treatment in response to the occupant detection circuit;
determine that the manual window treatment within the region of interest has moved in response to the occupant detection circuit;
determine a position of the manual window treatment in response to the occupant detection circuit;
determine an intensity level to control lighting loads based on whether the manual window treatment is in a fully-closed position or in a fully-raised or partially-raised position; and
transmit a command including the determined intensity level for controlling the one or more lighting loads.

13. The occupant detection device of claim 1, further comprising:
an inclinometer configured to generate and output a signal that is indicative of an incline angle of the occupant detection device;
wherein the control circuit is further configured to determine an incline angle of the occupant detection device based on the signal received from the inclinometer.

14. The occupant detection device of claim 13, wherein the control circuit is further configured to determine that the incline angle is outside of a predetermined range, and generate an indication of an incline error.

15. The occupant detection device of claim 13, wherein the control circuit is further configured to determine a compensation factor based on the incline angle, and apply the compensation factor based on the incline angle.

16. The occupant detection device of claim 1, wherein the control circuit is further configured to:
determine a height of the space;
determine a viewing angle for the occupant detection circuit based on the height of the occupant detection circuit; and
configure the occupant detection circuit to have the selected viewing angle.

17. The occupant detection device of claim 1, wherein the occupant detection circuit is configured to control a transmitting antenna array using various beamforming techniques to adjust viewing angle of the occupant detection circuit.

18. The occupant detection device of claim 1, wherein the control circuit is further configured to:
receive a message indicating an actuation of a remote control device;
determine a location of a single occupant when the actuation of the remote control device occurred based on the occupant detection circuit;
determine a configuration identifier of the remote control device in response to the location of the single occupant; and
associate a unique identifier of the remote control device with the configuration identifier of the remote control device.

19. The occupant detection device of claim 1, wherein the control circuit is further configured to:
determine that the low-power detection circuit indicates a new occupant within the space;
determine an initial location of the new occupant within the region of interest of the occupant detection circuit;
store the initial location of the new occupant within the region of interest as a potential doorway location;
determine that there are multiple occurrences of the same potential doorway location; and
store the potential doorway location as an actual doorway location for the space.

20. The occupant detection device of claim 19, wherein the control circuit is configured to mask off the actual doorway location or mask off a location that is just outside of the actual doorway location.

* * * * *